United States Patent
Agarwal et al.

(10) Patent No.: US 11,030,068 B1
(45) Date of Patent: Jun. 8, 2021

(54) GRAPHICAL USER INTERFACE (GUI) FOR REPRESENTING INSTRUMENTED AND UNINSTRUMENTED OBJECTS IN A MICROSERVICES-BASED ARCHITECTURE

(71) Applicant: SPLUNK INC., San Francisco, CA (US)

(72) Inventors: Mayank Agarwal, Mountain View, CA (US); Gergely Danyi, Redwood City, CA (US); Steven Flanders, Nashua, NH (US); Steven Karis, Redwood City, CA (US); Maxime Petazzoni, San Mateo, CA (US); Justin Smith, San Francisco, CA (US); Scott Stewart, Pflugerville, TX (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 16/752,046

(22) Filed: Jan. 24, 2020

(51) Int. Cl.
   *G06F 11/32* (2006.01)
   *G06F 11/34* (2006.01)
   *G06N 5/02* (2006.01)
   *G06F 11/30* (2006.01)

(52) U.S. Cl.
   CPC ........ *G06F 11/323* (2013.01); *G06F 11/3075* (2013.01); *G06F 11/3082* (2013.01); *G06F 11/3461* (2013.01); *G06N 5/025* (2013.01)

(58) Field of Classification Search
   None
   See application file for complete search history.

(56) References Cited

U.S. PATENT DOCUMENTS

| | | | |
|---|---|---|---|
| 6,751,789 B1 * | 6/2004 | Berry | G06F 11/3466 714/35 |
| 2014/0317604 A1 * | 10/2014 | Gataullin | G06F 11/3676 717/128 |
| 2015/0242303 A1 * | 8/2015 | Gautallin | G06F 11/3003 717/128 |
| 2015/0347283 A1 * | 12/2015 | Gataullin | G06F 11/3003 717/128 |
| 2019/0108117 A1 * | 4/2019 | O'Dowd | G06F 11/323 |
| 2020/0328952 A1 * | 10/2020 | Makwarth | H04L 41/5051 |
| 2020/0372007 A1 * | 11/2020 | Ross | G06F 16/2365 |

* cited by examiner

*Primary Examiner* — Qing Chen

(57) ABSTRACT

A method of rendering a graphical user interface (GUI) comprising an application topology graph for a microservice architecture comprises generating a plurality of traces from a first plurality of spans generated by instrumented services in the architecture and generating generate a second plurality of spans for uninstrumented services using information extracted from the first plurality of spans. The method further comprises grouping the second plurality of spans with the plurality of traces. Subsequently, the method comprises traversing the traces and collecting a plurality of span pairs from the plurality of traces, wherein each pair of the span pairs is associated with a call between two services. The method also comprises aggregating information across the plurality of span pairs to reduce duplicative information associated with multiple occurrences of a same span pair from the plurality of span pairs. Finally, the method comprises rendering the application topology graph using the aggregated information.

20 Claims, 31 Drawing Sheets

{productcatalogservice, 503, TRUE, TRUE}
FIG. 12A
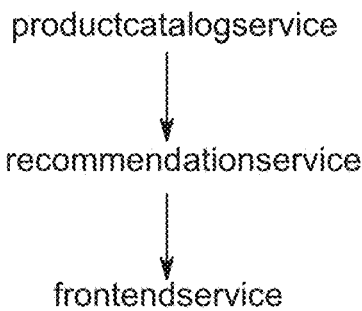
FIG. 12B
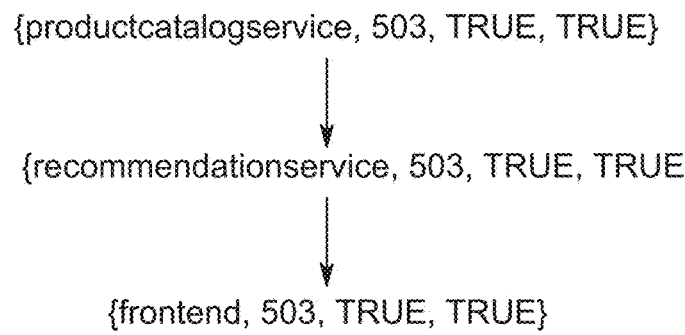
FIG. 12C
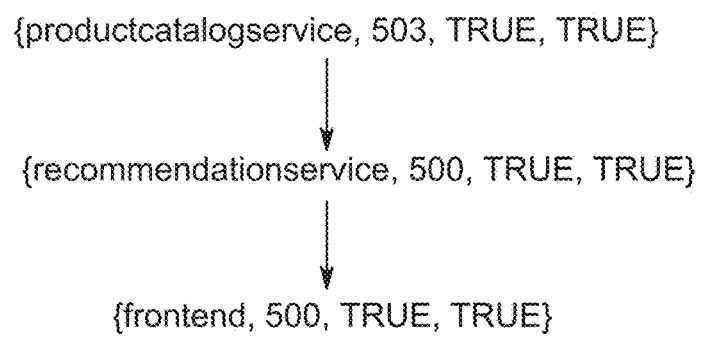
FIG. 12D

```
2205 ─┐  ∨ checkoutservice   request/SendOrderConfirmation    544ms
       └                     OPERATION
                             request/SendOrderConfirmation
                             TAGS
                               environment              "stag"
                               http.method              "GET"
                               http.status_code         200
                               http.url                 "http://checkoutservice/QueuePlacedOrder"
                               items_purchased          2
                               k8s.io/cluster/name      "us-west-1-cluster"
                               k8s.io/namespace/name    "us-west-1-namespace-1"
                               k8s.io/pod/name          "checkoutservice-prtuc2s417-zq8dt"
                               net_profit_usd           1108
                               region                   "us-west-1"
                               span_kind                "producer" ──2210
                               status.code              0
                               tenant-level             "bronze"
                               topic                    "placed-orders"
                               version                  "8cf2de"
                             PROCESS
                               hostname                 "util-svc-synthetic-load-generator-7d5fdd849f-qmxcg"
                               ip                       "100.96.18.38"
                               opencensus.exporterversion  "Jaeger-Java-0.33.1"

2215 ─┐  ∨ emailservice     /SendOrderConfirmation           542ms
       └                     OPERATION
                             /SendOrderConfirmation
                             TAGS
                               environment              "stag"
                               http.method              "GET"
                               http.status_code         200
                               http.url                 "http://emailservice/SendOrderConfirmation"
                               k8s.io/cluster/name      "us-west-1-cluster"
                               k8s.io/namespace/name    "us-west-1-namespace-1"
                               k8s.io/pod/name          "emailservice-d847fdcf5-j6s2f "
                               queue_size               2
                               region                   "us-west-1"
                               span_kind                "consumer" ──2220
                               status.code              0
                               tenant-level             "bronze"
                               version                  "75deaf"
                             PROCESS
                               hostname                 "util-svc-synthetic-load-generator-7d5fdd849f-qmxcg"
                               ip                       "100.96.18.38"
                               opencensus.exporterversion  "Jaeger-Java-0.33.1"
```

FIG. 22

| from service name | to service name | from span.kind | to span.kind | from region | to region | Request count |
|---|---|---|---|---|---|---|
| Service A | service B | client | server | us-west | us-east | 2 |
| Service A | service B | client | server | us-west | us-west | 1 |

2490 — (first data row)
2492 — (second data row)

FIG. 24B

GRAPHICAL USER INTERFACE (GUI) FOR REPRESENTING INSTRUMENTED AND UNINSTRUMENTED OBJECTS IN A MICROSERVICES-BASED ARCHITECTURE

BACKGROUND

Computer systems may run applications or services that are provided via a server or cloud. A client computer system may send a request to a server that retrieves application installation files in an underlying database. The applications or services can be developed and deployed as a single unit or as multiple units, such as a collection of microservices. Applications that are developed as single unit may be a monolithic application that includes a user interface and data access codes combined into a single program from a single platform. Monolithic applications are self-contained and independent from other computing applications. With the advent of cloud computing, however, these large centralized monolithic systems are being decoupled and distributed to address scalability needs, and to allow companies to deliver value faster.

Microservices or microservice architecture is a software development method of developing software applications as a suite of independently deployable smaller cooperating services. The cooperating services run processes and communicate to serve a business goal to form an enterprise application. More specifically, in a microservice architecture, an application is developed as a collection of small services; each service implements business capabilities, runs in its own process and communicates via APIs (e.g., HTTP APIs) or messaging. Each microservice can be deployed, upgraded, scaled and restarted independent of other services in the application, typically as part of an automated system, enabling frequent updates to live applications without impacting end customers.

With the rise of cloud native applications, which include microservices, there has been not only a shift in the manner in which software is built and deployed, but also in the manner in which it is monitored and observed. Microservices-based applications have to operate in an environment of dramatically increased complexity with many more layers of abstraction compared to previous generations of monolithic applications. Compared to monolithic applications, microservice architectures introduce complexity in network communication, feature short lifecycles and require resiliency in dynamic environments.

Software developers for microservices-based applications monitor different aspects of software they develop by instrumenting the software. These aspects include performance of the software, disk utilization of the software, CPU utilization of the software, errors encountered during execution of the software, significant events encountered during execution of the software, information describing which parts of code are being executed and which parts are not being executed, among others. After development, similar aspects of the software are also monitored during production, such as when software is being executed on a cloud architecture.

Computing operations of the instrumented software can be described by spans and traces. The spans and traces produced by various instrumented microservices in an architecture are communicated to an analysis system that analyzes the traces and spans to enable a software developer to monitor and troubleshoot the services within their software.

As companies begin to increasingly rely on microservice architectures, they run into operational complexity and struggle to efficiently monitor their environments. One of the challenges associated with microservice architectures, for example, is obtaining visibility in distributed workflows without a central orchestrator. Traditional monitoring and troubleshooting tools, designed as symptom-based solutions with single purpose capabilities, result in information overload and are unable to keep up with the dynamic nature of cloud native applications. Thus, systems that can efficiently and accurately monitor microservice architectures and microservices-based applications are the subject of considerable innovation.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The challenges associated with monitoring, troubleshooting and tracking errors in microservice architectures has led to the rise of distributed tracing, which deals with tracing user requests through applications that are distributed. One of the challenges encountered in the development of monitoring tools for microservice architectures, for example, is efficiently rendering a graphical user interface (GUI) with an application topology graph that displays the dependency relationships between instrumented microservices in a software developer's architecture in addition to dependency relationships with uninstrumented services. An uninstrumented service is a service that does not emit spans, for example, because the service may not comprise instrumentation code. The uninstrumented services may be part of the developer's application or external to the developer's architecture. Furthermore, the GUI needs to be able to provide meaningful information regarding the throughput between the various services as well as latency and error information.

Conventional tracing and monitoring systems are unable to efficiently render a graphical representation of instrumented and uninstrumented services in a microservices-based distributed system that also provides meaningful quantitative information about the various services and the relationships between them. Embodiments of the present invention render an application topology graph that conveys cross-service relationships between instrumented (and, potentially, uninstrumented services) comprised within a client's application and also relationships between services within the client's application and uninstrumented services external to the client's architecture. Additionally, because embodiments of the present invention can efficiently aggregate all incoming trace information from the client, the topology graph is able to convey meaningful and accurate information regarding throughput, latency and error rate (without the need for sampling). In one or more embodiments, the application topology graph also allows clients of a monitoring platform to visually track the causal chain of operations that resulted in an error or possibly a degraded response being returned to a client in response to a request.

In one or more embodiments, in order to generate the GUI with an application topology graph that displays both instrumented and uninstrumented services, the monitoring platform ingests a plurality of spans associated with instrumented services from a client and consolidates the spans into one or more traces. Thereafter, using the information within the tags of the ingested spans, the monitoring platform determines if there are uninstrumented services that need to be inferred. In an embodiment, the monitoring platform creates spans for the inferred services and consolidates them with the spans for the instrumented services within the trace structure.

In one or more embodiments, the monitoring platform subsequently traverses the trace structure to identify and collect cross-service span pairs that represent cross-service calls. In an embodiment, to collect the cross-service span pairs, the monitoring platform identifies every parent-child span pair in a given trace where the service name for the parent and the child are different. Identifying and collecting the cross-service span pairs from the incoming spans is advantageous because it enables the monitoring platform to exclusively track information that will be required to render the service graph.

In one or more embodiments, once the cross-service span pairs are collected, the monitoring platform maps selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. In one embodiment, the monitoring platform aggregates across the cross-service span pairs by maintaining a count for each unique set of "FROM" tag attributes to "TO" tag attributes for a cross-service pair. In one or more embodiments, the edges and the nodes on the service graph are rendered by using the counts for respective sets of the "FROM" and "TO" tag attributes.

In one or more embodiments of the present disclosure, a method is provided for rendering a GUI comprising an application topology graph for a microservice architecture. The method comprises generating a plurality of traces from a first plurality of spans generated by instrumented services in the microservice architecture for a given time duration. The method further comprises generating a second plurality of spans for uninstrumented services in the microservice architecture using information extracted from the first plurality of spans. Also, the method comprises grouping the second plurality of spans with the plurality of traces. The method additionally comprises traversing the plurality of traces and collecting a plurality of span pairs therefrom, wherein each pair of the plurality of span pairs is associated with a call between two services. Further, the method comprises aggregating information across the plurality of span pairs to generate aggregated information for the given time duration, wherein aggregating reduces duplicative information associated with multiple occurrences of a same span pair from the plurality of span pairs. The method also comprises rendering the application topology graph using the aggregated information, wherein the application topology graph comprises both the instrumented services and the uninstrumented services.

In or more embodiments of the present disclosure, a non-transitory computer-readable medium having computer-readable program code embodied therein is provided for causing a computer system to perform a method of rendering a graphical user interface comprising an application topology graph for a microservice architecture. The method comprises generating a plurality of traces from a first plurality of spans generated by instrumented services in the microservice architecture for a given time duration. The method further comprises generating a second plurality of spans for uninstrumented services in the microservice architecture using information extracted from the first plurality of spans. Also, the method comprises grouping the second plurality of spans with the plurality of traces. The method additionally comprises traversing the plurality of traces and collecting a plurality of span pairs therefrom, wherein each pair of the plurality of span pairs is associated with a call between two services. Further, the method comprises aggregating information across the plurality of span pairs to generate aggregated information for the given time duration. The method also comprises rendering the application topology graph using the aggregated information, wherein the application topology graph comprises both the instrumented services and the uninstrumented services.

In or more embodiments of the present disclosure, a system for rendering a graphical user interface comprising an application topology graph for a microservice architecture is provided. The system comprises a processing device communicatively coupled with a memory and configured to: a) generate a plurality of traces from a first plurality of spans generated by instrumented services in the microservice architecture for a given time duration; b) generate a second plurality of spans for uninstrumented services in the microservice architecture using information extracted from the first plurality of spans; c) group the second plurality of spans with the plurality of traces; d) traversing the plurality of traces and collecting a plurality of span pairs therefrom, wherein each pair of the plurality of span pairs is associated with a call between two services; e) aggregate information across the plurality of span pairs to generate aggregated information for the given time duration; and f) render the application topology graph using the aggregated information, wherein the application topology graph comprises both the instrumented services and the uninstrumented services.

BRIEF DESCRIPTION OF THE DRAWINGS

In the drawings:

FIG. 12A illustrates an exemplary span error signature, in accordance with embodiments of the present invention.

FIG. 12B illustrates an exemplary call path, in accordance with embodiments of the present invention.

FIGS. 12C and 12D illustrates two exemplary trace error signatures that may be created from the chain shown in FIG. 12B, in accordance with embodiments of the present invention.

FIG. 22 illustrates an exemplary on-screen GUI showing a visual representation of a portion of an exemplary trace where an uninstrumented service needs to be inferred between two instrumented services, in accordance with embodiments of the present invention.

FIG. 24B is a table illustrating the manner in which tag attributes associated with each cross-service span pair are aggregated by the aggregation module of FIG. 24A, in accordance with embodiments of the present invention.

DETAILED DESCRIPTION

Figure 1A:
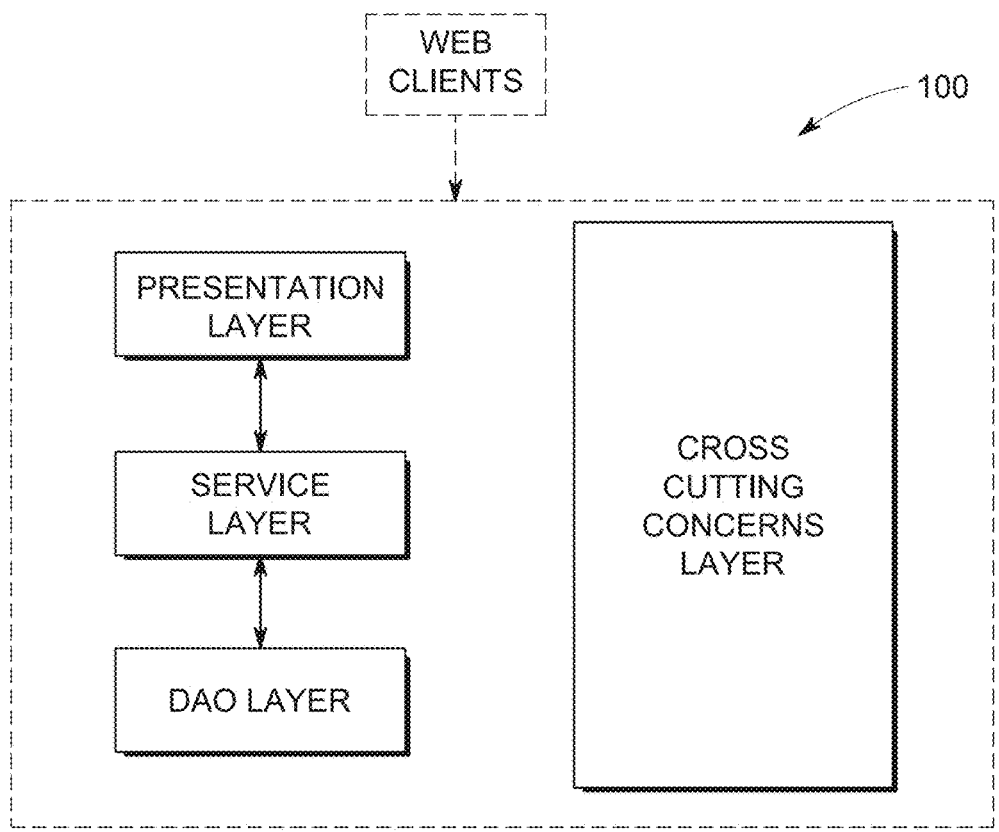
FIG. 1A illustrates an exemplary monolithic multi-layer architecture.

Embodiments are described herein according to the following outline:
  1.0 Terms
  2.0 General Overview
  3.0 Data Collection
    3.1 Logs, Traces and Metrics
  4.0 Graphical User Interface (GUI) Comprising an Application Topology Graph and Distributed Error Stacks
    4.1 Full-Context Service Graph Representing Instrumented and Uninstrumented Services
    4.2 Full-Fidelity Service Level Indicators
    4.3 Distributed Error Stacks
    4.4 Dynamic and Interactive Graphical User Interface
    4.5 Rendering the Full-Context Service Graph
      4.5.1 Inferring Instrumented Services
      4.5.2 Rendering Instrumented and Uninstrumented Services for the Service Graph
  1.0 Terms The term "trace" as used herein refers to a record of the manner in which a single user request, also referred to as a transaction, propagates from one microservice (hereinafter interchangeably referred to as "service") to the next in a distributed application. A transaction is generally described as an end-to-end request-response flow, from the making of the user's initial request to receiving the final response. A transaction often involves the interaction of multiple services. A trace is the record of a transaction and each trace is identified using a unique trace identifier ("Trace ID"). The trace follows the course of a request or transaction from its source to its ultimate destination in a distributed system. A trace may be conceptualized as a highly dimensional structured log that captures the full graph of user-generated and background request execution within an application and contains valuable information about interactions as well as causality.

The term "span" as used herein refers to the primary building block of a trace, representing an individual unit of work done in a distributed system. A trace is composed of one or more spans where a span represents a call within the request. It is appreciated that a call may be to a separate microservice or a function within a microservice. The trace captures the work done by each microservice as a collection of linked spans all sharing the same unique Trace ID. Each component of the distributed system may contribute a span—a named, timed operation representing a piece of the workflow. A span may also include a unique span ID, a service name (e.g., "analytics"), an operation name (e.g., "start"), duration (latency), start and end timestamps and additional annotations and attributes (e.g., tags). The annotations and attributes can describe and contextualize the work being done under a span.

The term "tags" as used herein refers to key:value pairs that provide further context regarding the execution environment and enable user-defined annotation of spans in order to query, filter and comprehend trace data. Tag information (including the 'key' and corresponding 'value') is typically included with each span and there may be different levels of tag information included in a span.

"Global tags" represent properties of a user-request (e.g. tenant name, tenant level, client location, environment type, etc.) and can be extracted from any span of the trace based on configured rules. A global tag for a particular span in a trace may be attributed to the other spans in a trace, because every span within a single trace would comprise the same global attributes. For example, if one span within a trace comprises a tag relating it to a request from a "gold" level "tenant," it may be inferred that the other spans in the same trace are associated with the same request and, accordingly, from the same "gold" level "tenant." Consequently, the "tenant:gold" key-value pair or tag may be attributed to the other spans in the same trace.

"Service-level tags" represent a non-global property of the service or the infrastructure that the associated span (which served a portion of the request) executed on, e.g., service version, host name, region, etc. Spans that executed on different services may have different values for the same tag, e.g. tag "region" may take different values in two services: a span in Service A may be attributed to "region: east" and a span in Service B may be attributed to "region: west". Also, multiple instances of the same service can serve different parts of the request and so the same service may be associated with different service-level tags in relation to those different parts.

"Span-level tags" comprise attributes that are specific to a particular span.

The term "root span" as used herein refers to the first span in a trace. A span without a parent is called a root span.

The term "child span" as used herein refers to a span that follows a root span, including a child of a child.

The term "parent span" as used herein refers to a span that executes a call (to a different service or a function within the same service) that generates another span, wherein the span executing the call is the "parent span" and the span generated in response to the call is the "child span." Each span may typically comprise information identifying its parent span, which along with the Trace ID, may be used to consolidate spans associated with the same user-request into a trace.

A "leaf span" is a childless span. As noted above, each span typically comprises information identifying its parent span. If a span in a trace that is not identified or referenced by an other span as a parent span, the span is considered a leaf span.

A "metric" is a single quantifiable measurement at a specific point in time. Combining the measurement with a timestamp and one or more dimensions results in a metric data point. A single metric data point can contain multiple measurements and multiple dimensions. Metrics are used to track and assess the status of one or more processes. A metric typically comprises a numeric value that is stored as a timeseries.

An "instrumented service" is a microservice within an application that includes instrumentation code to monitor or measure the performance of the microservice and to diagnose errors within the microservice. Instrumented software may be instrumented to emit spans and traces including information pertaining to the performance of the microservice. As used herein, the term "instrumented service" may also include instrumented databases, servers and other network components.

An "uninstrumented service" is a service that does not emit spans. For example, an uninstrumented service may not emit spans because it does not comprise instrumentation code. As used herein, "uninstrumented service" may also include uninstrumented databases, servers and other network components.

2.0 General Overview

One of the fundamental shifts in modern day computing has been the shift from monolithic applications to microservices-based architectures. As previously mentioned, this is the shift from an application being hosted together (e.g. on a single system) to each piece of an application being hosted separately (e.g. distributed). FIG. 1A illustrates an exemplary monolithic multi-layer architecture. A monolithic application is traditionally built as a single unit. The monolithic application consists of a single self-contained unit in which all code exists in a single codebase 100 and in which modules are interconnected. At deployment time, the entire codebase is deployed and scaling is achieved by adding additional nodes.

Figure 1B:
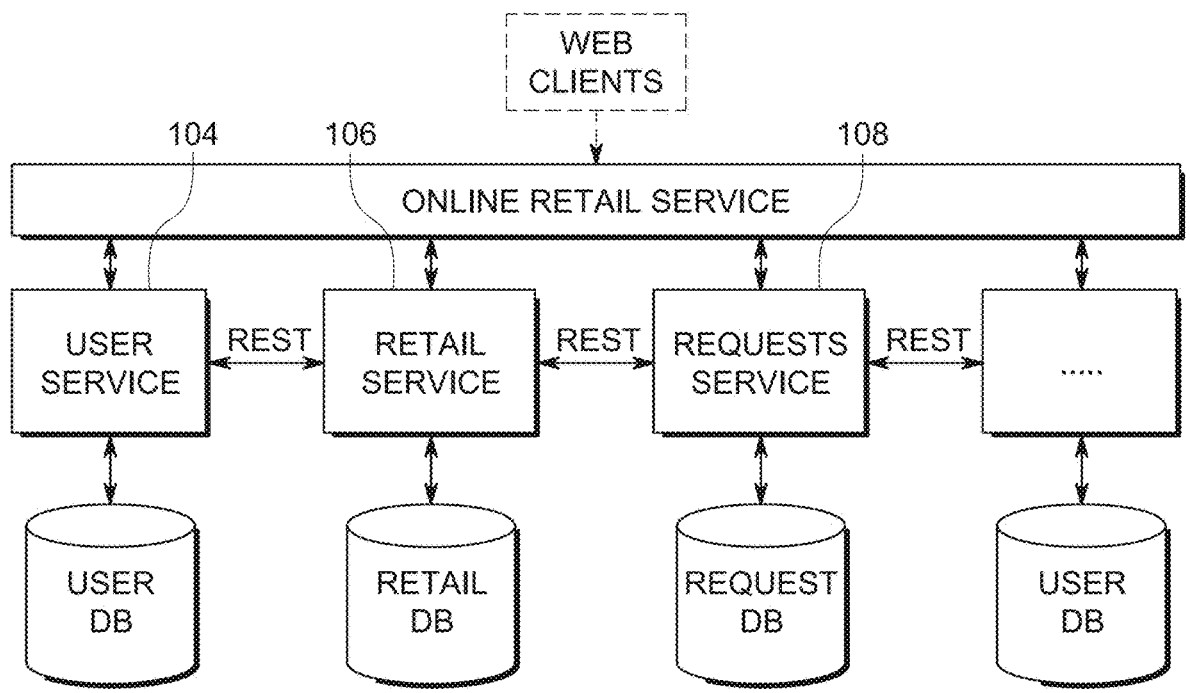
FIG. 1B illustrates an exemplary microservice architecture.

FIG. 1B illustrates an exemplary microservice architecture. A microservice architecture involves the building of modules (e.g., modules 104, 106 and 108) that address a specific task or business objective. As a result, these modules tend to exhibit low coupling and high cohesion. A microservice architecture is often achieved by decoupling a monolithic application into independent modules that each include the components necessary to execute a single business function. These services typically communicate with each other using language agnostic APIs such as Representational State Transfer (REST).

Microservices were created in order to overcome the issues and constraints of monolithic applications. Monolithic applications have a tendency to grow in size over time. As applications become larger and larger, the tight coupling between components results in slower and more challenging deployments. Because of the tight coupling, the potential for a failure of the entire application due to a recently deployed feature is high. In some cases, deployments can take several months to a year, greatly reducing the number of features that can be rolled out to users. This tight coupling also makes it difficult to reuse and replace components because of the effect they may have on other components throughout the application.

Microservices address these issues by being small in scope and modular in design. Modular design results in components being loosely coupled, which offers enormous benefits from the standpoint of being fault tolerant and independently deployable. The result is functionality that can be frequently deployed and continuously delivered. The loosely coupled modules without a central orchestrator in a microservice architecture, however, leads to considerable challenges in terms of monitoring, troubleshooting and tracking errors.

These challenges have led to the rise of observability, a new generation of monitoring, the foundation for which is built on distributed tracing. Distributed tracing, also called distributed request tracing, is a method used to profile and monitor applications, especially those built using a microservice architecture. Distributed tracing helps pinpoint where failures occur and what causes poor performance. Distributed tracing, as the name implies, deals with tracing user requests through applications that are distributed. A trace represents a single user request, also referred to as a transaction, and represents the entire lifecycle of a request as it moves across the various services or components of a distributed system.

Figure 2A:
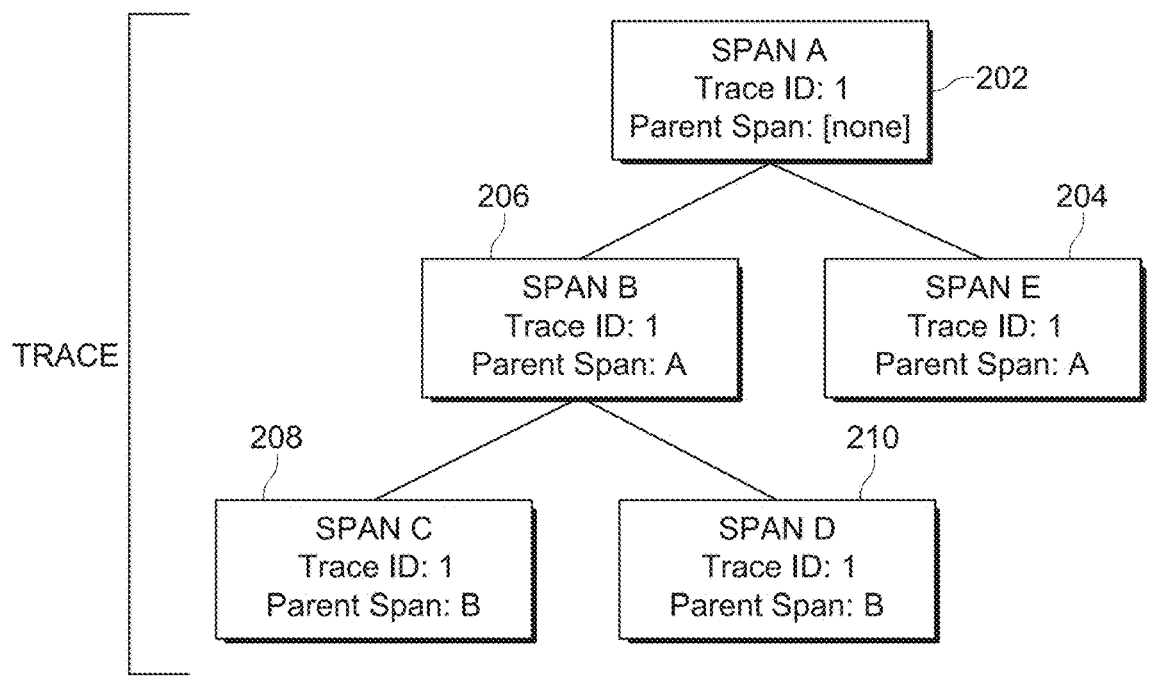
FIG. 2A illustrates an exemplary trace tree.

FIG. 2A illustrates an exemplary trace tree. The first span in the trace tree, Span A 202, is known as the root span. A trace tree always has a root span, which is a span that does not have a parent. It can be followed by one or more child spans. Child spans can also be nested as deep as the call stack goes. Span B 206 and Span E 204 are child spans of the parent span, Span A 202. Further, Span C 208 and Span D 210 are child spans of parent Span B 206.

Figure 2B:
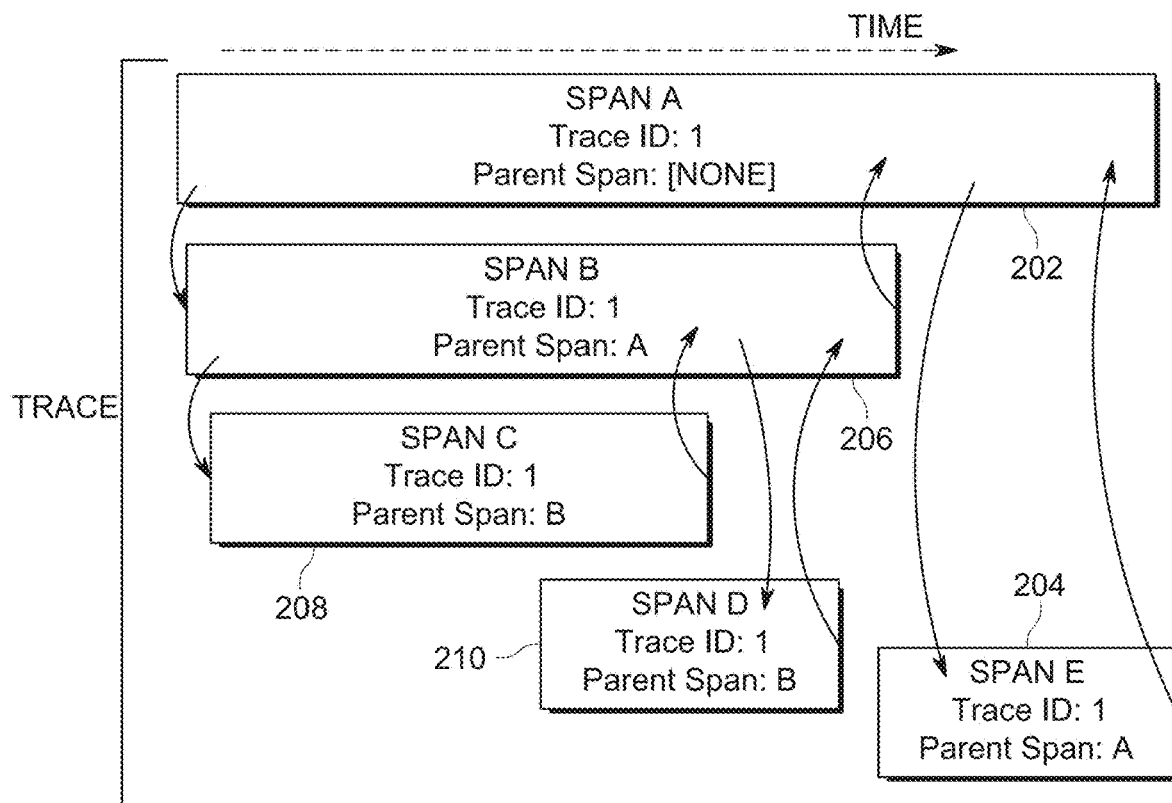
FIG. 2B illustrates an alternate view of the trace from FIG. 2A adjusted for timeline.

FIG. 2B illustrates an alternate view of the trace from FIG. 2A adjusted for timeline. The trace starts with Span A 202, the root spans, where the request starts. When the trace starts, a Trace ID is generated (e.g., Trace ID: 1 as shown in FIG. 2B), which follows the request as it propagates through the distributed system. A new span is generated for each logical chunk of work in the request, where the new span includes the same Trace ID, a new Span ID and the Parent Span ID (which points to the span ID of the new span's logical parent). The Parent Span ID creates a parent-child relationship between spans.

A given request typically comprises one span (e.g. root Span A 202) for the overall request and a child span for each outbound call made to another service, database, or a function within the same microservice etc. as part of that request. For example, in the example of FIG. 2B, Span A 202 is the root span for the overall request and generates several child spans to service the request. Span A 202 makes a call to Span B 206, which in turn makes a call to Span C 208, which is a child span of Span B 206. Span B 206 also makes a call to Span D 210, which is also a child span of Span B 206. Span A 202 subsequently calls Span E 204, which is a child span of Span A 202. Note, that all the spans in the trace also comprise the same Trace ID. The Trace ID along with the Parent Span ID may be used to consolidate the spans together into a trace.

3.0 Data Collection

Distributed tracing data is generated through the instrumentation of microservices-based applications, libraries and frameworks. Instrumented software may be instrumented to emit spans and traces. The spans and traces can be generated according to an industry standard, such as the OpenTracing standard. Other common open source instrumentation specifications include OpenTelemetry and OpenCensus. Each span may be annotated with one or more tags that provide context about the execution, such as the user instrumenting the software, a document involved in the request, an infrastructure element used in servicing a request, etc.

The instrumentation handles the creating of unique trace and span IDs, keeping track of duration, adding metadata and handling context data. Handling context data, also known as context propagation is critical and is responsible for passing context such as the trace ID between function/microservice calls, thereby, enabling an observer to view the entire transaction at each stop along the way. Context propagation may, for example, be based on REST. REST is header-based and requires a transaction to pass headers between service-to-service calls. In order to work properly, the services within a request must use the same context propagation format.

Once the code has been instrumented and context propagation has been implemented using a standard format, the trace data generated by the services can be collected and analyzed to monitor and troubleshoot the microservices-based applications generating the trace data.

Figure 3:
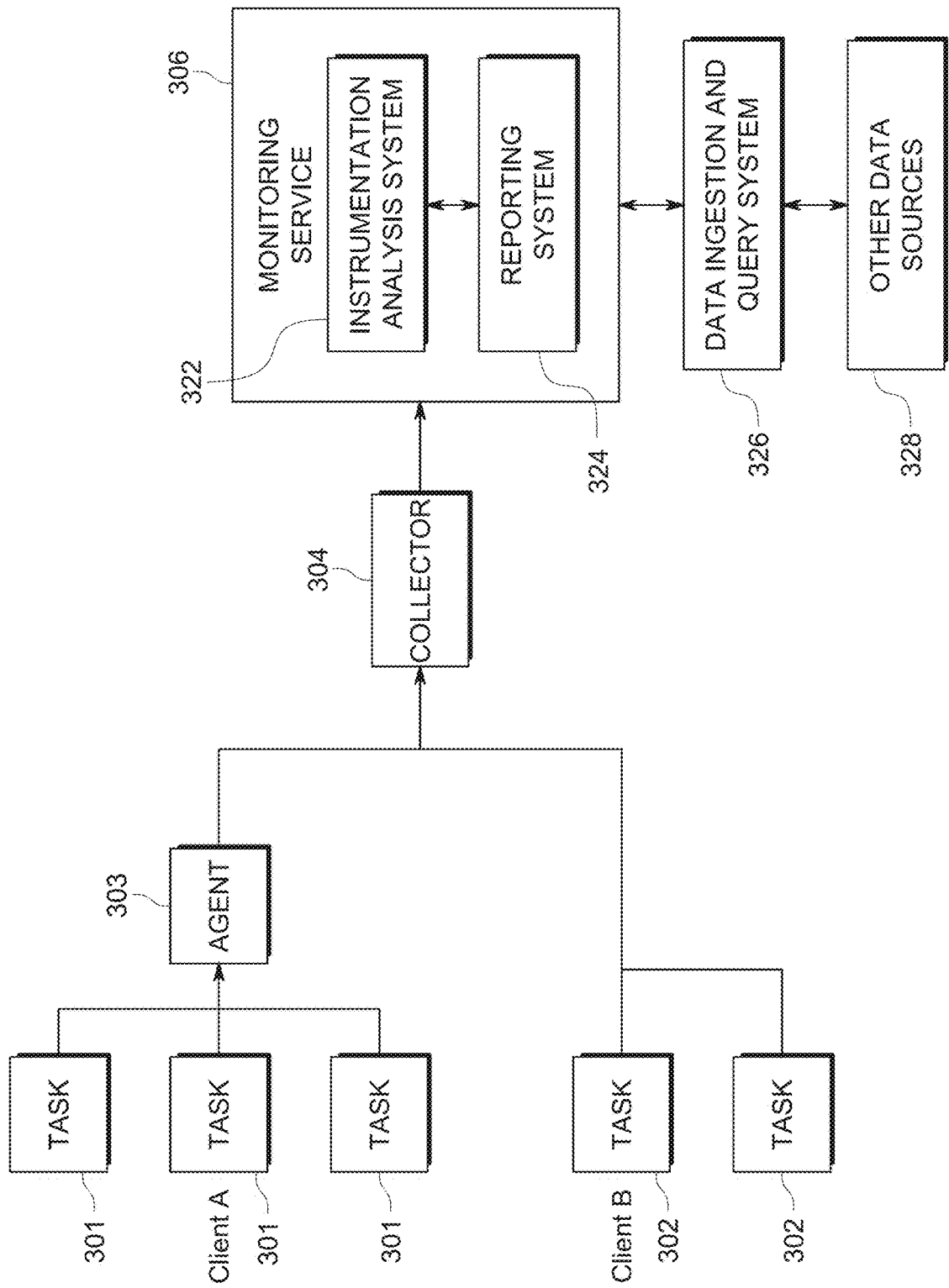
FIG. 3 is a flow diagram that illustrates the manner in which trace data can be collected and ingested for further analysis, in accordance with embodiments of the present invention.

FIG. 3 is a flow diagram that illustrates the manner in which trace data can be collected and ingested for further analysis, in accordance with an embodiment of the invention. Tasks 301 represent client applications that execute within a client data center. Similarly, tasks 302 also represent client applications that execute within a client data center. Tasks 301, for example, run inside a client data center for Client A while tasks 302 run inside a client data center for Client B. Tasks 301 or 302 may comprise services or applications within a client's on-premises ("on-prem") software. Alternatively, they may comprise services or applications running in the cloud, e.g., in an AMAZON WEB SERVICES (AWS) Virtual Private Cloud.

The tasks 301 and 302 may be instrumented using open source or common commercial tracing libraries, from tracing applications (e.g., Jaeger or Zipkin), in-house formats, or auto-instrumentation. Each task may be configured to generate spans that describe the processing of a portion of a request as the request traverses through the various tasks (or services) on the client-side.

It should be noted that while tasks 301 and 302 may comprise instrumented application software, the techniques disclosed herein are not limited to application software but are applicable to other kinds of software, for example, server software, software executing on customer devices, websites and so on. Furthermore, a client device (e.g., a device at a data center for Client A or Client B) may include any computing system that is configured to execute instrumented software, whether or not it is used for development of improved software. For example, the client device may be a computing system used for testing purposes, staging purposes, or any production system executing in an enterprise.

An agent 303 is typically configured at the client-side host or service for receiving spans collected from the various tasks on the client-side and transmitting the spans to a collector 304. An agent may receive generated spans locally using, for example, User Datagram Protocol (UDP). Tasks 302 may comprise instrumented tasks that are not using an agent and may be configured to span directly to the collector 304. While spans may be collected from the client-side tasks without configuring an agent (e.g., in the case of Client B), using an agent can provide benefits including batching, buffering and updating trace libraries.

Batches of span data collected by agent 303 are received at the collector 304. The collector may be implemented within a client's on-prem software or in the cloud (e.g., in an AWS VPC). Traces often generate duplicative data that is not relevant for monitoring or troubleshooting. The collector 304 avoids redundancies by sampling the data before processing and storing it. The collector 304 runs the span data through a processing pipeline and may store it in a specified storage or analytics backend such a monitoring service 306. It should be noted that the collector 304 may interact with the monitoring service 306 through a network (not shown).

In an embodiment, the collector 304 may consolidate data from several client devices and combine the data to send to the monitoring service 306. For example, a collector 304 may comprise a server that receives data streams internally from different client devices and periodically sends the combined data in batch form to the monitoring service 306. This allows efficiency of external communication from the enterprise.

The monitoring service 306 receives and analyzes the span data for monitoring and troubleshooting purposes. It should be noted that, in addition to the monitoring service 306, tracing data might also be simultaneously transmitted to other types of storage and monitoring back-end services (not shown).

The monitoring service 306 may be a Software as a Service (SaaS) based service offering or, alternatively, it may also be implemented as an on-prem application. The monitoring service 306 receives the observability data collected by the collector 304 and provides critical insights into the collected trace data to a client, who may be an application owner or developer.

The monitoring service 306 may be hosted on a computing system that includes one or more processors, memory, secondary storage and input/output controller. The computing system used for hosting the monitoring service 306 is typically a server class system that uses powerful processors, large memory and fast input/output systems.

The monitoring service 306 may comprise an instrumentation analysis system 322 and a reporting system 324. The instrumentation analysis system 322 receives data comprising, for example, trace information, span information and/or values of metrics sent by different clients. As noted previously, task or software programs may be instrumented to generate spans with a common field in their data structures to designate spans that are part of a common trace. For example, the spans may include a trace identifier such that spans with the same trace identifier are a part of the same trace.

The tasks (or software) executing on the client device are configured to send information generated as a result of instrumenting the software to the instrumentation analysis system 322 of the monitoring service 306. For example, the tasks may send span information collected from the various services at the client end to the instrumentation analysis system 322. Alternatively, traces may be sampled to generate metric values, and the tasks may send values corresponding to various metrics as they are generated to the instrumentation analysis system 322. The tasks may send group values of metrics and send them periodically to the instrumentation analysis system 322. Different tasks may send the same metric or different metrics at different rates. The same task may send different metrics at different rates.

In an embodiment, the tasks (e.g., tasks 301 and 302) and the collector 304 may send data to the monitoring service 306 by invoking an application programming interface (API) supported by the monitoring service 306 and the instrumentation analysis system 322.

In one embodiment, a customer name may be specified for the instrumented software. The instrumented software includes the customer name when it identifies a data stream associated with that particular customer. The ability to associate a data stream with a customer allows the instrumentation analysis system 322 to perform customer specific analysis, for example, report on usages of systems for each customer, identify customers reporting more than a threshold number of errors and so on.

In one embodiment, the reporting system 324 within monitoring service 306 may be configured to generate reports, GUIs and/or graphical visualizations to represent the trace and span information received from the various clients. The reporting system 324 may, for example, interact with the instrumentation analysis system 322 to generate a visualization, e.g., a histogram to represent information regarding the traces and spans received from a client.

3.1 Logs, Traces and Metrics

As mentioned above, the shift from monolithic applications to microservices-based architectures has increased the usefulness of analyzing traces in a distributed system. In one or more embodiments, the tracing data may be coupled with log data and/or metrics data, in order to provide users with a more complete picture of the system. For example, the trace data may be coupled with log or other data from a data intake and query system 326. In one embodiment the data ingestion and query system 326 may be comprised within the monitoring service 306.

One example of a data intake and query system 326 is the event-based data intake and query SPLUNK® ENTERPRISE system developed by Splunk Inc. of San Francisco, Calif. The SPLUNK® ENTERPRISE system is the leading platform for providing real-time operational intelligence that enables organizations to collect, index and search machine-generated data from various data sources 328, for example, websites, applications, servers, networks and mobile devices that power their businesses. In one embodiment the other data sources 328 may be associated with the same clients (e.g., Client A and Client B) that generate the trace data received by monitoring service 306.

The SPLUNK® ENTERPRISE system is particularly useful for analyzing data which is commonly found in system log files, network data and other data input sources. One example of the SPLUNK® ENTERPRISE system is described in more detail in U.S. patent application Ser. No. 15/011,651, entitled "TOKENIZED HTTP EVENT COLLECTOR, filed on 31 Jan. 2016, and now issued as U.S. Pat. No. 10,169,434, and U.S. patent application Ser. No. 14/503,335, entitled "GENERATING REPORTS FROM UNSTRUCTURED DATA", filed on 30 Sep. 2014, each of which is hereby incorporated by reference in their entirety. In another example, the data intake and query system 326 may be based on a distributed or cloud-based service, for example, as described in U.S. patent application Ser. No. 15/665,148, entitled "QUERY PROCESSING USING QUERY-RESOURCE USAGE AND NODE UTILIZATION DATA," filed on 31 Jul. 2017, which is hereby incorporated by reference in its entirety.

In one embodiment, the trace data may be ingested into the data intake and query system 326, or may be coupled with outputs from the data intake and query system 326, e.g., from searches that may be based on trace data and run on the data intake and query system 326. In some embodiments, the data intake and query system 326 described above may be integrated with or into the monitoring service 306 that analyzes trace data. The monitoring service 306 may, accordingly, comprise a full suite of services including, for example, analyzing trace data, ingesting and analyzing log data, ingesting metrics data and providing insights generated from the metrics data, including aggregating and/or correlating trace data, log data and metrics data, in order to gain insights into a computing platform.

As described above, the trace data received from the collector 304 may be sent to systems configured to ingest and search data, such as the data intake and query system 326 described above. Additionally, other embodiments may use a stream processor that can perform transformations and other operations on incoming data prior to, concurrently with, and/or as an alternative to, ingestion of the data. In some embodiments, the system may also be configured to ingest metrics data and may be optimized to ingest, query and generate insights from metrics data. One example of such a system is described in more detail in U.S. patent application Ser. No. 15/339,863, entitled "STORING AND QUERYING METRICS DATA," filed on 29 Mar. 2018, which is hereby incorporated by reference in its entirety.

In other embodiments, metrics may be generated by instrumentation (e.g., instrumenting client software and tasks, e.g., tasks 301, 302 etc. as described above) and sent to a SaaS-based processing system, e.g., the monitoring service 306. For example, software may be instrumented to send metrics to a gateway or to another source, where metrics may be aggregated, queried and alerted. Some examples of these systems are described in U.S. Pat. No. 9,846,632, titled, "REAL-TIME REPORTING BASED ON INSTRUMENTATION OF SOFTWARE," filed on Jul. 15, 2015, the entirety of which is herein incorporated by reference. As noted above, the trace data may be paired with data from the data intake and query system 326, metrics generated by instrumentation and other data sources, and correlated in various ways to provide insights. For example, as a broad-based correlation example, the metrics data may be used in a thresholding comparison to determine that there is an issue that needs attention, the trace data may be used to determine which component or microservice requires attention, and log data from the data intake and query system may be used to determine exactly why the component or microservice needs attention. Other correlations and uses for the combination of metrics data, log data and event data are also contemplated herein. As noted above, the various features and services may be provided within an integrated monitoring platform (e.g., the monitoring service 306), wherein the platform comprises, among other things, an instrumentation analysis system (e.g., the instrumentation analysis system 322), a reporting system (e.g., the reporting system 324) and a data ingestion and query system (e.g., the data ingestion and query system 326).

4.0 Graphical User Interface Comprising an Application Topology Graph and Distributed Error Stacks Historically, there have been several challenges associated with implementing an analytics tool such as the monitoring service 306 within a heterogeneous distributed system. One of the challenges in implementing microservice observability with distributed tracing is efficiently aggregating trace information for rendering a GUI that visually illustrates relationships between instrumented services comprised within a client's software architecture and also relationships between the instrumented services and uninstrumented services external to the client's architecture. Conventional observability tools, for example, do not efficiently aggregate tracing information and are, consequently, unable to render a full-context application topology graph that illustrates cross-service relationships between instrumented services within a client's application while also conveying meaningful and accurate information regarding the throughput (e.g. number of requests from one service to another in a given period within a client's application), latency (e.g. response time between two services) and error rate. Furthermore, conventional observability tools are unable to provide developers sufficient graphical or other information regarding the manner in which services within a client's application interact with uninstrumented services external to the client's application.

Another challenge in implementing microservice observability with distributed tracing is pinpointing where errors originated or determining the root cause of an error. In a microservice architecture, an error associated with a particular request may originate in one of the services and might manifest as errors across other services that participate in that request. For example, a front-end service in a microservice architecture may return errors to the user, but the errors may have originated within a back-end service and propagated upstream through the distributed system to the front-end. Conventional methods of tracing are unequipped to efficiently provide sufficient graphical information to help a user visually track the manner in which errors originate and propagate through microservices-based applications, and do not provide enough support for diagnosing problems.

Figure 4:
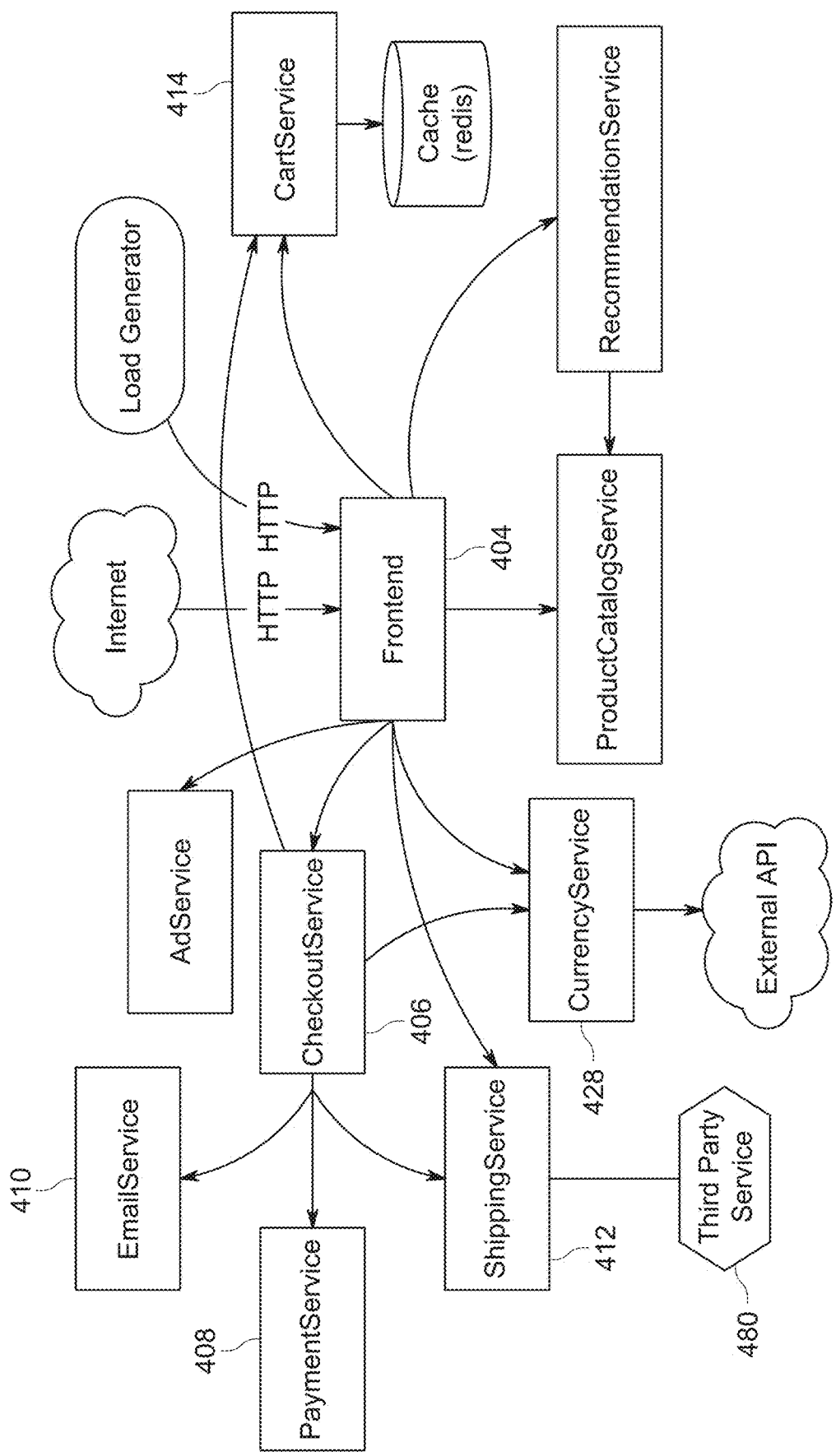
FIG. 4 illustrates an exemplary microservice architecture for an online retailer.

FIG. 4 illustrates an exemplary microservice architecture for an online retailer. A user needing to conduct a transaction may visit the website of the online retailer which would initiate a call to the retailer's Front-end service 404 on a server. The call to the Front-end service 404 may subsequently trigger a chain of calls on the retailer's back-end that would not be transparent to the user. For example, if the user proceeds to complete the transaction by checking out, several calls may be made to the back-end to services such as a CheckOutService 406, a PaymentService 408, an EmailService 410, a ShippingService 412, a CurrencyService 428 and a CartService 414 that may be involved in processing and completing the user's transactions. Note that an action the user performs on the website would typically involve a subset of the services available and a single request would not result in a call to all the services illustrated in FIG. 4.

As mentioned above, a request that the user initiates would generate an associated trace. It is appreciated that each user request will be assigned its own Trace ID, which will then propagate to all the various spans that are generated during the servicing of that request. Each service may process a portion of the request and generate one or more spans depending on the manner in which instrumentation is configured for a respective service. The Trace ID may then be used by the server to group the spans together into a trace with that Trace ID. So, for example, the user's checkout transaction may generate a call at the Front-end service 404, which may in turn generate calls to various microservices including the CheckoutService 406. The CheckoutService 406 may, in turn, generate calls to other services such as the PaymentService 408, the EmailService 410, the ShippingService 412. Each of these calls passes the Trace ID to the respective service being called, wherein each service in the call path could potentially generate several child spans.

It should be noted that a service does not necessarily need to make calls to other services—a service may also generate calls to itself (or, more specifically, to different operations and sub-functions within the same service), which would also generate spans with the same Trace ID. Through context propagation then, each of the spans generated (either by a service making a call to another service or a service making a call to various operations and sub-functions within itself) is passed the Trace ID associated with the request. Eventually, the spans generated from a single user request would be consolidated (e.g., by the collector 304 or the monitoring service 306 of FIG. 3) together using the Trace ID (and the Parent Span IDs) to form a single trace associated with the request.

In some instances, a service, e.g., the ShippingService 412 may generate a call to a third party service or database 480 that is external to the online retailer's microservices architecture. As noted above, conventional distributed tracing tools are not equipped to efficiently aggregate trace information from the online retailer's application and to graphically render the application topology illustrating the cross-service relationships between the instrumented (and/or uninstrumented) services within the retailer's application and relationships with uninstrumented services or databases external to the client's application framework. Further, conventional monitoring tools are not equipped to provide a developer with meaningful and accurate information regarding throughput, latency and error rate in conjunction with a graphic depiction of the application topology.

As noted above, conventional distributed tracing methodologies are also not equipped to allow a developer to visually track the manner in which errors originate and propagate through a microservice architecture such as the one shown in FIG. 4. For example, if an error originates at the PaymentService 408, the error may propagate through the CheckoutService 406 and display an error message to the user through the Front-end service 404. Conventional tracing systems are unable to systematically track and visually indicate to a developer the causal chain of events that result in an error or degraded response in a distributed system.

Embodiments of the present invention efficiently aggregate trace information for rendering a full-context application topology graph (interchangeably referred to as a "service graph" herein) entirely from distributed tracing information. The service graph visually illustrates cross-service relationships between instrumented (and, potentially, uninstrumented services) comprised within a client's application and also relationships between services within the client's application and uninstrumented services external to the client's architecture. Furthermore, because embodiments of the present invention can efficiently aggregate all incoming trace information from the client, the topology graph is able to convey meaningful and accurate information regarding throughput, latency and error rate without the need for sampling.

Embodiments of the present invention advantageously allow clients to visually track the causal chain of operations that resulted in an error or possibly a degraded response being returned to a client in response to a request. Embodiments of the present invention further provide automated analyses that assist application owners and developers in isolating availability incidents and performance bottlenecks. Identifying performance bottlenecks may comprise isolating the component, or layer causing errors or performance issues and the source microservice (including its dimensions or attributes, such as client level, client name, environment type, etc.) causing the errors and outages. Identifying the source microservice(s) of an error is advantageous because often errors propagate upstream without providing a clear indication to an application owner using a monitoring service (such as the monitoring service 306) of where the error started. Embodiments of the present invention further help accelerate root-cause analysis by allowing the ability to an application owner or developer to drill down and get further insight into high-level anomalous behavior by providing exemplar traces for the anomalous behavior.

Figure 5:
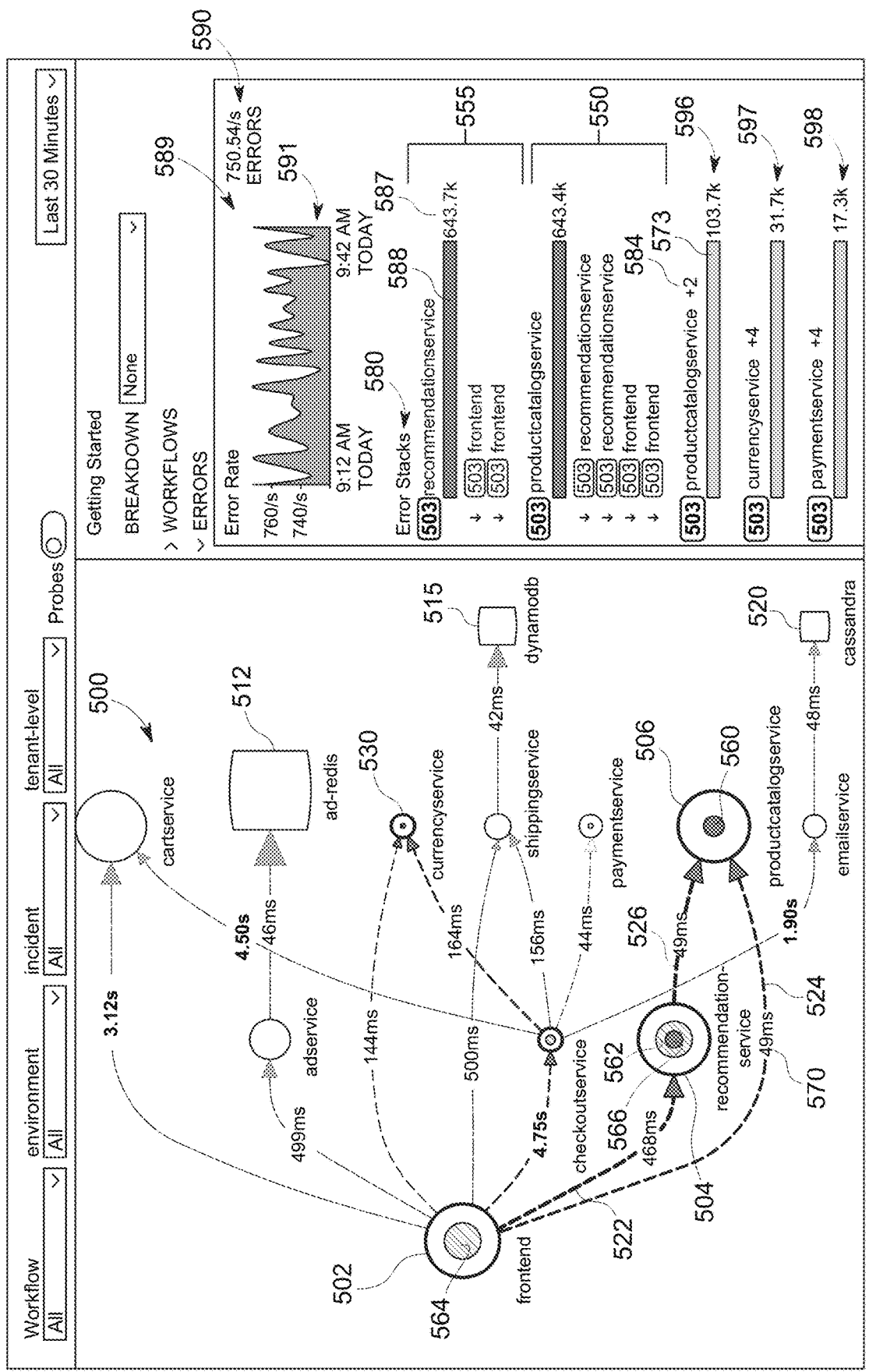
FIG. 5 illustrates an exemplary on-screen graphical user interface ("GUI") comprising an interactive topology graph for an application, which facilitates visualizing cross-service relationships between services, both instrumented and uninstrumented, both comprised within the application and external to the application, in accordance with embodiments of the present invention.

4.1 Full-Context Service Graph Representing Instrumented and Uninstrumented Services Embodiments of the present invention create a full-context application topology graph entirely from distributed tracing information. FIG. 5 illustrates an exemplary graphical user interface comprising an interactive topology graph for an application, which facilitates visualizing cross-service relationships between services, both instrumented and uninstrumented, both comprised within the application and external to the application, in accordance with embodiments of the present invention. The exemplary GUI of FIG. 5 also enables customers to track the causal chain of operations resulting in an error.

FIG. 5 illustrates an on-screen GUI comprising an interactive full-context service graph 500, which is constructed for an exemplary microservices-based application using the distributed tracing information collected from, for example, a collector (e.g., the collector 304 of FIG. 3). Each circular node (e.g., the nodes associated with services 502, 504 and 506 of FIG. 5) represents a single microservice. Alternatively, in an embodiment, a circular node may also represent a group of multiple microservices, where the GUI for the monitoring platform (associated with, for example, monitoring service 306) would provide a client the ability to expand the node into its sub-components.

In an embodiment, services that are part of the client's application may be represented differently from services that are external to the client's application. For example, circular nodes (e.g., the nodes associated with services 502, 504 and 506) of the exemplary application represented by service graph 500 are associated with services comprised within the client's application. By contrast, squarish nodes (e.g., nodes 515, 520, 512) are associated with services or databases that are external to the client's application. It is appreciated that conventional monitoring technologies would not provide adequate means for a client to graphically represent the manner in which services that are part of a client's application relate to services or databases that are external to the client's application.

A user may submit a request at a front-end service 502; the user's request at the front-end service 502 may set off a chain of subsequent calls. For example, a request entered by the user at the front-end may generate a call from the front-end service 502 to a recommendation service 504, which in turn may generate a further call to a product catalog service 506. As noted previously, a chain of calls to service a request may also comprise calls that a service makes to internal sub-functions or operations within the same service.

Each edge in the service graph 500 (e.g., edges 522, 524 and 526) represents a cross-service dependency (or a cross-service call). The front-end service 502 depends on the recommendation service 504 because it calls the recommendation service 504. Similarly, the recommendation service 504 depends on the product catalog service 506 because it makes a call to the product catalog service 506. The directionality of the edge represents a dependency of a calling node on the node that is being called. Each of the calls passes the Trace ID for the request to the respective service being called. Further, each service called in the course of serving the request could potentially generate several spans (associated with calls to itself or other services). Each of the spans generated will then carry the Trace ID associated with the request, thereby, propagating the context for the trace. Spans with the same Trace ID are, thereafter, grouped together to compose a trace.

In some embodiments, the GUI comprising the service graph 500 may be configured so that the nodes themselves provide a visual indication regarding the number of errors that originated at a particular node versus errors that propagated through the particular node but originated elsewhere. For example, as seen in the service graph of FIG. 5, the front-end service 502 makes calls to the recommendation service 504. Errors may be generated at the recommendation service 504 not only in response to calls from the front-end service 502, but also in response to calls that the recommendation service 504 makes to itself (e.g., in response to sub-functions or operations that are part of the recommendation service 504). For such errors, the recommendation service 504 would be considered the "originator" for the error. The recommendation service 504 also makes calls to the product catalog service 506 and these calls may result in their own set of errors for which the product catalog service 506 would be considered the error originator. The errors originating at the product catalog service 506 may propagate upstream to the front-end service 502 through the recommendation service 504. These errors would be observed at the recommendation service 504 even though the recommendation service 504 is not the originator of those errors.

It is appreciated that conventional monitoring technologies would not provide adequate means for a client to distinguish between errors that originated at the recommendation service 504 versus errors that propagated through the recommendation service 504 but originated elsewhere. The service graph 500 allows clients the ability to visually distinguish between errors that originated at the recommendation service 504 as compared with errors that simply propagated through the recommendation service 504. As shown in FIG. 5, the node associated with the recommendation service 504 comprises a solid-filled circular region 566 and a partially-filled region 562, where the region 566 represents errors that originated at the recommendation service 504 while the region 562 represents errors that propagated through the recommendation service 504 but originated elsewhere (e.g., at the product catalog service 506).

Similarly, the solid-filled region 560 within the node associated with the product catalog service 506 represents the errors that originated at the product catalog service 506. Note that all the errors returned by the product catalog service 506 originated at the product catalog service 506. In other words, the product catalog service 506 does not have errors from another downstream service propagating through it because it does not make calls to another service that is further downstream in the execution pipeline. Conversely, the front-end service 502 comprises only a partially-filled region 564 because all the errors observed at the front-end service 502 propagated to it from other downstream services (e.g., the recommendation service 504, a currency service 530, the product catalog service 506, etc.) The front-end service 502 did not originate an error in the example shown in FIG. 5.

Note that in other embodiments solid-filled regions (e.g. 566) and partially-filled regions (e.g. 564) may be represented differently. For example, different shades, patterns, or colors may be used to distinguish these regions from each other. In an embodiment, more detailed information pertaining to the errors including distributed error stacks associated with service graph 500 may be displayed in a on-screen error panel 589, which will be discussed in detail below.

4.2 Full-Fidelity Service Level Indicators

Embodiments of the present invention provide clients with full fidelity service level indicators (SLIs) associated with each of the services. The SLIs are aggregated and extracted for the various services in a microservice architecture so that the behavior of applications may be understood. An SLI is a quantitative measure of some aspect of the level of service that is provided. Most clients consider request latency—how long it takes to return a response to a request—as a key SLI. Other common SLIs include the error rate (often expressed as a fraction of all requests received) and system throughput, typically measured in requests per second. The measurements are often aggregated, e.g., raw trace data is collected over a measurement window and then turned into a value, e.g., a rate, average, or percentile.

In one embodiment, the GUI comprising service graph 500 is interactive, thereby, allowing a developer to access the SLIs associated with the various nodes and edges within the application by interacting with respective portions of the service graph. Referring to FIG. 5, in an embodiment, a client may be able to hover a cursor over various regions of the on-screen displayed service graph 500, including but not limited to the nodes (e.g., nodes associated with services 504, 506 etc.) and edges (e.g., edges 522, 526, etc.), to receive SLI-related information for the associated microservices through a pop-up window or other interface.

Figure 6:
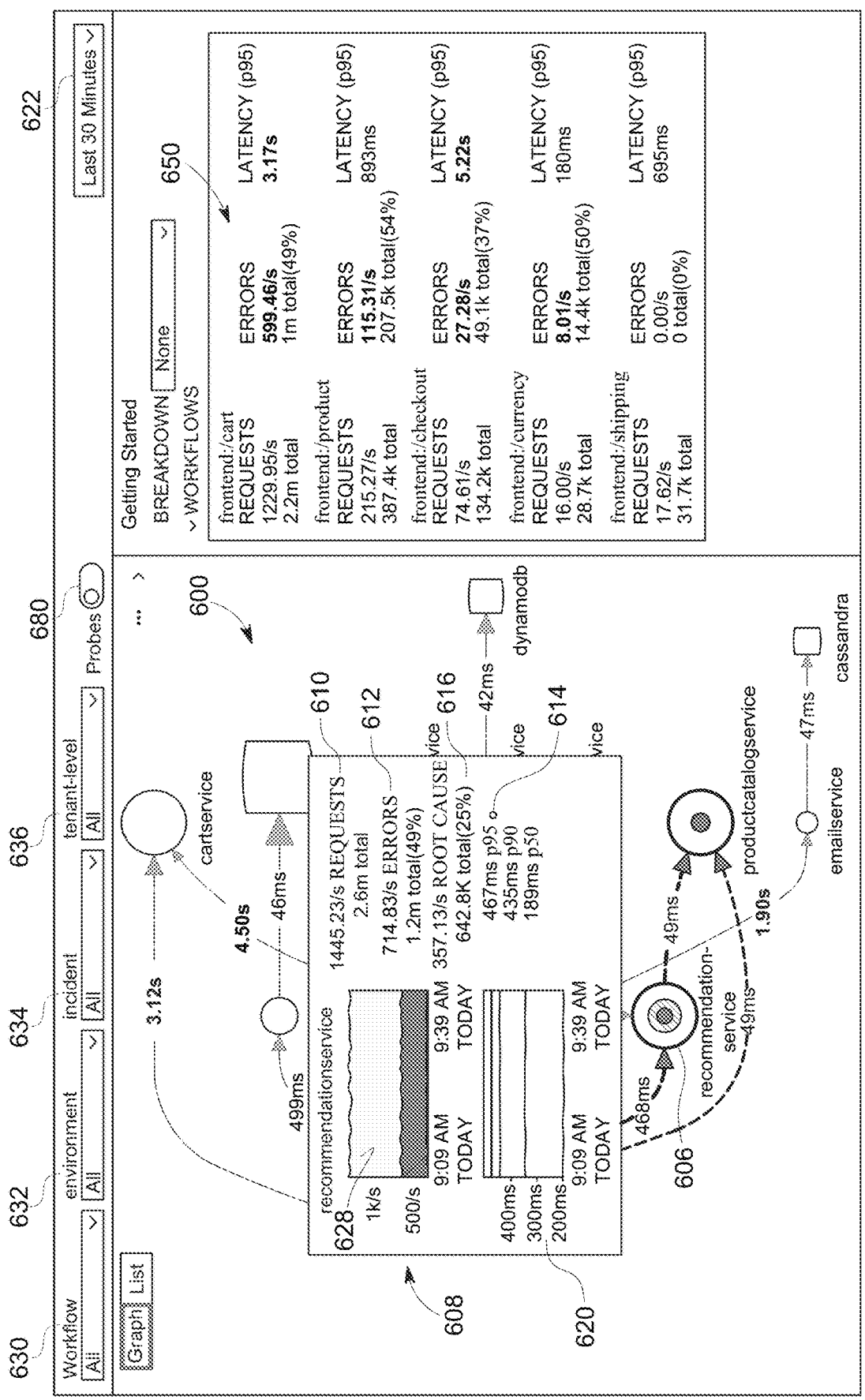
FIG. 6 illustrates an exemplary on-screen GUI showing the manner in which a client can access SLIs pertaining to a service within an interactive topology graph, in accordance with embodiments of the present invention.

FIG. 6 illustrates an exemplary on-screen displayed GUI showing the manner in which a client can access SLIs pertaining to a service within an interactive topology graph, in accordance with embodiments of the present invention. As shown in FIG. 6, when a client hovers the cursor over the node associated with, for example, a recommendation service 606, a pop-up window 608 is overlaid on the service graph 600 comprising SLIs pertaining to the recommendation service 606. Specifically, SLIs pertaining to Requests 610, Errors 612 and Latency percentiles 614 are provided. Furthermore, in an embodiment, information pertaining to Root Cause 616 is also provided to the client.

For example, the Request-related SLIs 610 comprise information regarding the rate of requests and number of requests serviced by the recommendation service 606 during a specific time duration. The time duration over which the SLIs are calculated may be adjusted using drop-down menu 622. The time duration over which SLIs are calculated can vary, for example, from 5 minutes to 3 days. As indicated by the time axis on graph 628, for this example, a time window of 30 minutes (from 9:09 a.m. to 9:39 a.m.) is selected.

In an embodiment, the pop-up window 608 also provides the client with information pertaining to Errors-related SLIs 612. In the example of FIG. 6, the pop-up window 608 provides information regarding the error rate and the total number of errors that occurred during the specified time duration. The client is also provided with information regarding what percentage of the total number of requests resulted in errors.

In an embodiment, the pop-up window 608 also provides the client information pertaining to duration SLIs (e.g. Latency percentiles 614) and a graphical representation 620 of the same. For example, SLI p95 indicates that for 95% of the users, the latency for servicing the requests was less than 467 ms. Latency-related SLIs also include information regarding p90 and p50 percentiles. The graphical representation 620, in the example of FIG. 6, shows the latency information regarding the p95 percentile graphically.

In one embodiment of the present invention, the pop-up window 608 also displays information pertaining to errors for which the selected service was the root-cause. The Root Cause information 616 includes the number of errors for which the selected service (e.g., recommendation service 606 in the example of FIG. 6) was the originator, the associated error rate and the percentage of the total number of requests that it represents. In this way, embodiments of the present invention, in addition to providing clients visual cues for identifying root cause error originators, are also able to provide meaningful and accurate quantitative information to help clients distinguish between root cause-related errors and errors associated with downstream causes.

In the example shown in FIG. 6, there were a total of 2.6 million requests served by recommendation service 606 at a rate of 1445.23 requests/second ("sec"). Of these, 1.2 million of the requests resulted in errors at a rate of 714.83/sec, which represents approximately 49% of the total number of requests. From those 1.2 million errors, the recommendation service 606 was the root cause of 642.8 k errors, which occurred at a rate of 357.13/sec and represented about 25% of the total number of requests. In this way, embodiments of the present invention enable a client to gather critical SLIs pertaining to the recommendation service 606 including an indication of how many of the errors originated at the recommendation service 606.

Trace data received at a monitoring service (e.g., the monitoring service 306) typically includes requests made to a microservices-based system by a user, but it may also include requests from other originators of data such as requests made by a system or a third party service. Probes are "bots" (software applications that run automated tasks or scripts) that generate automated requests (and associated traces) as opposed to requests (and associated traces) that originate from actual user actions. There are many examples of probes including: health checks (e.g. Kubernetes checking the health of a microservice); monitoring (e.g. Prometheus scraping metrics); and others (e.g. getting credentials). Often customers are more interested in analyzing or viewing metrics related to user flows or user requests without the results being polluted by probe requests. Embodiments of the present invention provide clients the ability to exclude probe requests from the displayed aggregated results. The probe exclusion feature is intended to help the application owners and developers distinguish between traces generated from probes and traces generated from actual user requests to an application and its comprising services.

In an embodiment, the user interface may provide a toggle radio button 680 that is a GUI element and allows a client to toggle between displaying and hiding probe related information on the service graph 600. It should be noted that embodiments of the present invention may also provide the ability to toggle between displaying and hiding probe-related information with several different types of GUI elements, e.g., GUIs related to displaying SLI and service health related information.

Figure 7:
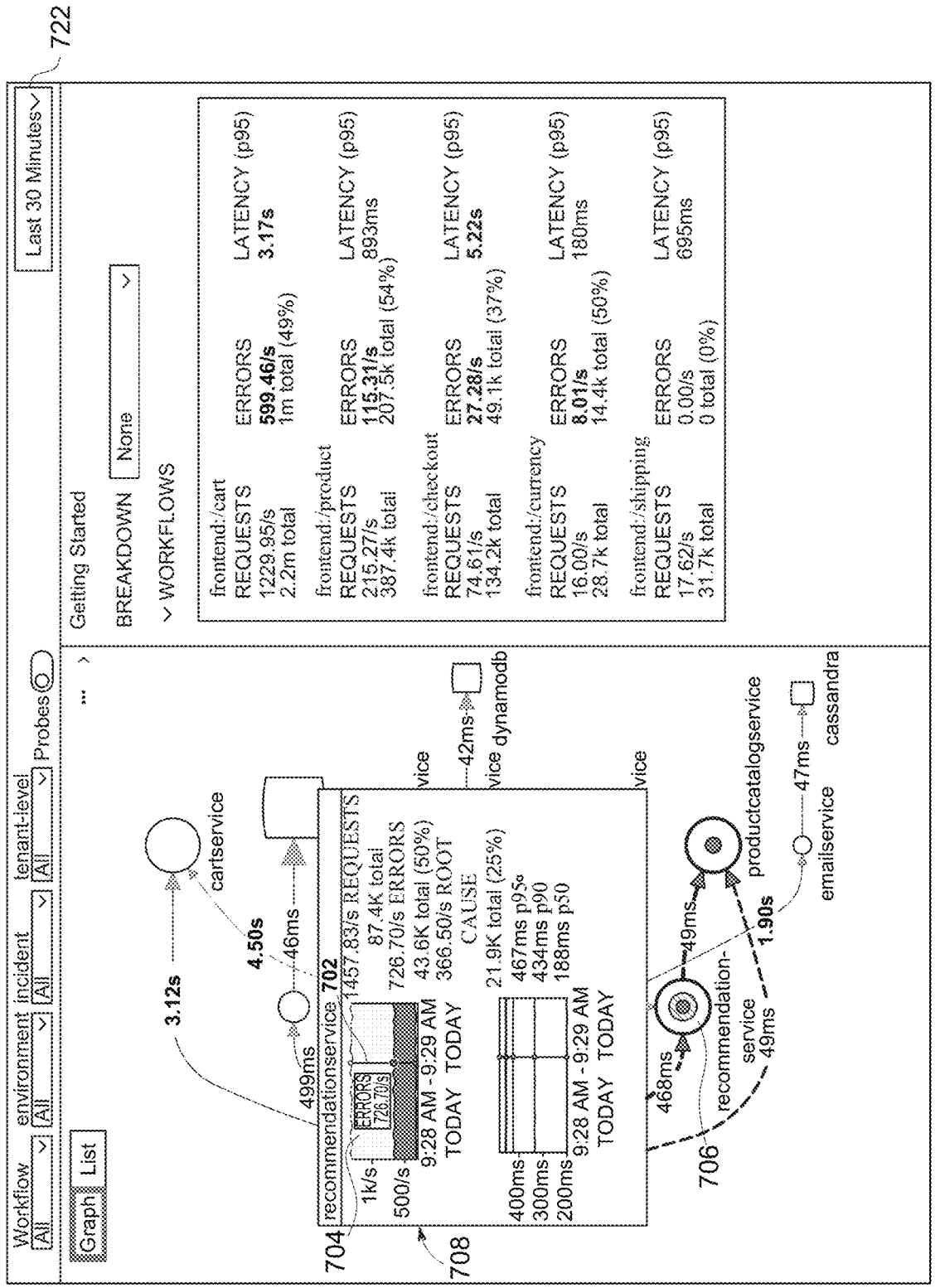
FIG. 7 illustrates an exemplary on-screen GUI showing the manner in which a client may interact with an interactive graphical representation of the SLIs to access further information, in accordance with embodiments of the present invention.

FIG. 7 illustrates an exemplary on-screen GUI showing the manner in which a client may interact with an interactive graphical representation of the SLIs to access further information, in accordance with embodiments of the present invention. As mentioned in connection with FIG. 6, a pop-up window 708 (as shown in FIG. 7) may open on-screen when a client hovers their cursor over a node, e.g., a recommendation service 706. In one embodiment, a client may access SLIs for more granular time windows by clicking within a graph 704. As shown in FIG. 7, by clicking within the graph 704, a user is able to obtain SLIs for a 1-minute duration (9:28 a.m.-9:29 a.m.) even though the time duration selected in a drop-down box 722 is 30 minutes. In an embodiment, a pop-up window 708 may comprise a mouse-over effect (or hover effect) for the graph 704, thereby, allowing the client to move the bar 702 to various positions on the graph and get information regarding error rate for various points in time.

As shown in FIG. 7, the total number of requests and errors (87.4 k and 43.6 k) during the 1-minute duration is much smaller compared to the corresponding request and error counts seen in the pop-up window 608 of FIG. 6. In one embodiment, a client may also be able to double-click within the time-range shown in the graph 704 to load an exemplary trace (e.g. a trace associated with the type of error that occurred) for the particular time-period selected. Loading exemplar traces associated with the error activity allows users to determine the type of problem that is prevalent in the environment. As will be discussed further in connection with FIG. 14, loading an exemplary trace opens up a GUI window with a visual representation of the trace allowing a user to get information pertaining to the spans comprising the trace.

Figure 8:
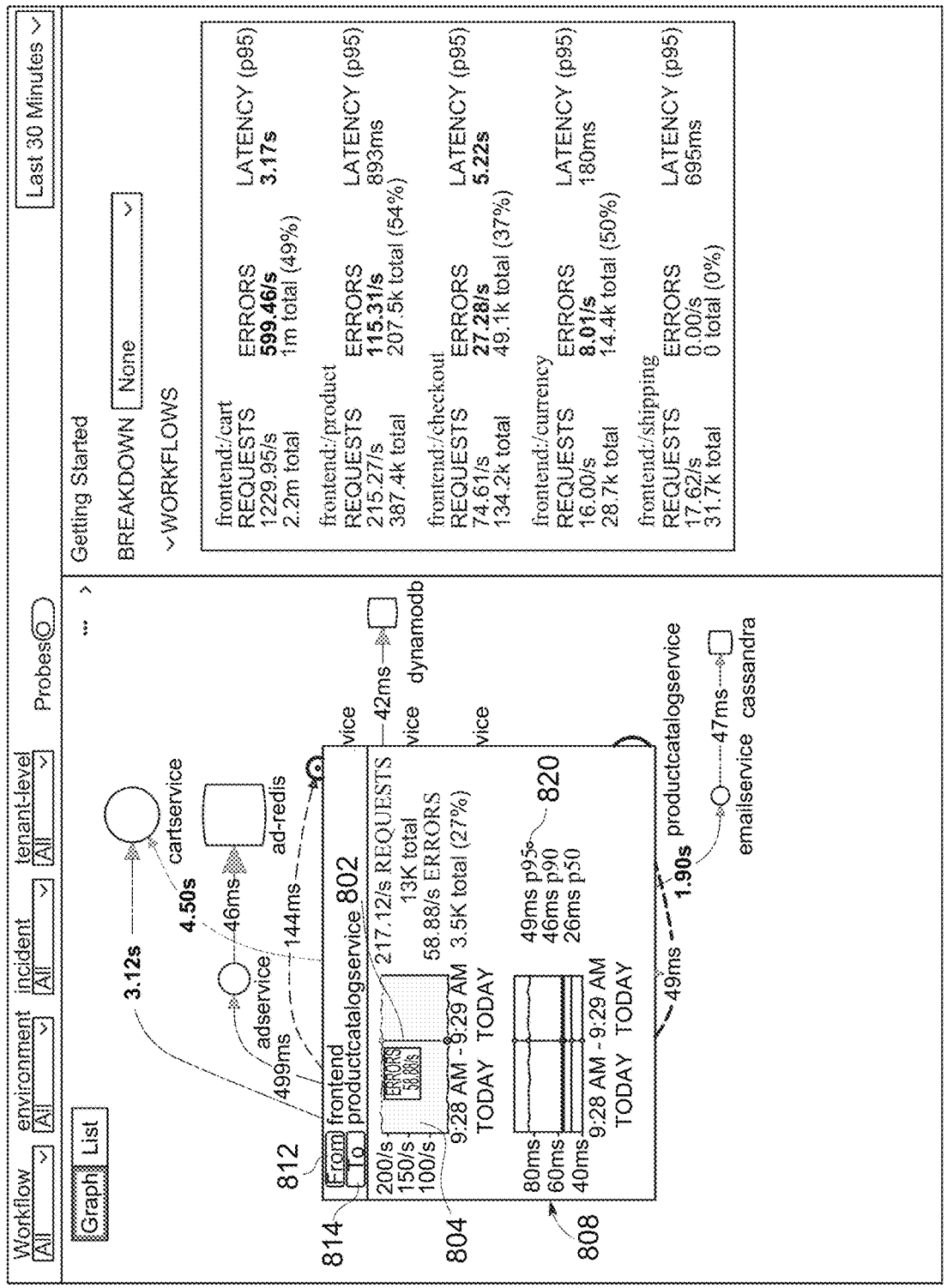
FIG. 8 illustrates an exemplary on-screen GUI showing the manner in which a client can access SLIs pertaining to an edge within an interactive topology graph, in accordance with embodiments of the present invention.

FIG. 8 illustrates an exemplary on-screen GUI showing the manner in which a client can access SLIs pertaining to an edge within an interactive topology graph, in accordance with embodiments of the present invention. As shown in FIG. 8, if a user hovers over or selects a particular edge, e.g., the edge 524 (as shown in FIG. 5) (which represents the cross-service dependency of the front-end service 502 on the product catalog service 506) a pop-up dialog box 808 opens up on-screen that reports SLIs specific to the dependency. The "From" field 812 represents the service that executes the call and the "To" field 814 represents the service that is called (the service that the calling service depends on).

As shown in dialog box 808, SLIs pertaining to the number of requests (or calls) that were made, the number of those that returned in errors and the latency associated with servicing the requests are provided. Further, similar to the feature discussed in connection with FIG. 7, the user has the ability to click at one or more points within graph 804, which visually represents the SLIs, to obtain performance details for more granular windows of time and to access exemplary traces associated with the dependency. In an embodiment, dialog box 808 may comprise a mouse-over effect for graph 804, thereby, allowing the client to move the bar 802 to various positions on the graph and get information regarding the error rate for more granular windows of time.

It should be noted that a latency value 820 of 49 ms shown in FIG. 8 for this particular dependency may be annotated directly on the edge of the service graph. For example, as seen in the service graph 500 of FIG. 5, the edge 524 of the service graph 500 in FIG. 5 indicates the latency value 570 (e.g., 49 ms) directly on the edge in the service graph allowing a client to efficiently gather information regarding latency associated with the dependency. In an embodiment, as seen in FIG. 5, the edges within the application topology graph are annotated with their corresponding latency values. In this way, embodiments of the present invention enable developers to efficiently gather meaningful and accurate information regarding cross-service dependencies directly from the service graph 500.

It should be noted that while the terms "mouse-over effect," "hovering the cursor over," "clicking" and "double-clicking" have been used herein to represent well-known GUI interactions and exemplary actions that a user may take to access the various features, embodiments of the present invention are not so limited to the user interactions—the features of the disclosed embodiments may be accessed in several different ways, including, but not limited to, keyboard shortcuts, right-clicking and selecting an option from a drop-down menu, selecting objects via touch-screen capability, iris tracking, voice commands, anatomical tracking in virtual and/or augmented reality applications, etc.

In some embodiments, different modes of analysis may be supported by the monitoring platform. For example, a first mode of analysis may comprise a "fast and full-fidelity" mode that supports a fast and full-fidelity analysis for a limited set of tags, e.g., the global tags or attributes of the trace. This mode may be useful for clients that need accurate SLI information for a limited set of high-value tags despite the expensive indexing it may entail. A second mode of analysis may comprise a "fast and approximate" mode that provides fast and approximate SLI information on any dimension of data or tag for clients that want to rapidly analyze problem areas in their application. Further, a third mode of analysis may comprise a "slow and full-fidelity" mode where a full-fidelity analysis can be conducted on any dimension of data (or attribute). The "slow and full-fidelity" mode may sacrifice speed for accuracy and may be used by clients that need a more thorough analysis across all dimensions or tags. In one embodiment, the three modes may be supported by the monitoring platform simultaneously.

In some embodiments, information gleaned from the computed SLIs may be used to visually represent nodes and edges within a service graph in a way that allows clients to visually intuit the health of the services and the flow of traffic between services. For example, the service graph 500 of the GUI may be configured to indicate the diminishing health status of a particular node or a particular edge by changing the pattern, shade and/or color of a respective node or edge. A health of a node may be inferred on the basis of how many calls made to a node resulted in an error. Similarly, a health of a dependency (or edge) may be inferred on the basis of how many calls represented by the edge resulted in an error.

Unhealthy nodes (e.g., nodes that fail to meet their Service Level Objectives because they return a high percentage of errors when called) may be represented using a darker shade (or an appropriate color, e.g., red). Further, by way of example, if a particular call to a service results in a high number of errors, the edge associated with the call will also be changed to the darker shade (or appropriate color, e.g. red) or any other visual attribute can be used.

Referencing FIG. 6, node associated with the recommendation service 606 is represented in darker shades (or colors) to indicate that this node was failing to meet its Service Level Objectives (SLOs) (where SLOs comprise a target value or range of values for a service level that is measured by an SLI). This is corroborated by the information in the pop-up window 608 (in FIG. 6), for example, where a client can see that of the requests served by the recommendation service 606, at least 50% result in errors and where the recommendation service 606 was the root cause error originator for at least 25% of the requests.

Similarly, referencing FIG. 5, edge 524 may also be represented using a darker shade (or any other visual attribute) indicating that the associated dependency represented by that edge is failing to meet its SLOs. This is corroborated by hovering over the edge and checking pop-up dialog box 808 (as shown in FIG. 8), which reports that at least 27% of requests were returning errors. As indicated above, the latency value 570 of 49 ms experienced by requests serviced by the product catalog service 506 may also be annotated on the edge 524 in FIG. 5 (wherein the edge represents the dependency of the front-end service 502 on the product catalog service 506).

In one embodiment, the GUI for the service graph may be configured so that the thickness of an edge may be dynamic and thereby represent the number of requests flowing between services. Similarly, in one embodiment of the present invention, the size of the node may be dynamic and thereby represent the amount of traffic the node is receiving. For example, the front-end service 502, the recommendation service 504 and the product catalog service 506 receive more traffic than the currency service 530. Similarly, the dependency (or edge) 522 in FIG. 5 comprises a thicker edge than the dependency (or edge) 524 because the front-end service 502 makes significantly more requests to the recommendation service 504 than it does to the product catalog service 506.

Embodiments of the present disclosure compute full-fidelity SLIs across multiple dimensions in real-time. Further, embodiments of the present invention support high dimensionality and high cardinality tags. In one embodiment, the GUI of FIG. 6 may display one or more attribute (or tag) categories that comprise dimensions that may be varied across service graph 600. For example, attribute categories, such as workflow 630, environment 632, incident 634, and tenant-level 636, may be depicted within the GUI, each of which can correspond to attributes that may be varied to compute SLIs and error-related information for different combinations of the attributes. The categories of dimensions across which the SLIs may be computed, include, but are not limited to, the workflow 630, the environment 632, the incident 634 and the tenant-level 636. Each of the categories comprises a drop-down menu with options for the different dimensions as illustrated in FIG. 9.

Figure 9:
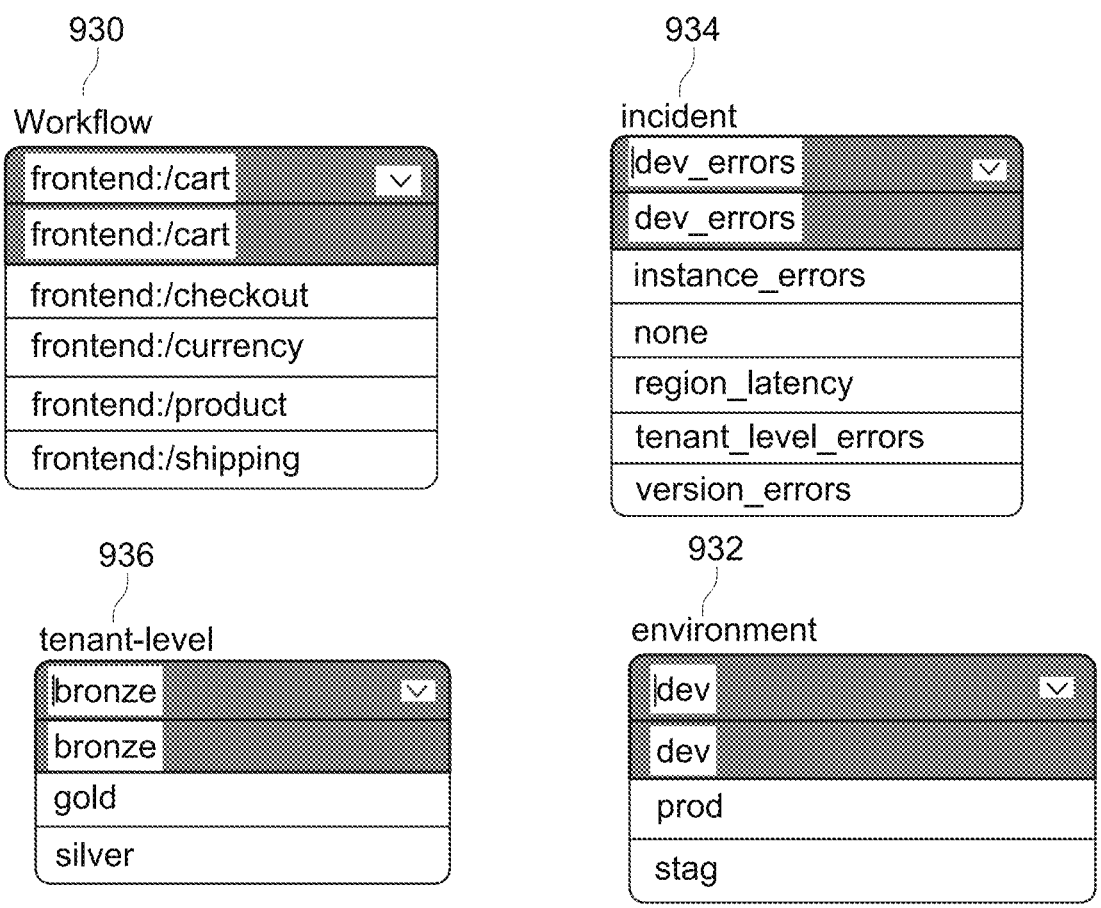
FIG. 9 illustrates exemplary dimensions across which SLIs may be computed, in accordance with embodiments of the present invention.

FIG. 9 illustrates exemplary dimensions across which SLIs may be computed, in accordance with embodiments of the present invention. Drop-down on-screen menu 930, corresponding to workflow, illustrates different workflows specific to the application discussed in connection with FIG. 5. A "workflow" is a type of dimension or attribute of the request that was processed; a workflow may be conceptualized as a type of "global tag" that is attributed to the spans in a given trace. A workflow may, for example, be associated with a type of business action, e.g., "checkout," that is generated on the back-end in response to a request.

Similarly, drop down on-screen menus 934, 936 and 932, relating to incident, tenant-level and environment respectively, provide further dimensions across which SLIs may be computed. SLIs may be computed for each of these dimensions and also for each combination of dimensions. In an embodiment, for each combination of dimensions selected using one or more of the drop-down menus, the client may be able determine the computed SLIs (e.g., by hovering a cursor over the various nodes and edges of the graph after the dimensions have been selected using the drop-down menus shown in FIGS. 6 and 9). In this way, embodiments of the present invention enable a client to slice the service graph 500 across several different attributes.

It should be noted that clients might have different attributes or dimensions that may be of interest for their respective application. In an embodiment, the monitoring platform can be configured to provide insight into client-specific dimensions. Consequently, the specific attributes or dimensions available in each of the drop-down menus may vary by client.

Referencing FIG. 6 again, in an embodiment, the GUI may include a sidebar 650 that may display SLIs across the various workflows. Further, in one or more embodiments, the user may be able to click on the interactive graphical representations of the SLIs (e.g., the graph 628 in FIG. 6) and load exemplary traces associated with the particular combination of dimensions or attributes selected. The manner in which exemplary traces are loaded and appear in the GUI will be discussed further in connection with FIG. 16.

Figure 10:
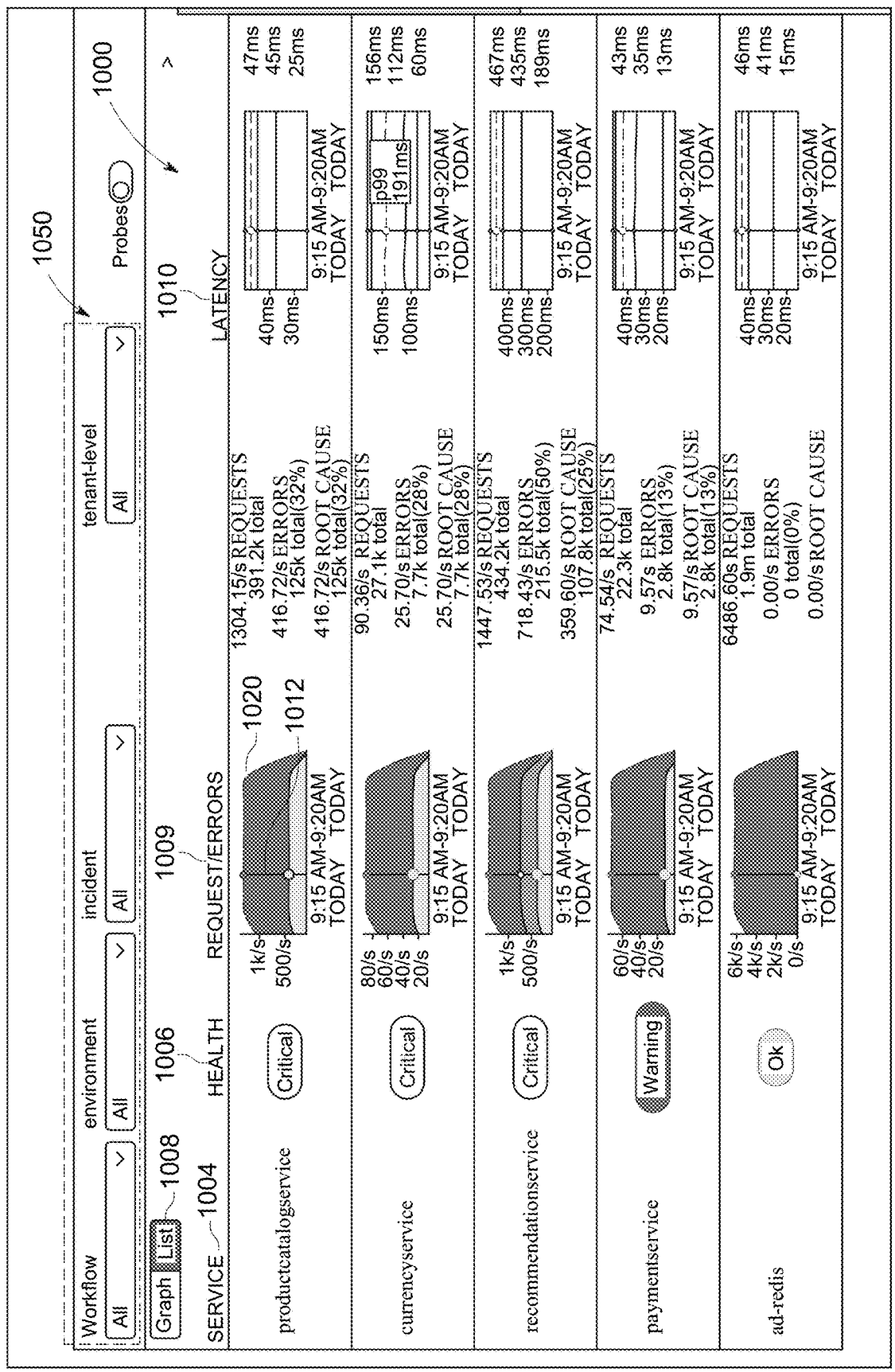
FIG. 10 illustrates an exemplary on-screen GUI showing an alternate method, to the topology graph, of viewing microservices within an application and their associated SLIs, in accordance with embodiments of the present invention.

FIG. 10 illustrates an exemplary on-screen GUI showing an alternate method to the topology graph of viewing microservices within an application and their associated SLIs, in accordance with embodiments of the present invention. The GUI 1000, as shown in FIG. 10, allows the client to select a list view option 1008 instead of a graphical view such as the one illustrated in FIG. 5. The list view provides the client with a columnar list 1004 of the services within the application and their corresponding Health Status 1006, associated SLIs (e.g., Requests, Errors) 1009 and Latency computations 1010. Along with the SLIs 1009, the client is also provided "Root Cause" computations to allow the client to keep track of errors for which a corresponding service was the originator. The various SLIs and Root Cause computations provided to the user are similar to the computations provided to the user, for example, through the pop-up window 708 in FIG. 7; the list view of FIG. 10, however, automatically provides the client with SLI-information within the GUI without needing to select or hover over a service-related node.

Further, an interactive graphical view 1020 of the SLIs is also provided, and similar to features associated with the graph 704 in FIG. 7, a client is able to click within the interactive graphical view 1020 and slide the bar 1012 to access further information. Also, a client may be able to double-click at a point in time within the graph to load up exemplary traces associated with the corresponding service. It should be noted that GUI 1000 also provides the user the ability to select different combinations of dimensions through drop-down menus 1050 in order to compute more particularized SLIs for each of the services.

4.3 Distributed Error Stacks

As noted previously, one of the challenges associated with distributing tracing is diagnosing the root cause of error events. Referencing FIG. 5, for example, for an error originating at the product catalog service 506 that propagates through the recommendation service 504 and eventually comes to the user's attention through the front-end service 502, a conventional monitoring service may not provide an application developer adequate detail regarding where and how the error originated. Embodiments of the present invention address this challenge by using trace error signatures, which is a signature that summarizes a type of error encountered during trace execution and provides the application developer insight into the root cause of the failure.

In order to generate distributed error stacks (interchangeably referred to as "trace error signatures"), embodiments of the present invention track and summarize the errors generated by the various services in a microservices-based application for discrete time-ranges. As will be explained further below, embodiments of the present invention subsequently perform a statistical aggregate of the trace error signatures across different traces to track the number of times in a given time window an error associated with each trace error signature occurred.

To track and summarize the errors generated by the various services in a microservices-based application for discrete time-ranges, embodiments of the present invention need to determine error spans associated with a trace. A span generated by a service is considered an "error span" if it represents an operation that returned an error to its caller (e.g., a microservice that made the call that resulted in the error). An error span may be explicitly marked as an error span during the instrumentation process or may be inferred to be an error span based on some type of heuristics, e.g., if inspecting the span tags for a span returns a HTTP status code that is >=400. In one embodiment, the application owner can customize what constitutes an error span by using a query language. For example, the application owner or developer may want to consider exclusively spans that have an HTTP status code >500 as an error span. A root cause error span is an error span that does not have a child span that is also an error span.

In one embodiment of the present invention, a span error signature (interchangeably referred to as a "span error frame") is created to summarize the type of error returned by the error span to its caller. In order to create a span error signature, embodiments of the present invention map a span to some key attributes that summarize the type of error associated with the span (e.g., a span may either be associated with the root cause originating service for the error or with a service through which the error propagates). An exemplary span error signature may be represented as the following exemplary tuple: {serviceName, operationName, statusCode, isError, isRootCause}, where serviceName represents the name of the service that executes a call resulting in the error span, operationName represents the name of the specific operation within the service that made the call, statusCode represents the status code of the error (e.g., "503"), isError is a 'TRUE/FALSE' flag that indicates whether a span is an error span and isRootCause is a 'TRUE/FALSE' flag that indicates whether the error span is the root cause error span. It should be noted that the tuple used to represent the span error signature may include other identifying dimensions as well. Furthermore, in alternate embodiments of the present invention, the tuple used to represent a span error signature may contain fewer elements. For example, the tuple may comprise the serviceName, statusCode, isError and isRootCause elements.

It should be noted that a span error signature may be calculated even for non-error spans, where the error related fields (e.g., isError, isRootCause) may be empty or comprise 'FALSE' values. In one or more embodiments, trace error signatures are created by identifying one or more root cause error spans associated with a particular trace (from among the error spans for the trace), determining a call path for each identified root cause error span, and, for each call path identified, mapping each span in the call path to a span error signature.

Figure 11:
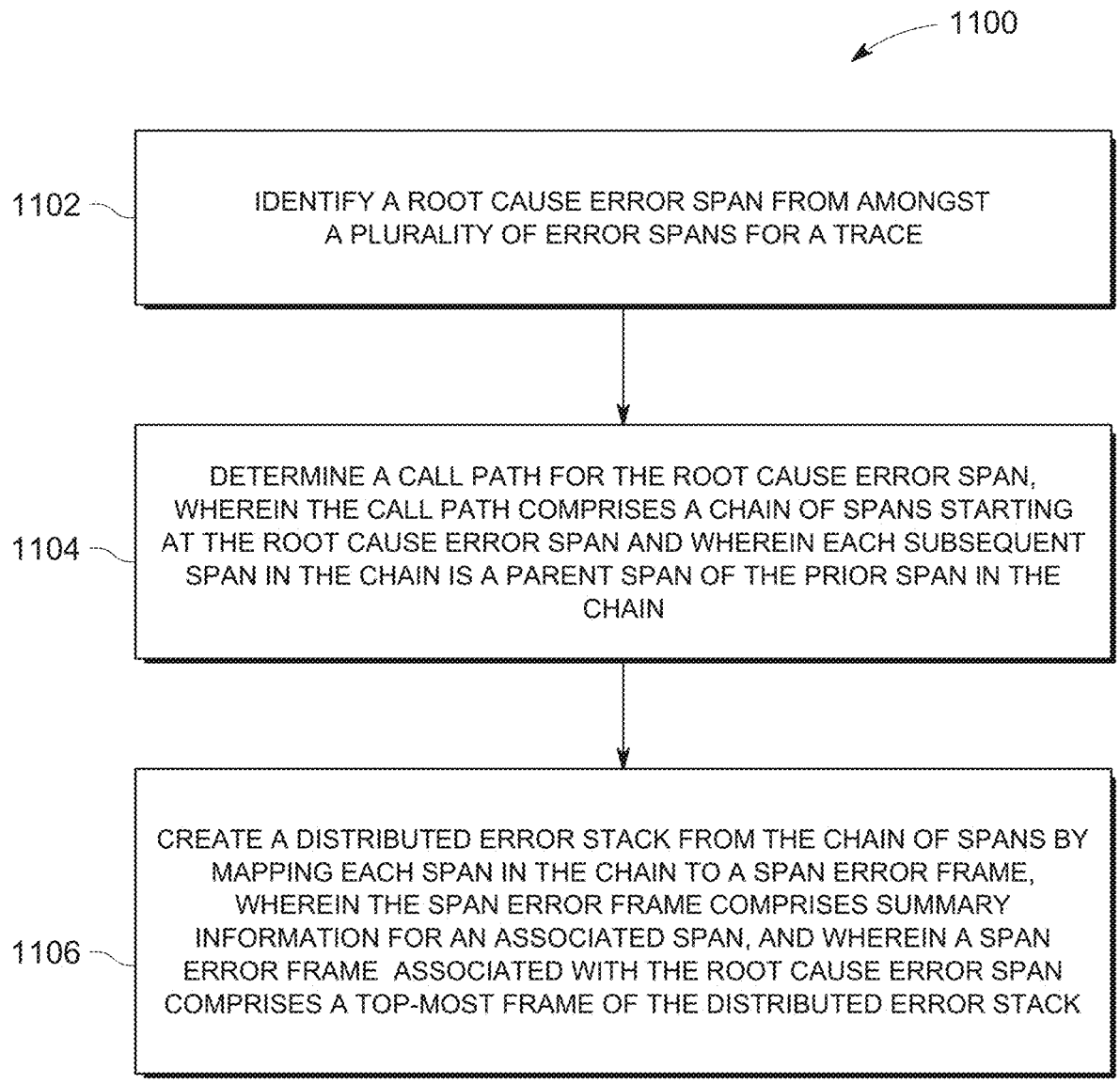
FIG. 11 presents a flowchart illustrating a process to create a trace error signature starting with a root cause error span, in accordance with embodiments of the present invention.

FIG. 11 presents a flowchart illustrating a process to create a trace error signature starting with a root cause error span, in accordance with embodiments of the present invention. Blocks 1102-1106 describe exemplary steps comprising the process 1100 depicted in FIG. 11, in accordance with the various embodiments herein described. In one embodiment, the process 1100 is implemented at least in part as computer-executable instructions stored in a computer-readable medium and executed in one or more processing devices.

At block 1102, a root cause error span is identified from among a plurality of error spans associated with a particular trace. At block 1104, a call path is determined for the root cause error span, wherein the call path comprises a chain (or series) of spans starting at the root cause error span and wherein each subsequent span in the chain is a parent span of the prior span in the chain. Stated differently, each subsequent span error signature belongs to the caller of the previous span in the list (e.g., a given span in the chain has a child-of reference to the subsequent span).

In one embodiment, the chain or series of spans starts from the root cause error span and extends to include the last span in the call path that is an error span and has a parent that is a non-error span. In other words, the span error chain exclusively comprises spans that are error spans.

In a different embodiment, the chain of spans is extended to the root span of the trace regardless of whether it is an error span or not. Extending the chain to the root span may be beneficial in cases where errors manifest as degraded payload at a service (e.g., a front-end service 502 of FIG. 5) even if the root span itself is not marked as an error span. In yet another embodiment, different criteria are also possible; for example, the chain may be extended beyond the last non-error parent span but may stop short of the root span of the trace.

At block 1106, a distributed error stack (or "trace error signature") is created from the chain of spans comprising the call path by mapping each span in the chain to a span error frame (the "span error signature"). As mentioned above, a span error signature comprises summary information for an associated span and can be created for both error and non-error spans. The top-most frame of the distributed error stack will belong to the root cause error span and the bottom-most frame will belong to the last span in the chain (which may either be the root span of the trace or the last span in the call path that is an error span, depending on embodiment).

Accordingly, a trace error signature is a signature that summarizes a type of error encountered during trace execution. In an embodiment, a trace error signature comprises an ordered list of span error signatures starting from the root cause error span to the last span in the call path that is an error span and has a parent that is a non-error span. Accordingly, the first span error signature in the ordered list or the top-most frame in the distributed stack will belong to the root cause error span. In this embodiment, the bottom-most frame comprises the error signature of the parent of the first non-error span. In a different embodiment, the bottom-most frame of the stack comprises the error signature of the root span of the trace regardless of whether it is an error span or not; this may be done, for example, to provide the developer visibility in instances where intermediary services in a call path may have absorbed an error, but the error still manifests at an upstream service as a degraded or incorrect payload.

It should be noted that a single trace can comprise multiple root cause error spans. Accordingly, a single trace can comprise several trace error signatures, one for each chain of spans (that constitute a call path) extending out from one or more root cause error spans. It should be noted, however, that trace error signatures may be unique even if they share the same call path if, for example, the error status codes returned by a service in response to one or more calls in the call path are different. Accordingly, there may be cases where the call path for two different trace error signatures is identical, but the stacks are unique from each other because one or more spans within the call path of one error stack comprises a different error status code from a corresponding span in the other error stack. For example, two call paths may traverse through the same set of services, but the trace error signature may be unique from each other because a span generated by a service in the first call path may generate an error with a "500" status code while a span generated by the same service in the second call path may generate an error with a "503" status code.

In some cases, two or more call paths may converge on the same ancestor but comprise different trace error signatures because they start from a different root cause span. As noted previously, a single trace may comprise multiple trace error signatures because it may have multiple root cause error spans. In one or more embodiments, where each service may generate multiple spans, a single span error frame (or span error signature) is maintained in the distributed error stack for each service even though the service may generate several error spans. The single span error frame that is generated for each service may summarize one or more other frames generated by that service. This is beneficial in instances where an application owner is primarily interested in monitoring communication between services (and not as interested in calls that a service makes to operations and functions within the same service).

Referring back to FIG. 5, for example, a user may enter a request at the front-end service 502, which makes a call to the recommendation service 504, which in turn makes a call to the product catalog service 506. If an error originates at the product catalog service 506, for example, the error may propagate to the recommendation service 504 and eventually to the front-end service 502. Assuming the type of error span generated by the product catalog service 506 comprises a status code of "503," the monitoring platform may generate a span error signature, which may comprise, among other things, the name of the service generating the error span (e.g., product catalog service 506), an operation name executed by the product catalog service 506 that generated the error and the status code "503." An exemplary span error signature created for the error span generated by product catalog service 506 is illustrated in FIG. 12A.

FIG. 12A illustrates an exemplary span error signature, in accordance with embodiments of the present invention. Following the format discussed above, the exemplary span error signature or span error frame shown in FIG. 12A is represented as the following tuple: {serviceName, statusCode, isError, isRootCause}, where serviceName=productcatalogservice, statusCode=503, isError=TRUE and isRootCause=True. Note that the error span illustrated in FIG. 12A is the root cause error span because it does not have a child span that is also an error span—as seen in service graph 500 of FIG. 5, the product catalog service 506 does not make downstream calls to other services.

FIG. 12B illustrates an exemplary call path, in accordance with embodiments of the present invention. Having identified the root cause error span, as shown in FIG. 12A, a call path may be determined. As noted above, the call path comprises a chain (or series) of spans starting at the root cause error span and wherein each subsequent span in the chain is a parent span of the prior span in the chain. The chain may end at the last span in the call path that is also an error span (the first non-error parent span) or at the root span of the trace or it may end at the root span of the trace.

In the current example, referencing FIG. 5 again, the user enters a request at the front-end service 502, which makes a call to the recommendation service 504, which in turn makes a call to the product catalog service 506. For this particular example, the error propagates to the front-end service 502 through the recommendation service 504; accordingly, the call path comprises the root cause error span "product catalog service," followed by "recommendation service," (parent span of the root cause span) which is followed by "front-end service" (parent span of the span generated by recommendation service). In this example, the call made by the front-end service 502 is both the root span of the trace and the last span in the chain that is also the error span.

FIGS. 12C and 12D illustrate two exemplary trace error signatures that may be created from the chain shown in FIG. 12B, in accordance with embodiments of the present invention. For the example of FIG. 12C, each span in the call path of FIG. 12B is mapped to a span error signature. Note that each span comprises a "statusCode" with a value of "503." Comparing the trace error signatures of FIGS. 12C and 12D, note that the two error stacks are unique from each other because even though they comprise an identical call path, the statusCode values returned as the error propagates through the intermediary services is different. For example, the stack in FIG. 12D comprises span error signatures (for "recommendation service" and "front-end" service) with statusCode values of "500," as compared to status code values of "503" for the span error signatures shown in FIG. 12C.

Referencing FIG. 5 again, the exemplary GUI of FIG. 5 comprises the on-screen error panel 589 that visually displays the overall error rate 590 for the application over a given time duration (e.g., 30 minutes from 9:12 a.m. to 9:42 a.m. as shown on an accompanying graph 591) and also displays various distributed error stacks 580 that are aggregated over the same time duration for the application associated with service graph 500. The graph 591 displays the manner in which the overall error rate for the application fluctuates over time. In one embodiment, the graph 591 is interactive, allowing a user to click at a point in time within the graph to gather further information.

Embodiments of the present invention perform a statistical aggregate of the trace error signatures across different traces to maintain the number of times in a given time window an error associated with each trace error signature occurred. Each distributed error stack and its associated count is displayed in the on-screen error panel 589.

For example, the on-screen error panel 589 displays information pertaining to 5 error stacks, a recommendation service error stack 555, a product catalog service error stack 550, a product catalog service error stack 596, a currency service error stack 597 and a payment service error stack 598. Two of the error stacks in the exemplary GUI of FIG. 5, error stacks 550 and 555, are expanded so the frames in the stack are visible to the user. Error stacks may also be collapsed by the client to hide the corresponding frames in each stack. For example, error stacks 596, 597 and 598 are collapsed. For each collapsed stack, the GUI shows a numeric value 584 next to the collapsed stack to indicate the number of frames in the stack.

In an embodiment, each of the error stacks shown in FIG. 5 comprises an interactive heat-map 588 and a count 587 of the number of times that particular type of error occurred during a given time duration. As discussed in connection with FIG. 6, the selected time duration can be adjusted by picking different values from a drop-down menu (e.g., the drop-down menu 622 of FIG. 6). The heat-map 588 is an interactive graphical representation of the error intensity over the selected time duration. Darker shades of the heat-map indicate higher error activity than lighter shades. For example, heat-map 588 is darker than heat-map 573 because heat-map 588 represents 643.7 k errors versus a total of 103.7 k errors associated with heat-map 573. It should also be noted that a heat-map does not have to be a consistent shade of color either—because heat-maps are time-based representations, they may comprise varying shades of color, where darker shades represent durations of high error activity and lighter shades indicate durations of low error activity.

In one embodiment, a client may be provided an interface to filter the distributed error stacks by various criteria. For example, a client may be able to filter and display distributed error stacks that contain specified services. Or, a client may be able to filter distributed error stacks based on if a particular service is associated with a root cause error span (e.g., show distributed error stacks where "recommendation service" is the originator.)

All the error stacks 580 provide information about errors that occur within the application topology represented by service graph 500 for a given time-range. It should be noted that for the exemplary GUI of FIG. 5, the visual representation of the error stacks may not display all the elements that are comprised within the span error frames for the stack. For example, values associated with the operation name are not shown next to each frame in the visual representation of the stack. For each frame of an expanded error stack in FIG. 5, however, the error status code and the service name are displayed. Note that, as discussed in connection with FIGS. 12A-12D, the error status code and the service name are part of the summary information comprised within the span error frames.

The top-most frame of an error stack, as displayed in the GUI, is associated with the root cause error span. The product catalog service error stack 550 in FIG. 5, therefore, indicates that the root cause error span is associated with the product catalog service 506. In the exemplary GUI of FIG. 5, frames associated with the root cause error spans indicate the corresponding error status code with a darker shade as compared to the other layers of the stack.

The "503" error status code generated by the product catalog service 506 (for the product catalog service error stack 550), for example, propagates upstream to the recommendation service 504 as a "503" error before it finally shows up at the front-end service 502 as a "503" error. It should be noted that there are two frames within the product catalog service error stack 550 associated with each of the recommendation service 504 and the front-end service 502. As noted previously, often times a service may execute calls to itself (e.g., different operations within the same service). Accordingly, there may be multiple consecutive frames in an error stack associated with a single service. In an embodiment, a single error frame may be displayed within the distributed error stack for each service even though the service may make multiple calls to itself. The single span error frame that is created for each service may summarize every frame generated by that service.

The recommendation service error stack 555 in FIG. 5 indicates the root cause error span is associated with the recommendation service 504 and comprises a "503" error status code (also indicated as a darker shade of color to represent a root cause error originating service). This error propagated upstream through two different operations at front-end service 502 before it reached the user.

The on-screen GUI of FIG. 5 allows a client to visually correlate the error stack with the service graph to efficiently determine from where the errors are originating and the manner in which they are flowing through the application. For example, given the product catalog service error stack 550, a client may visually inspect the path that the error takes through the application. Referring to the service graph 500, a client may note that the error originates at the product catalog services 506 and propagates to the recommendation service 504 through the edge 526 and, subsequently, to the front-end service 502 via a call represented by the edge 522.

Similarly, for the recommendation service error stack 555, a client may visually take note that an error originating at the recommendation service 504 may propagate to the front-end service 502 via the edge 522. Conventional monitoring tools do not provide application owners GUIs displaying clear indications of where an error started. For example, conventional monitoring tools would not be able to differentiate errors that are originate at the product catalog service 506 but traverse to the front-end service 502 through different paths, e.g., directly from the product catalog service 506 through the edge 524 or propagating through the recommendation service 504 (and associated edges, 522 and 526). Both errors originate at the product catalog service 506, but they follow different call paths as they propagate upstream to the front-end service 502.

Similarly, conventional monitoring tools may also not be able to distinguish between errors associated with the recommendation service error stack 555 as compared with the product catalog service error stack 550. Both types of errors terminate at the front-end service 502 providing an error status code of "503." Nevertheless, the error associated with the recommendation service error stack 555 originates at the recommendation service 504 while the error associated with the product catalog service error stack 550 originates at the product catalog service 506. Without the root cause analysis capabilities provided by embodiments of the present invention, a user may not be able to distinguish between the two different originators of errors.

4.4 Dynamic and Interactive Graphical User Interface

Embodiments of the present invention provide a dynamic and interactive user interface, including the service graph 500 and the distributed error stacks 580. As explained in connection with FIGS. 6, 7 and 8 each node and edge of the service graph can dynamically and interactively provide a developer with accurate information regarding latency, throughput and error rate. Further, a client can drill down further into a node or edge and obtain exemplary traces related to a respective node or edge. Additionally, the distributed error stacks 580 also provide error-related information that is updated dynamically. The distributed error stacks also enable a user to drill down further into a given error stack to obtain trace and span level information associated with the services implicated in an error.

Using the dynamic service graph 500, the distributed error stacks 580 and the various associated features, embodiments of the present invention advantageously enable a client to visually analyze the entire application and provide actionable insights that greatly accelerate problem isolation and root cause analysis while preserving context as an application owner navigates through the monitoring platform. The service graph 500 provided by embodiments of the present invention may be constructed entirely using distributed tracing information. Constructing the service graph 500 using entirely using distributed tracing information allows the service graph to dynamically convey accurate information regarding throughput, latency and error rate. Embodiments of the present invention, unlike conventional monitoring services, are able to ingest 100% of all incoming traces in real-time using a streaming pipeline, where the ingested traces are used to construct the service graph and distributed error stacks, and provide other analytics information.

As noted earlier, the service graph 500 also supports high dimensionality and high cardinality tags providing a developer the ability to advantageously analyze the graph across several dimensions of data (e.g., multiple categories of dimensions including, but not limited to, the workflow 630, the environment 632, the incident 634 and the tenant-level 636 as discussed in connection with FIG. 6). Additionally, the service graph provides several key health indicators overlaid on each node providing the user the ability to efficiently perform a root cause failure analysis across the entire architecture.

Figure 13:
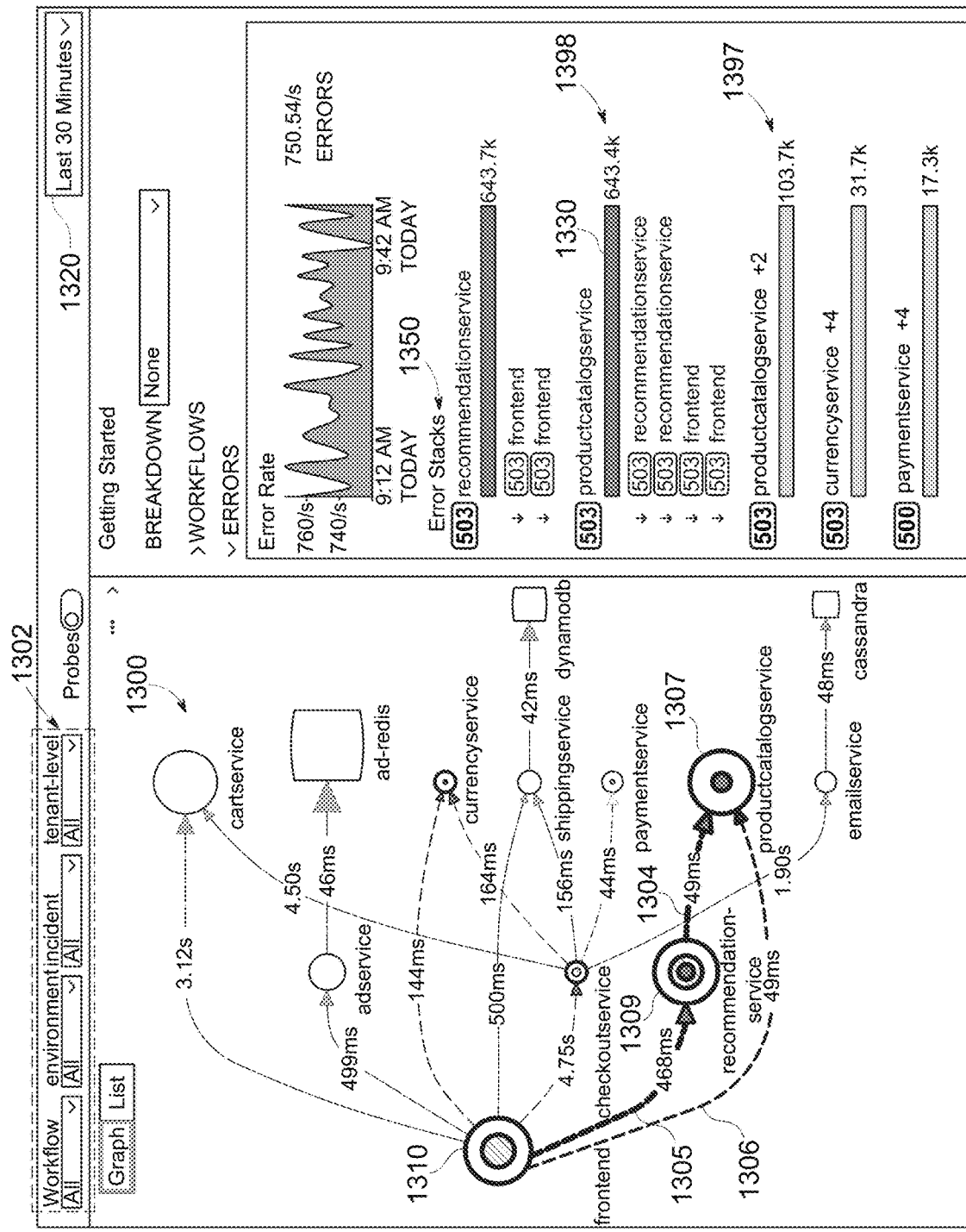
FIG. 13 illustrates an exemplary on-screen GUI showing the manner in which the service graph can visually indicate a trace associated with a selected error stack, in accordance with embodiments of the present invention.

FIG. 13 illustrates an exemplary on-screen GUI showing the manner in which the service graph can visually indicate a trace associated with a selected error stack, in accordance with embodiments of the present invention. As also discussed in connection with FIG. 5, the exemplary on-screen GUI shown for FIG. 13 comprises an on-screen service graph 1300 with associated distributed error stacks 1350 displayed alongside the service graph 1300. Both the service graph 1300 and the distributed error stacks 1350 can be analyzed at the same time across multiple different dimensions of data, in accordance with embodiments of the present invention. As previously discussed in connection with FIGS. 6 and 9, drop-down menus 1302 provide a range of different dimensions, and the service graph 1300 and error stacks 1350 may be analyzed across one or more different combinations of these dimensions for a given duration of time (selected using an exemplary drop-down menu 1320).

Referencing FIG. 6, for example, a user may want to see the error stacks and their associated metrics (e.g., count) for "tenant-level=gold" where the "environment=prod" for the "last 30 minutes" (as selected using the drop-down menu 1320). Alternatively, the user may want to view error stacks associated with different workflows, e.g., "frontendicheckout" or "frontend:/cart." In this way embodiments of the present invention are able to pinpoint error causality across multiple dimensions and services and, also, in time.

In an embodiment, a user can hover a cursor over or select a particular error stack, which results in the accompanying service graph 1300 brightening or otherwise highlighting the nodes and edges associated with the trace for the selected error stack (while dimming other nodes and edges). As shown in the exemplary GUI of FIG. 13, if the client, for example, selects or hovers over an error stack 1398, the call path associated with the error stack 1398 will be highlighted while the remaining nodes and edges in graph 1300 will be dimmed. Accordingly, nodes (e.g., nodes 1310, 1309, 1307) and edges (e.g., edges 1305, 1304) associated with the error stack 1398 (where product catalog service associated with node 1307 is the error originator and front-end service is the ancestor node 1310 the error propagates to) are highlighted.

Note that, in an embodiment, an edge 1306 may also brightened in FIG. 13 even though the edge 1306 is associated with a different error stack 1397. Because both error stacks 1397 and 1398 may be extracted from the same trace, the service graph 1300 will highlight the nodes and dependencies associated with the trace. This feature allows a client to advantageously use the service graph 1300 to visually ascertain whether one or more error stacks are related and also to inspect the call paths for the error stacks. In this way embodiments of the present invention advantageously provide a visual experience to a client that is aligned with a client's intuitive model of the application.

In accordance with some embodiments, a client is provided the capability of loading up exemplar traces for each distributed error stack. For example, in an embodiment, a client may be able to click at a point of time within an interactive given heat-map (e.g., a heat-map 1330) to load up an exemplar trace.

Figure 14:
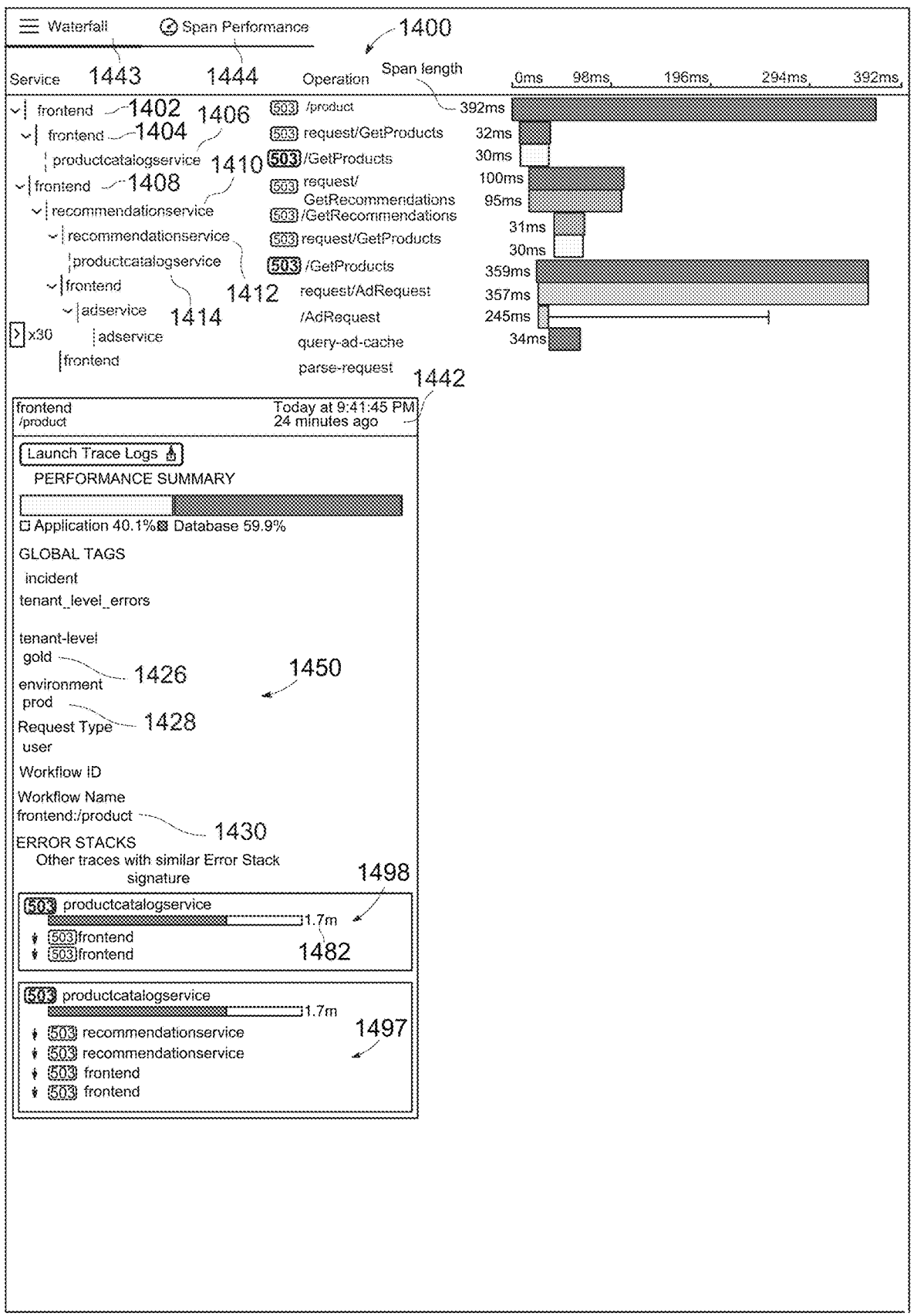
FIG. 14 illustrates an exemplary on-screen GUI showing a visual representation of the exemplary trace highlighted in the service graph of FIG. 13, in accordance with embodiments of the present invention.

FIG. 14 illustrates an exemplary on-screen GUI showing a visual representation of the exemplary trace highlighted in the service graph of FIG. 13, in accordance with embodiments of the present invention. Note that the client is given options to view this trace using a "waterfall" view 1443 or by "span performance" 1444. The exemplary trace representation of FIG. 14 is generated in accordance with a client selection of the option for "waterfall" view 1443.

A trace 1400 of FIG. 14 may be loaded, for example, when a user double-clicks a particular point in time within the heat-map 1330. The trace 1400 is an exemplary trace associated with both error-stacks 1397 and 1398. The GUI of FIG. 14 indicates a time 1442 for when this particular exemplar trace was captured. As seen in FIG. 14, the loaded trace 1400 is associated with two unique trace error signatures. A client is visually able to determine that the trace comprises two unique error stacks (e.g., associated with root cause error spans 1406 and 1414) because the error status codes "503" returned by the spans 1406 and 1414 are displayed highlighted with a different pattern or darker shade of color (or any other attribute) as shown in FIG. 14 as compared to the other spans in the trace. Error status code displayed with lighter shades or patterns indicate that the associated error spans received the error from another span and are not root cause error spans.

Note that even though both the error spans 1406 and 1414 are generated by product catalog service, they are associated with different respective error stacks because the call path for each is different. For example, the call path associated with the error stack 1397 (displayed as a collapsed stack in FIG. 13) starting at the root span for the trace is as follows: "frontend" service executing operation "/product" (generating a root span 1402) makes a call to operation "request/GetProducts" within "frontend" service (generating a span 1404), which in turn makes a call to operation "/GetProducts" within "product catalog service," which ends up generating the root cause error span 1406. Referring to service graph 1300, it is clear that this call path is associated with the nodes 1310 and 1307 and, also, the edge 1306.

Similarly, the call path associated with the error stack 1398 starting at the root span for the trace is as follows: "frontend" service executing operation "/product" (generating the root span 1402) makes a call to operation "request/GetRecommendations" within "frontend" service (generating a span 1408), which in turn makes a call to operation "/GetRecommendations" within "recommendation service," (generating a span 1410), which then makes a call to operation "request/GetProducts" within "recommendation service," (generating a span 1412), which finally makes a call to operation "/GetProducts" within "product catalog service" thereby generating the root cause error span 1414.

Note that the operation and the service that generates the root cause error spans 1406 and 1414 are the same (namely operation "/GetProducts" within service "productcatalogservice"), but they are associated with different error stacks because the call path for each is different. Referring to the service graph 1300, it is clear that the call path for the root cause error span 1414 is associated with the nodes 1310, 1309 and 1307, and the edges 1305 and 1304.

The exemplary GUI of FIG. 14 also shows an expanded view of the two trace error signatures 1498 and 1497 associated with the trace 1400. (Note that these are the same trace error signatures as 1397 and 1398 of FIG. 13). Note that the trace error signatures 1498 and 1497 may have different error counts 1482 associated with each that may be displayed alongside the error stack in the GUI.

Further, note that for each span, the GUI of FIG. 14 includes a visual indication of the total span length, e.g., the root span 1402 is 392 ms long. The exemplary GUI of FIG. 14 also illustrates that the trace 1400 is associated with several global tags 1450, e.g., a tenant-level tag 1426, a workflow tag 1430 and an environment tag 1428. As noted previously, with global tags, even if one span in the trace is associated with a particular global tag, the tag can be attributed to the other spans in the same trace. The global tags associated with a particular trace allows a user to filter and group error-related information and SLIs across several different dimensions of data (as discussed in connection with FIGS. 6 and 9).

Note that loading exemplar traces associated with a particular error stack advantageously allows users to gather further information regarding a type of problem that is prevalent in the environment. In conventional monitoring platforms, the user is unable to determine whether an error is caused by a one-off trace or is an example of behavior that is prevalent in the environment.

Figure 15:
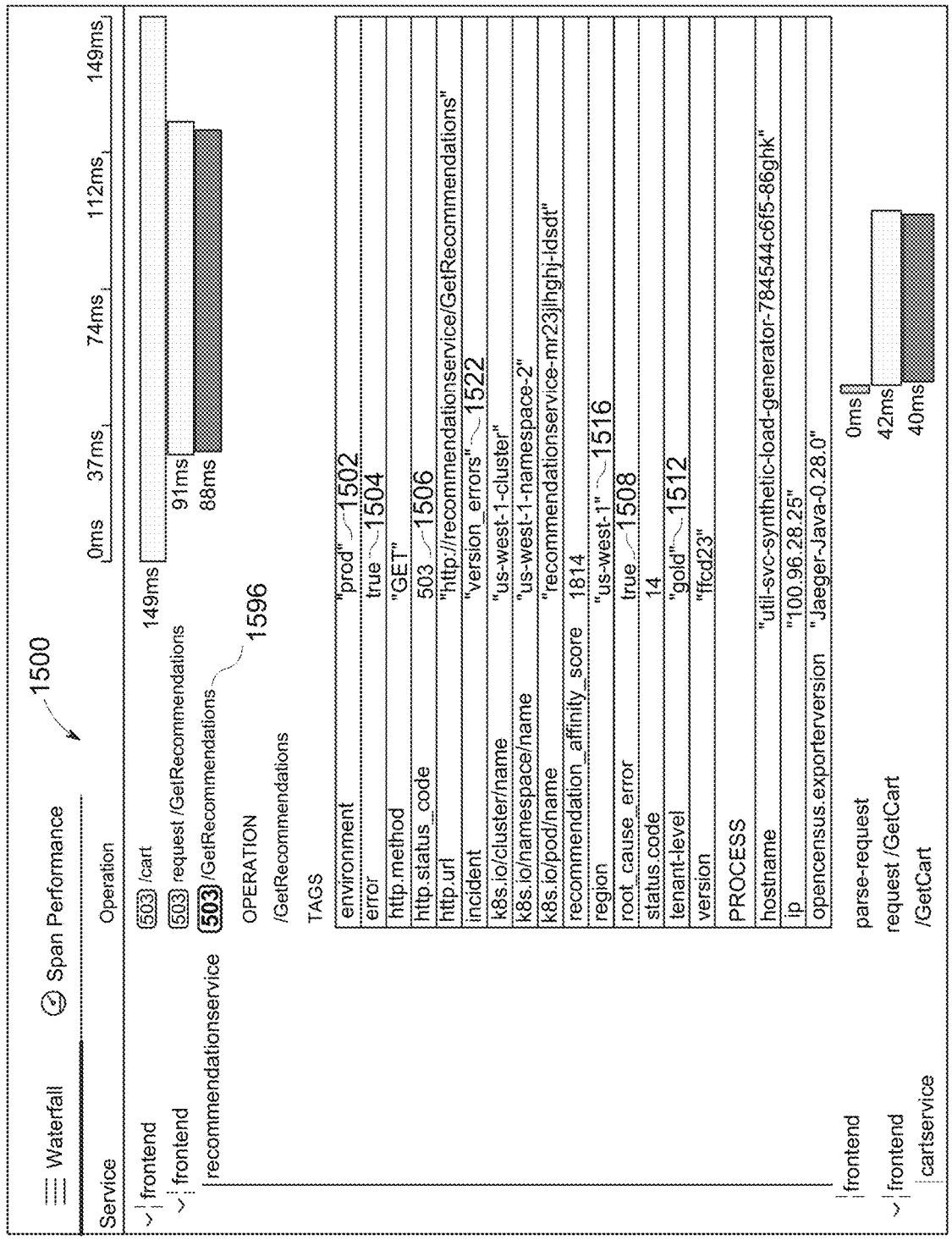
FIG. 15 illustrates the manner in which each span within a trace may be expanded to view its associated tags, in accordance with embodiments of the present invention.

FIG. 15 illustrates the manner in which each span within a trace may be expanded to view its associated tags, in accordance with embodiments of the present invention. The exemplary trace 1500 illustrated in FIG. 15 comprises a root cause error span 1596 associated with "recommendation service." In an embodiment, each span in the trace may be expanded to view its associated tags.

The tags associated with each span may be global tags, service-level tags or span-level tags comprised within a span error frame. For example, a tag 1502 ("environment"="prod"), a tag 1522 ("incident"="version_errors") and a tag 1512 ("tenant"="gold") are global tags, which are associated with a user request. Global tags associated with one span in the trace 1500 can be attributed to every span within trace 1500. Accordingly, the values for the tags 1502, 1522 and 1512 may be inherited by each span in trace 1500. Other types of tags, e.g., service-level tags, do not share the inheritance property of global level tags. For example, a service-level tag 1516 (region="us-west-1") may comprise different values for one or more spans in a trace. Finally, tags 1506 (comprising error status code values), 1508 (root_cause_error flag) and 1504 (error span flag) are span-level tags that comprise heuristics to identify an error span and determine a span error frame for the associated error span.

Figure 16:
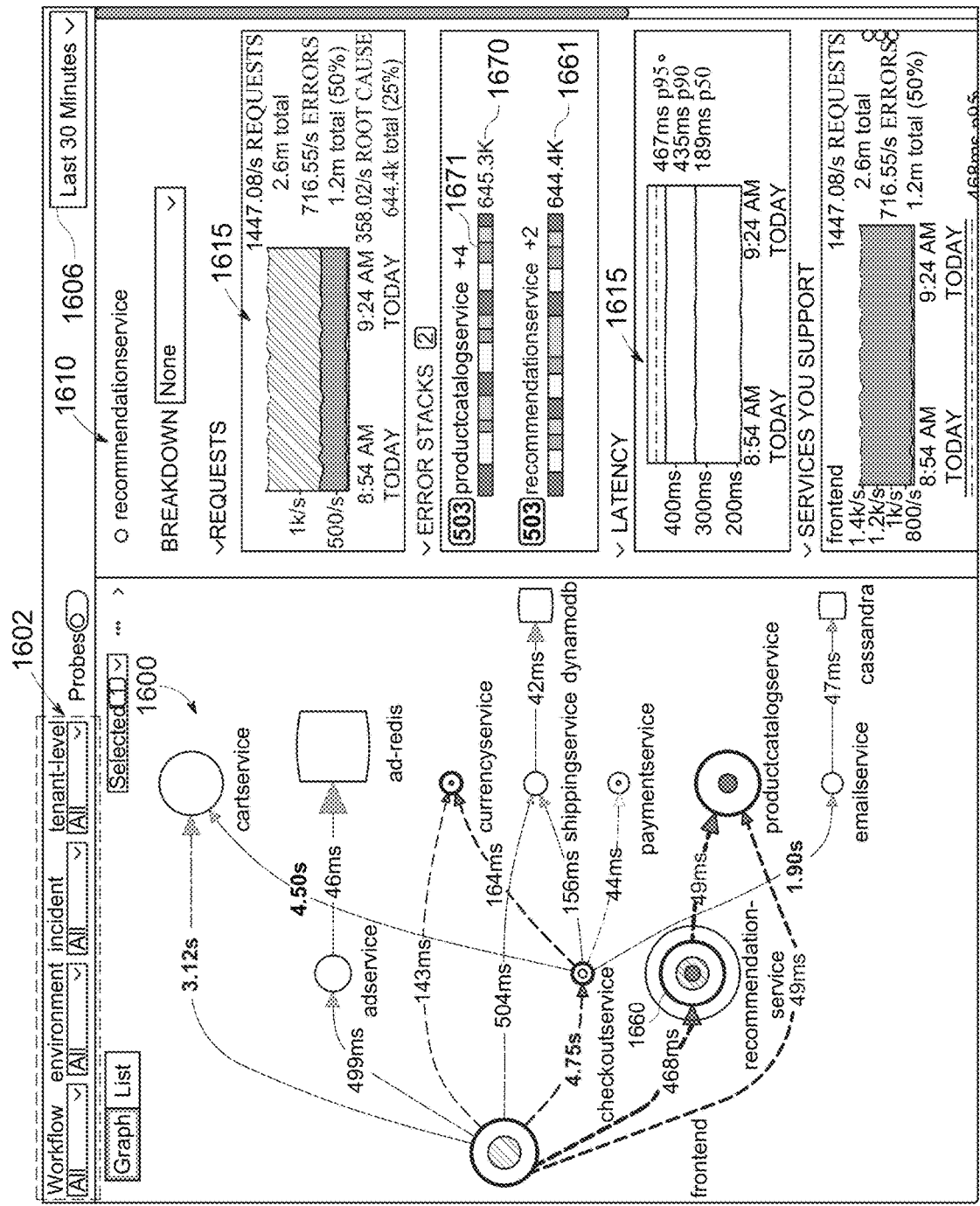
FIG. 16 illustrates an exemplary on-screen GUI showing the manner in which a service node in the application topology graph may be selected to provide error information specific to the selected node, in accordance with embodiments of the present invention.

FIG. 16 illustrates an exemplary on-screen GUI showing the manner in which a service node in the application topology graph may be selected to provide error information specific to the selected node, in accordance with embodiments of the present invention. In an embodiment, selecting one of the service nodes within the application topology provides error information in a side-bar 1610 associated with the selected node. For example, selecting the recommendation service 1660 will provide error information in the side-bar 1610 specific to the recommendation service 1660 for a given duration (as selected using an exemplary drop-down menu 1606). This information may comprise SLIs 1615 associated with the recommendation service 1660. The side-bar 1610 may also comprise distributed error stacks 1661 and 1670 for the selected service node, where the selected service may either be associated with the root cause error span (as is the case with the error stack 1661) or where the selected service may be associated with one of the frames in the error stack (as is the case with the error stack 1670).

It should be noted that heat-maps (e.g., heat-map 1671) for each error stack are visually dynamic and indicate the intensity of error activity for the selected time duration. For example, darker shades of color for portions of the heat-map indicate higher error activity than lighter shades. Alternatively, instead of shades of color, different patterns may be used for different levels of error activity. Furthermore, the heat-maps are interactive, where, for example, double-clicking the heat-map 1671 may open up a widow showing an exemplary trace associated with the corresponding error stack. Further, drop-down menus 1602 provide a range of different dimensions; the service graph 1600 and the error stacks (e.g. 1661 and 1670) may be analyzed across one or more different combinations of these dimensions for a given duration of time (selected using the exemplary drop-down menu 1606).

4.5 Rendering the Full-Context Service Graph

As noted previously, the service graph 500 visually illustrates cross-service relationships between instrumented (and, potentially, uninstrumented services) comprised within a client's application and also relationships between services within the client's application and uninstrumented services external to the client's architecture. Additionally, because embodiments of the present invention can efficiently aggregate all incoming trace information from the client, the topology graph is able to convey meaningful and accurate information regarding throughput, latency and error rate without the need for sampling.

4.5.1 Inferring Uninstrumented Services

Referencing FIG. 3, trace information received at the monitoring service 306 from the collector 304 typically comprises span information from instrumented services within a client's application. If a client's application comprises services that have not been instrumented or if services within the client's application communicate with external services or databases (from third parties) that are also not instrumented, the monitoring service 306 will not receive spans related to such services. As noted previously, an uninstrumented service is a service that does not emit spans, for example, because the service may not comprise instrumentation code. Because an uninstrumented service does not emit spans, there may be no spans received at the monitoring service 306 from a client associated with the uninstrumented service. Conventional methods of analyzing tracing data do not have the capability of providing developers meaningful information regarding such services or rendering an application topology graph that indicates the manner in which these services are related to the instrumented services.

Embodiments of the present invention are able to infer uninstrumented services, both internal and external to a client's application, using information from spans generated by instrumented services within the client's application. Referencing FIG. 3, the instrumentation analysis system 322 may, for example, analyze the tags of the incoming spans from instrumented services received from the collector 304 and perform rule-checking on the tags and associated values to determine if an uninstrumented service needs to be inferred.

Figure 17:
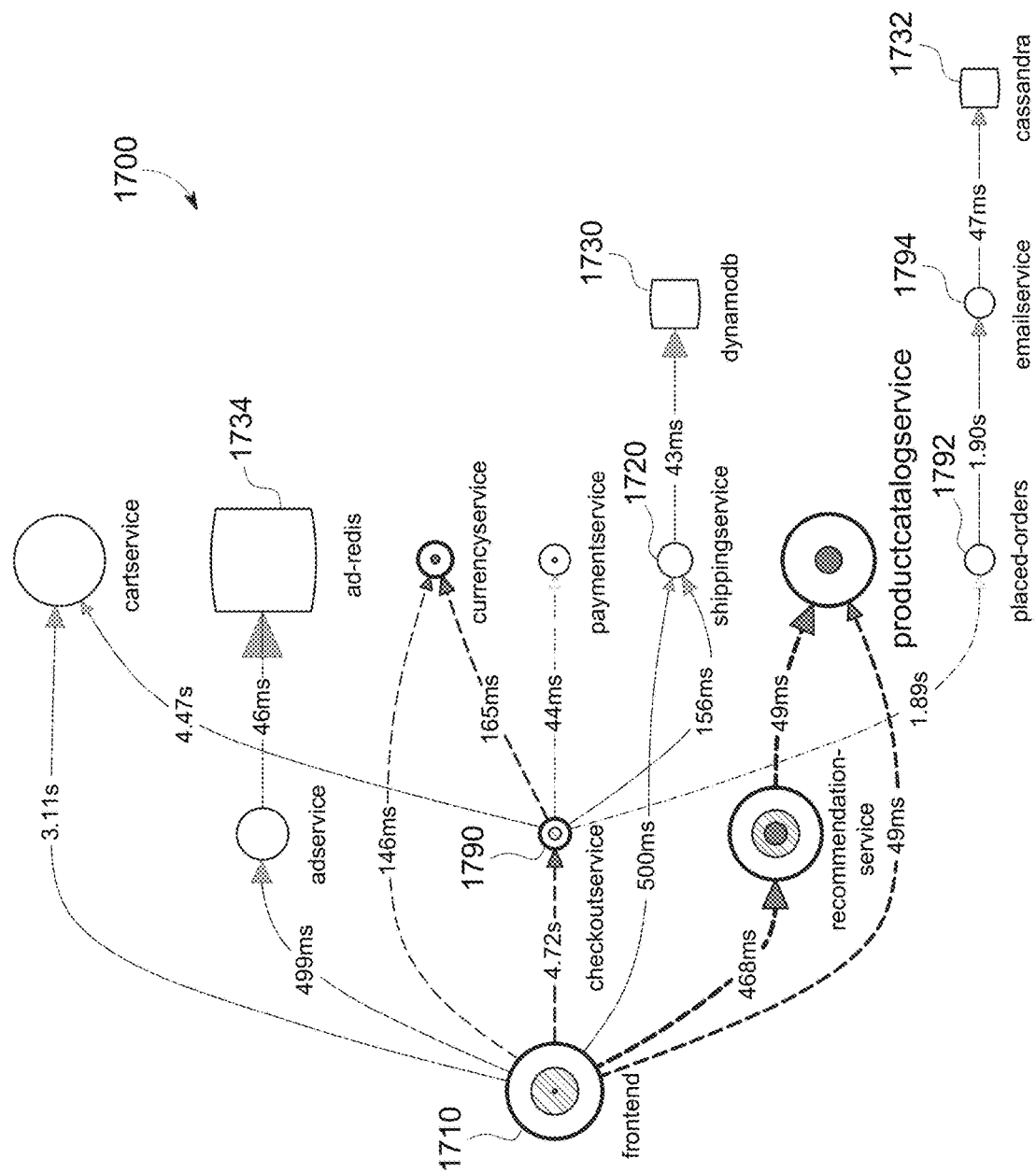
FIG. 17 illustrates an exemplary on-screen GUI showing the manner in which the service graph can visually indicate an uninstrumented external service, in accordance with embodiments of the present invention.

FIG. 17 illustrates an exemplary on-screen GUI showing the manner in which the service graph can visually indicate an uninstrumented external service, in accordance with embodiments of the present invention. As discussed previously, services that are part of the client's application may be represented differently from services that are external to the client's application. For example, circular nodes (e.g., nodes associated with front-end service 1710 and shipping service 1720) of the exemplary application represented by service graph 1700 are associated with services comprised within the client's application. By contrast, squarish nodes (e.g., associated with databases 1730, 1732 and 1734) are associated with services or databases that are external to the client's application.

In the exemplary service graph 1700 illustrated in FIG. 17, the external services or databases (e.g., the databases 1730, 1732 and 1734) comprise target services or databases, which are the recipients of calls from services within the client's application. It should be noted that the databases 1730, 1732 and 1734 may comprise uninstrumented databases (or services) within the client's application or be associated with external third party applications. For example, the client service shipping service 1720 makes a call to an uninstrumented external database "dynamodb" 1730. Because the shipping service 1720 is instrumented, the call to the dynamodb database 1730 will generate a span that will be collected by the collector 304. By contrast, the dynamodb database 1730 is an uninstrumented database and further operations performed by the dynamodb database 1730, as part of the original request, will not generate spans that may be collected by the collector 304. Accordingly, the call by the shipping service 1720 to the dynamodb database 1730 will result in a childless or "leaf" span. In one embodiment, to determine if there are uninstrumented external services that need to be rendered as part of the service graph 1700, the instrumentation analysis system 322 identifies leaf spans within incoming trace information and performs rule checking on the tags (and corresponding values) for the leaf spans to determine if the leaf spans are associated with corresponding external services.

Figure 18:
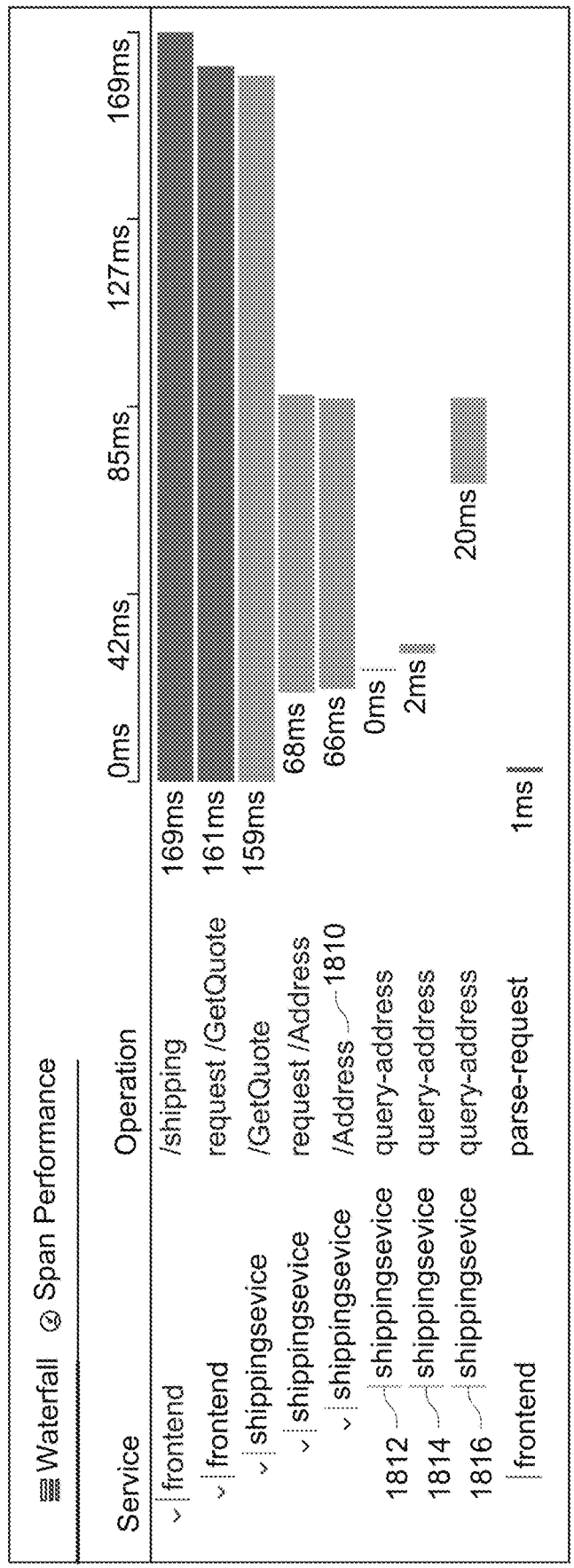
FIG. 18 illustrates an exemplary on-screen GUI showing a visual representation of an exemplary trace from the service graph of FIG. 17, in accordance with embodiments of the present invention.

FIG. 18 illustrates an exemplary on-screen GUI showing a visual representation of an exemplary trace from the service graph of FIG. 17, in accordance with embodiments of the present invention. The trace view of FIG. 18 illustrates the various spans generated when the front-end service 1710 makes a call to the shipping service 1720, which in turn makes a call to the uninstrumented database, dynamodb database 1730. In response to the call to the shipping service 1720 from the front-end service 1710, the shipping service 1720 generates calls to several internal operations. For example, operation "/Address" 1810 makes three separate calls to operation "query-address," which generate leaf spans 1812, 1814 and 1816 respectively.

Embodiments of the present invention further examine the leaf spans to determine if they are associated with corresponding external or uninstrumented services. More specifically, the instrumentation analysis system 322 may apply rules to the tags and values associated with the leaf spans to determine if they are associated with corresponding calls to an uninstrumented service or database.

Figure 19:
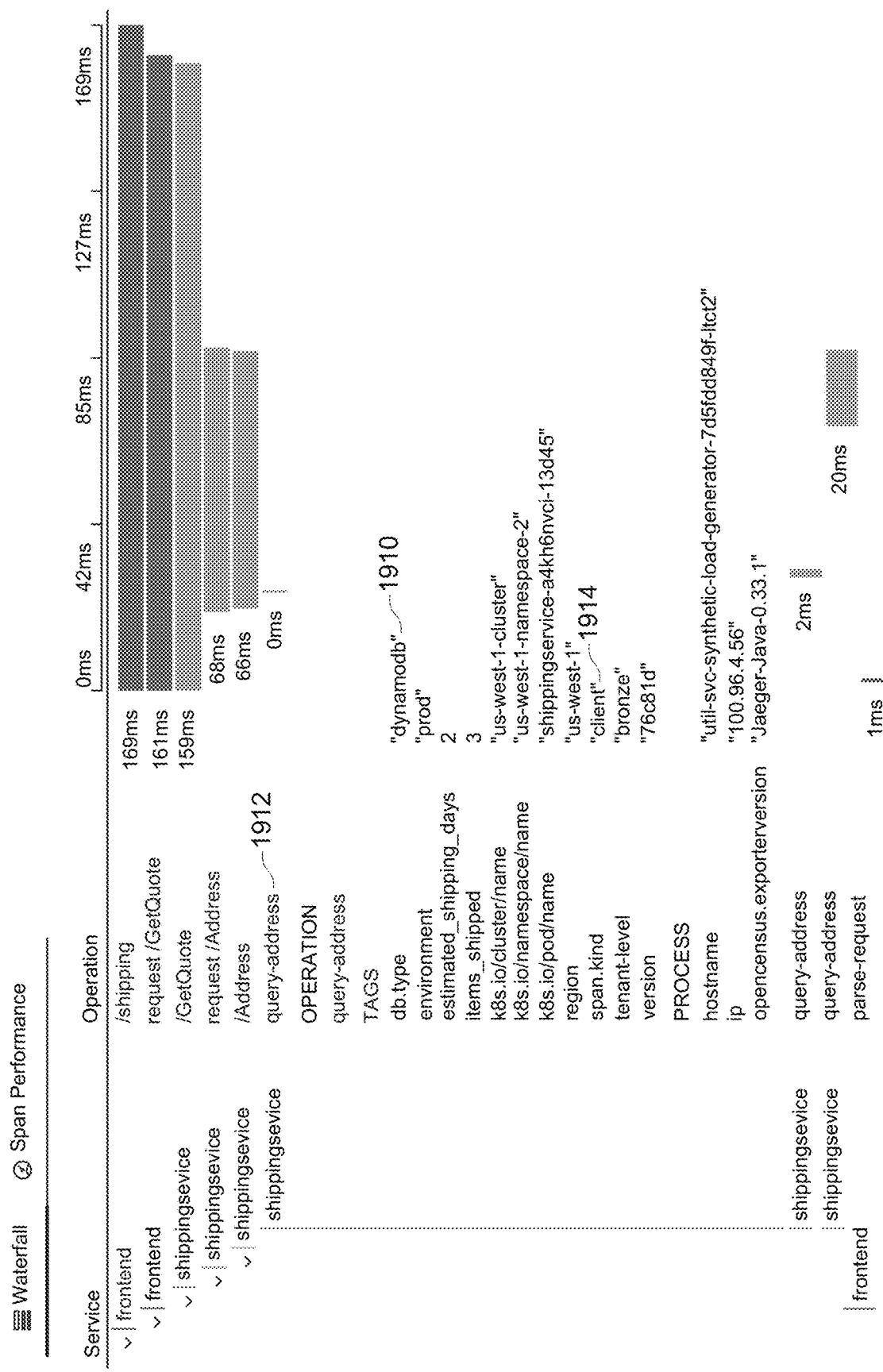
FIG. 19 illustrates an exemplary on-screen GUI showing the tags and associated values for a leaf span identified in FIG. 18, in accordance with embodiments of the present invention.

FIG. 19 illustrates an exemplary on-screen GUI showing the tags and associated values for a leaf span identified in FIG. 18, in accordance with embodiments of the present invention. A leaf span 1912 (represented as leaf span 1812 in FIG. 18) is expanded out to display its associated tags in the exemplary GUI of FIG. 19.

In one embodiment, instrumentation analysis system 322 may check tags associated with each leaf span and apply a set of rules on the tags (and associated values) for each leaf span to determine if an uninstrumented or external service needs to be inferred. The rules may, for example, be based on OpenTelemetry and OpenCensus conventions. Alternatively, they may be based on conventions specific to the monitoring service 306. For example, based on OpenTelemetry conventions, a value of "client" for a "span.kind" tag 1914 may indicate that the corresponding span comprising the tag is associated with a call to a different service. By applying the rule, the instrumentation analysis system 322 is able to determine that the span 1912 is associated with a call to a different service. Furthermore, the instrumentation analysis system 322 may check "db.type" tag 1910 with a value of "dynamodb" to determine that the service called is a database with the name "dynamodb." Alternatively, other tags, e.g., a "peer.service" type tag may be checked to determine the name of the uninstrumented service. By applying rules to the tags of the leaf spans then, the instrumentation analysis system 322 determines that the application topology for the client includes a call to an uninstrumented database with the name "dynamodb."

It should be noted that while the discussion herein is limited to particular rules and tags, there may be a variety of different rules that may be applied to the tags of a leaf span to determine if an uninstrumented or external service needs to be inferred. Having made a determination that an uninstrumented service needs to be inferred, in one embodiment, the instrumentation analysis system 322 tracks the inferred service by creating an ad hoc span for it in the back-end of the monitoring service 306. This ad hoc span may be referred to as a 'inferred span' in order to distinguish it from spans that are received from the collector 304.

In one embodiment, the inferred span created for the inferred service (e.g., the dynamodb database 1730 of FIG. 17) inherits one or more of the tags associated with the span that makes a call to the inferred service. In the example of FIG. 19, one or more tags and associated values associated with the span 1912 would be inherited by the inferred span created for the inferred database dynamodb. In an embodiment, the inferred span is assigned a dedicated tag to indicate that it is associated with an inferred service. For example, a span tag "inferred type" may be assigned to the inferred span to identify it as a span that was created for an inferred service. This tag may be checked at the time the service graph is rendered in order to render inferred services differently from instrumented services (e.g., using a hexagonal or squarish node instead of a circular node). It should be noted that creating a inferred span to track inferred service is an implementation choice and that there may be several alternative methods to keep track of the inferred service.

Figure 20:
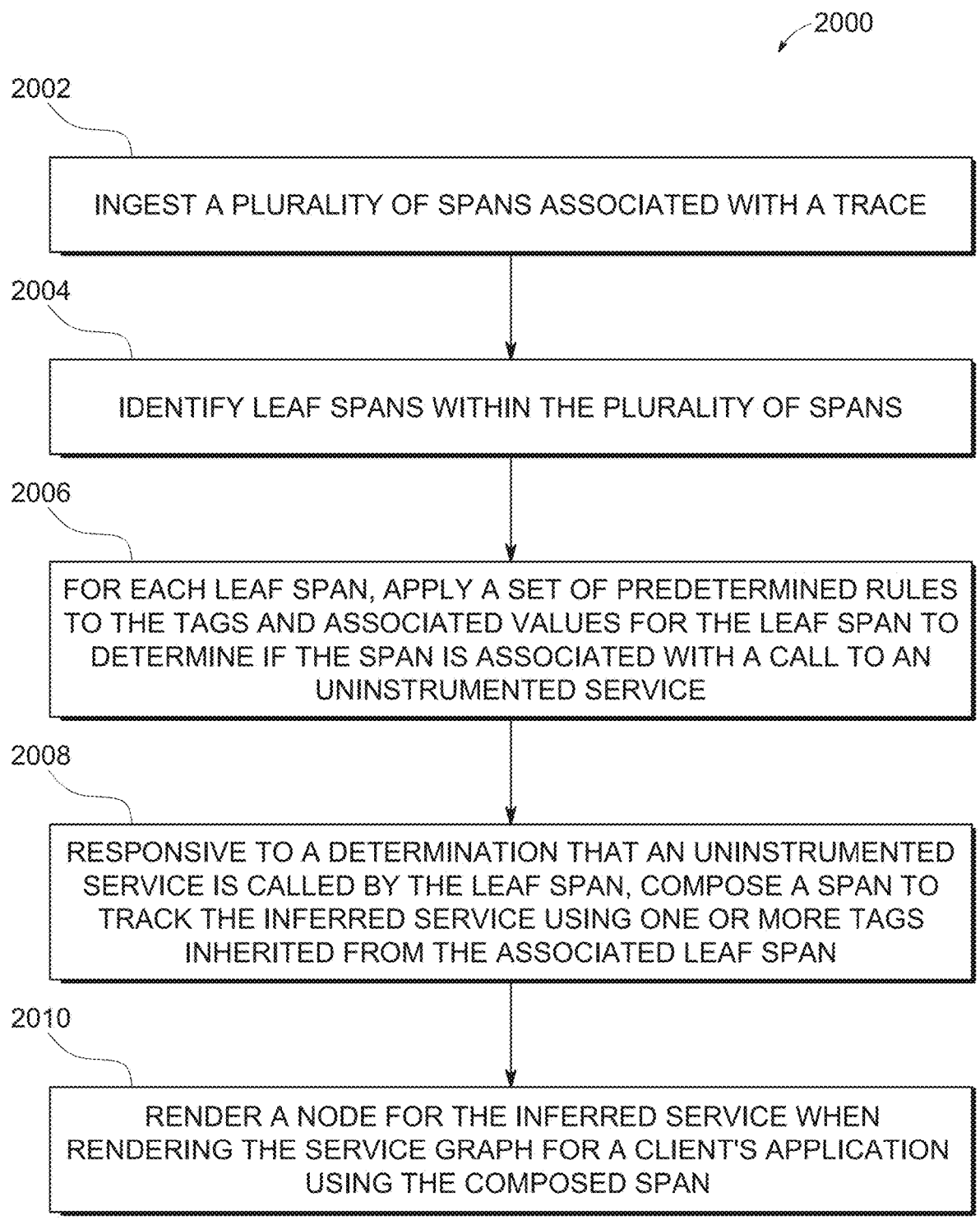
FIG. 20 presents a flowchart illustrating the manner in which tag information from leaf spans in a trace may be used to infer uninstrumented or external services for rendering an application topology graph, in accordance with embodiments of the present invention.

FIG. 20 presents a flowchart illustrating a process 2000 in which tag information from leaf spans in a trace may be used to infer uninstrumented or external services for rendering an application topology graph, in accordance with embodiments of the present invention. Blocks 2002-2010 describe exemplary steps comprising the computer implemented process 2000 depicted in FIG. 20, in accordance with the various embodiments herein described. In one embodiment, the process 2000 is implemented at least in part as computer-executable instructions stored in a computer-readable medium and executed in one or more processing devices.

At block 2002, a plurality of spans associated with a trace for a client's application are received through the collector 304 at the monitoring service 306. After the spans are ingested and consolidated into the trace, at block 2004, the instrumentation analysis system 322 identifies the leaf spans (or childless spans) from amongst the plurality of spans.

At block 2006, for each leaf span, the instrumentation analysis system 322 applies a set of predetermined rules to the tags (and associated values) of the leaf span to determine if the span is associated with a call to an uninstrumented service and if a service needs to be inferred (which may be an external service or an uninstrumented service within the client's application). For example, the leaf span may analyze the value of the "span.kind" tag to determine if the span is associated with a call to another service. Subsequently, other tags, e.g., a "db.type" or "peer.service" tag may be examined to determine a name for the service to be inferred.

At block 2008, if the instrumentation analysis system 322 determines that a service needs to be inferred, a data object is created at the back-end of the monitoring service 306 to keep track of the inferred service. For example, in one embodiment, an inferred span may be created for the uninstrumented service, where the inferred spans inherits one or more tags from the leaf span that issues a call to the uninstrumented service. The inferred span may then be added to the trace structure along with the other spans ingested from the client for a given application. In this way embodiments of the present invention advantageously enrich the trace by adding span related to inferred service. The spans related to inferred services may then be used along with the other spans in the trace to render the service graph.

Alternatively, in a different embodiment, the monitoring service 306 may keep track of the inferred service using a proprietary format where the original trace structure ingested from the client does not need to be modified. In this embodiment, the service graph including the uninstrumented services may be rendered based on a proprietary representation of the trace that keeps track of and incorporates inferred services as needed when rendering the topology graph.

At block 2010, the inferred spans created for the respective leaf spans associated with uninstrumented services are used along with the other spans ingested from the client to render a service graph illustrating the client's application topology. In one embodiment, a node for an uninstrumented service (associated with a inferred span) is rendered differently from a node associated with an instrumented service to allow a developer to distinguish between the types of nodes. For example, a node for an uninstrumented service may be rendered as a square (e.g., node associated with the dynamodb database 1730 in FIG. 17) while a node for an instrumented service (e.g. node associated with the front-end service 1710 in FIG. 17) may be rendered as a circle. This is beneficial in instances where uninstrumented services are associated with external or third party services because it allows a developer to appreciate the manner in which services comprised within the developer's application interact with third party or external services.

It will be appreciated that while uninstrumented services are visible in the application topology graph of FIG. 17 (e.g., the databases 1734, 1730, etc.), in one embodiment, the inferred spans associated with the uninstrumented services may not be shown in the trace view (as is the case with the trace view shown in FIGS. 18 and 19). In a different embodiment, however, the spans inferred for the uninstrumented services may also be displayed in the trace view so a user can easily determine the manner in which the inferred spans relate to the spans generated by the instrumented services.

While the discussion in FIGS. 17-20 focused on identifying and rendering uninstrumented target services, which receive calls from instrumented services within a client's application, there may be instances where the uninstrumented services that need to be identified and rendered in the service graph are originating services, which initiate calls to instrumented services within a client's application. As noted previously, trace data received at a monitoring service (e.g., monitoring service 306 in FIG. 3) typically includes requests made to a microservices-based system by an application associated with a client, but it may also include requests from other originators of data such as requests made by a system or a third party service. Additionally, there may be instances where an uninstrumented service is an intermediary service that occurs between two instrumented services.

Figure 21:
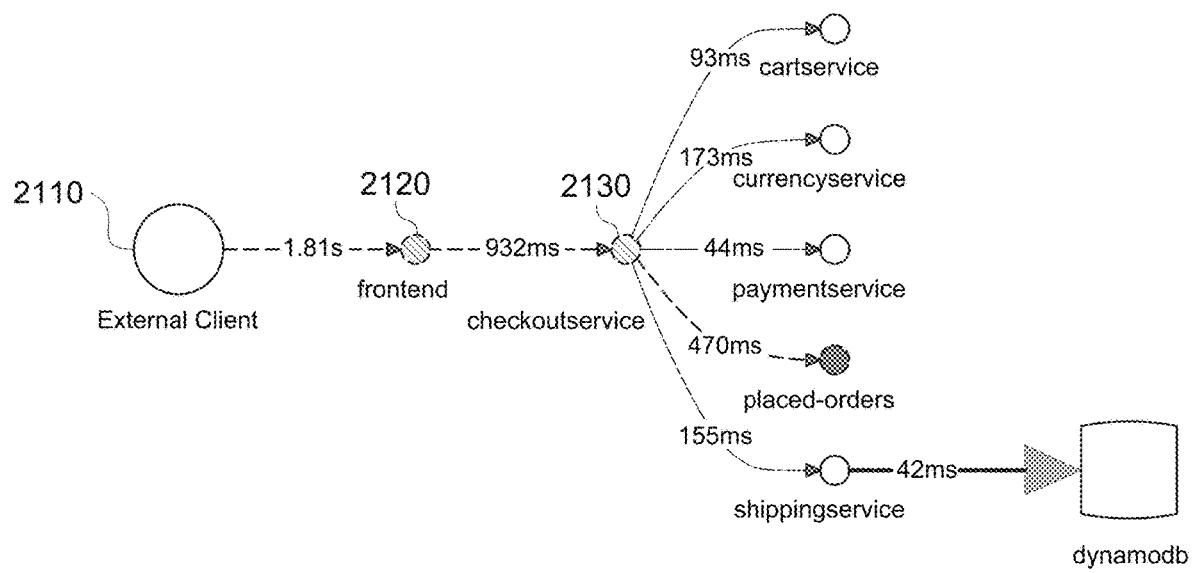
FIG. 21 illustrates an exemplary on-screen GUI showing the manner in which the service graph can visually indicate an uninstrumented external service that is an originating service, in accordance with embodiments of the present invention.

FIG. 21 illustrates an exemplary on-screen GUI showing the manner in which the service graph can visually indicate an uninstrumented external service that is an originating service, in accordance with embodiments of the present invention. As seen in FIG. 21, an uninstrumented service 2110 associated with an external client initiates a call to a front-end service 2120 that is an instrumented service within the client's application. Because the service 2110 is uninstrumented, no span associated with the call made by external client to the front-end service 2120 is received by the instrumentation analysis system 322. The instrumentation analysis system 322 will receive the span generated by the front-end service 2120 in response to the call from the uninstrumented service 2110 (associated, for example, with an external client). Accordingly, the instrumentation analysis system 322 is able to perform rule checking against the span generated by the front-end service 2120 to determine if it is associated with an originating uninstrumented service.

The span generated by the front-end service 2120 in response to the call from the uninstrumented service 2110 may not be a leaf span because it may generate further calls to operations within the front-end service 2120 or to other services, e.g., a checkout service 2130. Accordingly, the methodology of checking for leaf spans (as discussed in connection with block 2004 of FIG. 20) may not adequately identify uninstrumented services that originate calls to instrumented services or occur in between two instrumented services within a client's application.

In one embodiment, therefore, the instrumentation analysis system 322 may need to iterate through and perform rule checking on each span received from the client (instead of just the leaf spans) in order to identify internal or external uninstrumented services that are originator services (instead of target services). For example, in response to the call from the uninstrumented service 2110, the front-end service 2120 may generate a span that has a "span.kind" tag value of "server." A value of "server" for the "span.kind" tag is relevant when an external service needs to be inferred in front of the trace. Typically a trace is initiated by a "client" type span. Therefore, when the instrumentation analysis system 322 traverses a "server" type span at the front of the trace, it is able to infer that the span has been generated in response to a cross-service call from another service. Subsequently, further rule checking can be performed to determine a name and other properties associated with the uninstrumented service making the call.

Note that while the uninstrumented service 2110 is represented as a circular node, the inferred service may be rendered in any number of different ways. For example, the uninstrumented service 2110 may be represented as a hexagon to distinguish it from the instrumented services.

FIG. 22 illustrates an exemplary on-screen GUI showing a visual representation of a portion of an exemplary trace where an uninstrumented service needs to be inferred between two instrumented services, in accordance with embodiments of the present invention. As shown in FIG. 22, a checkout service 2205 makes a call to a email service 2215, where the checkout service 2205 comprises a "span.kind" tag 2210 with a value of "producer" and the email service 2215 comprises a "span.kind" tag 2220 with a value of "consumer." One of the predetermined rules that instrumentation analysis system 322 may be configured to check is whether or not there is a parent-child cross-service call where the parent comprises a "producer" value and the child comprises a "consumer" value for the respective "span.kind" tags. If both conditions are met, the instrumentation analysis system 322 may be programmed to infer an intermediate service between the two spans and create an inferred span for the intermediate service. Because both conditions are met for the spans shown in FIG. 22, the instrumentation analysis system 322 would infer an intermediate "pubsub" service between the checkout service 2205 and the email service 2215.

Referencing FIG. 17, one example of an inferred intermediate service is the "placed-orders" service 1792 that is inferred between the check out service 1790 and the email service 1794. It should be noted that an inferred intermediate service may be represented similarly to other instrumented services within the client's application or it may be represented differently. In the example of FIG. 17, the uninstrumented "placed-orders" service 1792 is represented using a circular node, similar to other instrumented services within the client's application.

Note that similar to FIG. 21, this inferred service may not be identified if the instrumentation analysis system 322 was exclusively checking for leaf spans. Accordingly, as noted above, the instrumentation analysis system 322 may need to iterate through and perform rule checking on all the spans received from the client (instead of just the leaf spans) in order to identify uninstrumented intermediate services.

Further note that while the "placed-orders" service 1792 is represented as a circular node, the inferred service may be represented in any number of different ways. For example, the "placed-orders" service 1792 may be represented as a hexagon to distinguish it from the instrumented services.

Figure 23:
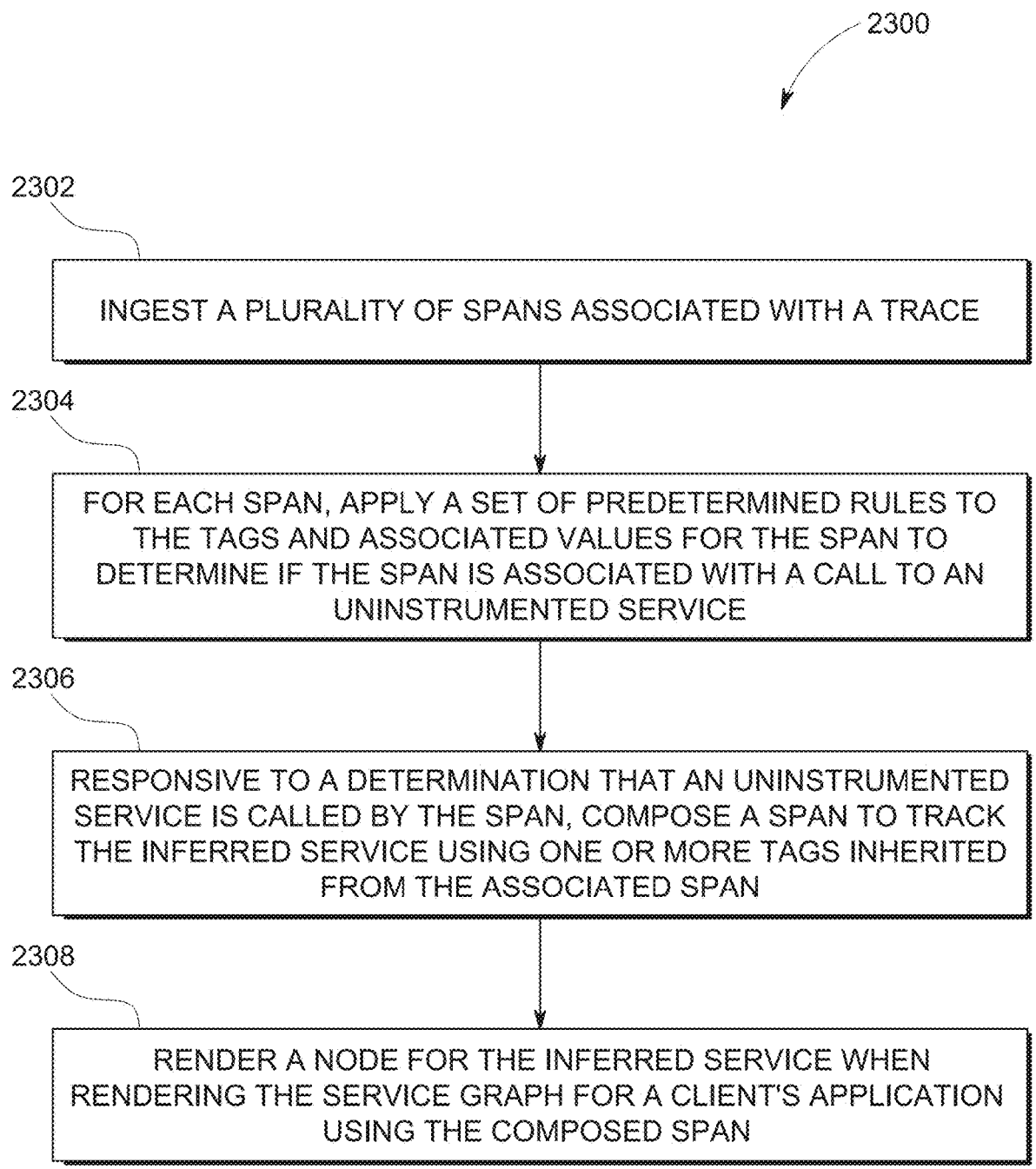
FIG. 23 presents a flowchart illustrating the manner in which tag information from spans in a trace may be used to infer uninstrumented or external services for rendering an application topology graph, in accordance with embodiments of the present invention.

FIG. 23 presents a flowchart illustrating a process 2300 in which tag information from spans in a trace may be used to infer uninstrumented or external services for rendering an application topology graph, in accordance with embodiments of the present invention. Blocks 2302-2308 describe exemplary steps comprising the computer implemented process 2300 depicted in FIG. 23, in accordance with the various embodiments herein described. In one embodiment, the process 2300 is implemented at least in part as computer-executable instructions stored in a computer-readable medium and executed in one or more processing devices.

At block 2302, a plurality of spans associated with a trace for a client's application are received through the collector 304 at the monitoring service 306. After the spans are ingested and consolidated into the trace, at block 2304, the instrumentation analysis system 322 iterates through the ingested spans and applies a set of predetermined rules to the tags (and associated values) of each span to determine if the span is associated with a call to an uninstrumented service and if a service needs to be inferred (which may be an external service or an uninstrumented service within the client's application). Because the instrumentation analysis system 322 iterates through each span in the trace, it is able to infer different types of uninstrumented services, e.g., originating services, target services and intermediate services.

At block 2306, if the instrumentation analysis system 322 determines that a service needs to be inferred, a data object is created at the back-end of the monitoring service 306 to keep track of the inferred service. For example, as discussed above, an inferred span may be created for the uninstrumented service, where the inferred spans inherits one or more tags from the span that is identified as being associated with the uninstrumented service. The inferred span may then be added to the trace structure along with the other spans ingested from the client for a given application.

At block 2308, the inferred spans created for the respective spans associated with uninstrumented services are used along with the other spans ingested from the client to render a service graph illustrating the client's application topology. In one embodiment, a node for an uninstrumented service is rendered differently from a node associated with an instrumented service to allow a developer to distinguish between the types of nodes.

Figure 24A:
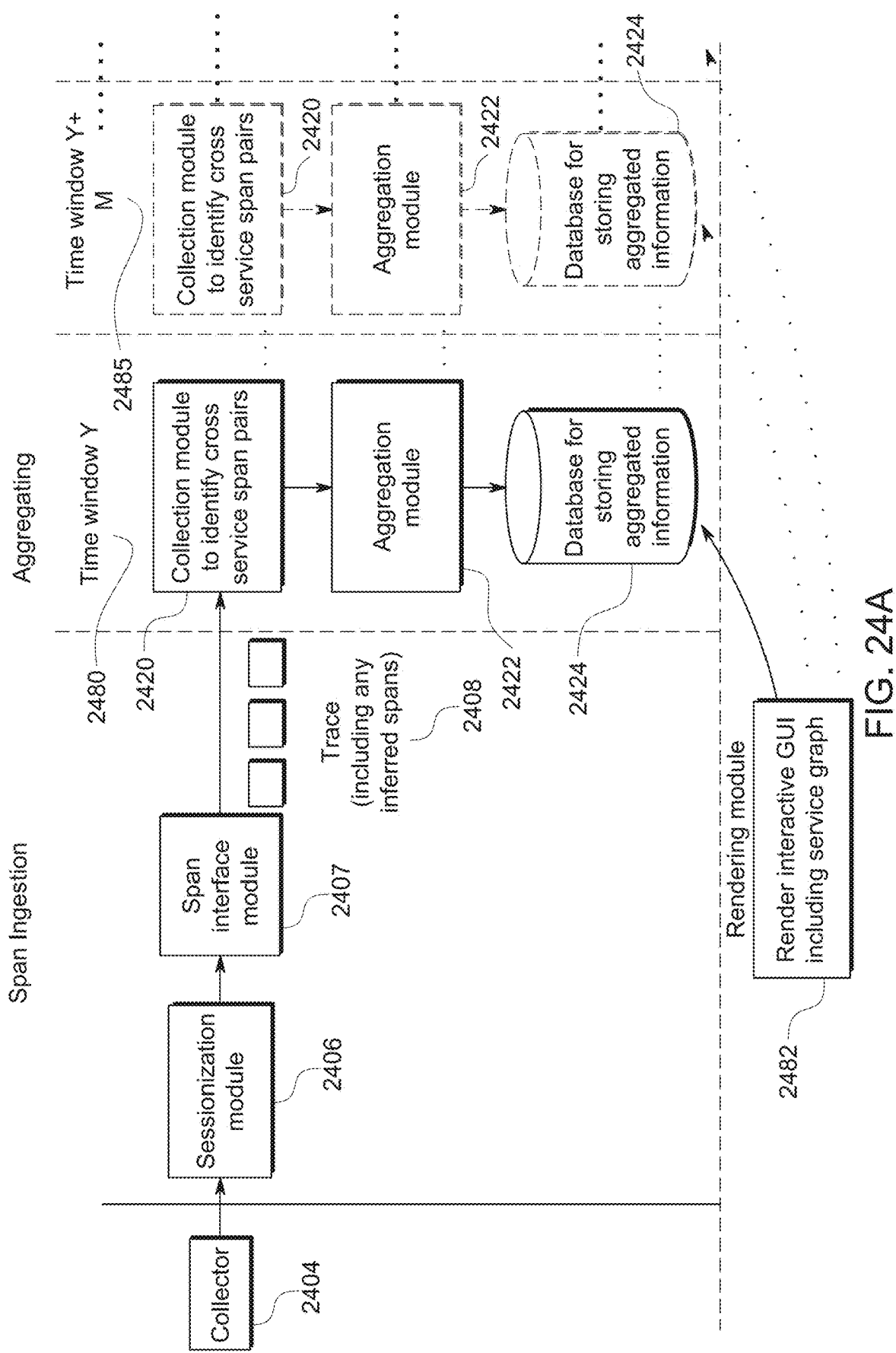
FIG. 24A is a flow diagram that illustrates an exemplary method for ingesting and aggregating trace information for rendering an application topology graph, in accordance with embodiments of the present invention.

4.5.2. Rendering Instrumented and Uninstrumented Services for the Service Graph FIG. 24A is a flow diagram that illustrates an exemplary method for ingesting and aggregating trace information for rendering an application topology graph, in accordance with embodiments of the present invention. As mentioned in connection with FIG. 3, span information is received at the monitoring service 306 from the collector 2404. The span information is then combined into traces in real-time in a process called sessionization. The sessionization module 2406 is responsible for stitching together or combining the traces 2408 using, among other things, the Trace IDs associated with each user-request (and the Parent Span IDs of each span). In an embodiment, inferred spans for uninstrumented services (as discussed in connection with FIGS. 20 and 23) may subsequently be created by a span inference module 2407 and incorporated into the relevant trace structure. In a different embodiment, the span inference module 2407 may infer spans for uninstrumented services at the same time as the sessionization process. Instead of waiting for the sessionization process to consolidate the spans into complete traces, the span inference module 2407 may infer spans while the sessionization process is taking place.

In addition to a Trace ID, each trace also comprises a time-stamp; using the time-stamps and the Trace IDs, the sessionization module 2406 creates traces from the incoming spans in real-time and sessionizes them into discrete time windows. For example, the sessionization process may consolidate traces (from spans) within a first 15-minute window (associated with time window Y 2480) before transmitting the traces to the collection module 2420. Thereafter, the sessionization process may consolidate traces within the subsequent 15 minutes (associated with time window "Y+M" 2485) before transmitting those traces to the collection module 2420. In one embodiment, the span inference module 2407 also infers spans for uninstrumented services and incorporates them into the trace structure for incoming traces in real-time.

In some embodiments of the present invention, the sessionization module is able to ingest, process and store 100% of the spans received from the collector 2404 in real-time. By comparison, conventional monitoring systems do not accept 100% of the incoming spans or traces; instead, they sample incoming spans (or traces) to calculate SLIs at the root level of a trace before discarding the spans. Embodiments of the present invention, by comparison, comprise an ingestion streaming pipeline that is able to ingest and consolidate the incoming spans into traces in real-time, and is further able to use advanced compression methods to store the traces.

As noted above, the sessionization module 2406 collects the traces within a first time window Y 2480 (e.g., a duration of M minutes) using the time-stamps for the traces. Thereafter, the span inference module 2407 infers spans related to uninstrumented services and incorporates them into the trace structure. Subsequently, the traces are then emitted to a collection module 2420. In one or more embodiments, the collection module 2420 receives one or more traces generated within a predetermined time window Y 2480, and traverses the traces to identify and collect cross-service span pairs that represent cross-service calls. To collect the cross-service span pairs, the collection module 2420 identifies every parent-child span pair in a given trace where the service name for the parent and the child are different. Stated differently, the collection module 2420 will collect pairs of spans that have a parent-child relationship and where each of the two spans in the pair are associated with a different service. The service name of a span may be identified in a span-level tag included with each span. Alternatively, there may be other conventions for identifying a service name associated with a span, e.g., a special field within the span for the service name.

Identifying and collecting the cross-service span pairs from the incoming spans are advantageous because they enable monitoring service 306 to track information that will be required to render the service graph. Spans associated with calls to internal operations that a service might make are not required to render a service graph and are, therefore, ignored by the collection module 2420. In an embodiment, spans exclusively associated with calls made from one service to another need to be collected and tracked.

In one or more embodiments, once the cross-service span pairs are collected, the monitoring platform maps selected tags (e.g. indexed tags selected by an application owner) for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved. It will be appreciated that while the discussion herein focuses on "FROM" and "TO" tag attributes to indicate the direction of the dependency between services in a cross-service call, there may be several different ways to record dependency information between the two services.

In one embodiment, an aggregation module 2422 of the monitoring platform aggregates across the cross-service span pairs by maintaining a count for each unique set of "FROM" tag attributes (and their corresponding values) to "TO" tag attributes (and their corresponding values) for a cross-service pair. It should be appreciated that in this embodiment, counts are maintained at the tag level for the cross-service span pair (rather than at the service level). Accordingly, a separate count is maintained for each set of parent span tags (mapped to a "FROM" tag attribute) and child span tags (mapped to a "TO" tag attribute). The count is increased each time the aggregation module 2422 encounters the same unique set of "FROM" tag attributes (associated with tags of a parent span) and "TO" tag attributes (associated with tags of a child span) for the same cross-service span pair in one or more traces.

In a different embodiment, the count may be maintained at the service level. Accordingly, the count may be increased each time the same cross-service span pair is encountered within the trace information ingested from the client.

In another embodiment, instead of mapping selected tags from a parent and a child in the cross-service span pair, tags from a service tier corresponding to a parent span or child span in the cross-service span pair may also be mapped. A service tier is a subset of spans in a trace that logically identifies a single request to a service. Accordingly, both a parent span and a child span in the cross-service span pair are associated with a respective subset of related spans known as a service tier. Tags may be extracted by the collection module 2420 from service tiers associated with a cross-service span pair. Accordingly, tags generated from spans in the same service tier as the parent span in the pair (and are, for example, ancestors of the parent span) are mapped to "FROM" tag attributes. Additionally, tags that generated from spans in the same service tier as the child span in the pair (and are, for example, descendants of the child span) are mapped to "TO" tag attributes.

The aggregation module 2422 advantageously prevents duplication by storing a single instance of each unique set of "FROM" tag attributes and "TO" tag attributes for a given cross-service span pair with an associated count in the storage module 2424. The information in the storage module 2424 can be accessed by rendering module 2482 to render the GUI including the application topology graph. The aggregated cross-service "FROM" and "TO" tag attribute sets and associated count values stored in storage module 2424 may be used by the rendering module 2482 to render both the edges and the nodes of the service graph (e.g. the service graph 500).

Note that the collection and aggregation process is repeated for subsequent time windows after time window Y 2480. In this way, the aggregation process is performed over time. This allows the service graph to be rendered across different time durations, e.g., using the drop-down menu 622 discussed in FIG. 6.

In one embodiment, the edges on the service graph (e.g., the edges 522 and 526) are rendered using both the "FROM" and "TO" tag attribute sets because rendering the edges requires information regarding directionality. The counts for the "FROM" and "TO" tag attribute sets for a given cross-service span pair are summed up to yield the number of requests made between the two services associated with the span pair. In other words, edges are rendered in the service graph by grouping "FROM" and "TO" tag attribute sets associated with a cross-service call and summing up the request counts associated with the cross-service call. In an embodiment, this grouping may be performed using "group by" statements in a query language, e.g., SQL. In one embodiment, the value of the number of requests between two services can be used to determine the thickness of the edge between the two services in the service graph.

In one embodiment, the nodes (e.g., nodes associated with services 502, 504, 506) on the service graph are also rendered using the aggregated cross-service "FROM" and "TO" tag attribute sets. However, rendering the nodes does not require directionality information and, therefore, the nodes can be rendered by collecting and extracting information from the "TO" type tag attributes. Stated differently, the nodes are rendered by grouping the "TO" tag attributes associated with a given service and summing up the request counts associated with the service. In an embodiment, this grouping may be performed using "group by" statements in a query language, e.g., SQL. The "TO" tag attributes represent new services being called within the microservice architecture. Accordingly, the counts associated with "TO" tag attributes for a given service can be summed up to determine the total number of requests made to the service. In one embodiment, the value of the number of requests can also be used to determine the size of the node when rendering the service graph. In an embodiment, the "TO" type tag attributes for rendering the nodes may be aggregated separately from the "FROM" and "TO" tag attribute sets aggregated for rendering the edges.

FIG. 24B is a table illustrating the manner in which selected tags for each service in a cross-service span pair are mapped to tag attributes, in accordance with embodiments of the present invention. As noted above, in one or more embodiments, once the cross-service span pairs are collected, the monitoring platform maps selected tags for each service in the cross-service span pair to tag attributes, e.g., selected tags in a parent span are mapped to a "FROM" tag attribute and selected tags in a child span are mapped to a "TO" tag attribute. The mapping is performed to allow directionality information for the cross-service calls to be preserved. For example, a data object for an "edge" (corresponding to an edge or dependency in the topology graph) may be created that comprises both the FROM-type of tag attributes and the TO-type of tag attributes.

The table of FIG. 24B also illustrates an exemplary manner of storing a data object associated with an edge in the service graph. The table of FIG. 24B comprises two services, Service A and Service B, in an application. Both Service A and Service B comprise indexed tags "span.kind" and "region." Tag "span.kind" may have two possible values, "client" and "server." Similarly, tag "region" may have two possible values, "us-west" and "us-east."

If all possible combinations exist in Service A, there may be 4 unique tag combinations comprising the "FROM" tag attribute, e.g., (span.kind=client, region=us-west) (span.kind=client, region=us-east) (span.kind=server, region=us-west) (span.kind=client, region=us-east). Similarly, if all possible combinations exist in Service B, there may also be 4 unique tag combinations comprising the "TO" tag attribute. Assuming there is a complete interaction between Service A and Service B, there may be 16 (4×4) different edges between the two services based on the unique set of "FROM" and "TO" type tag attributes.

Note that the example in FIG. 24B illustrates information for two unique sets of "FROM" and "TO" tag attributes. Edge 2490 is associated with a TO-type attribute of "region=us-east" while edge 2492 is associated with a TO-type attribute of "region=us-west." Because the two sets of "FROM" and "TO" attributes are not identical, a separate count is maintained for each. Edge 2490 has an associated count of 2, while edge 2492 has an associated count of 1. To determine the total number of requests or total count associated with the cross-service call from Service A to Service B, the number of counts for each set of "FROM" and TO" tag attributes for an associated cross-service call can be summed up. In the example of FIG. 24B then, a total of 3 requests occur between Service A and Service B.

As noted above, the nodes may be rendered by collecting and extracting information from the "TO" type tag attributes. In the example of FIG. 24B then, information for Service B (associated with the "TO" type tag attribute) can be determined by analyzing the "TO" type tag attributes in the table of FIG. 24B.

Figure 25A:
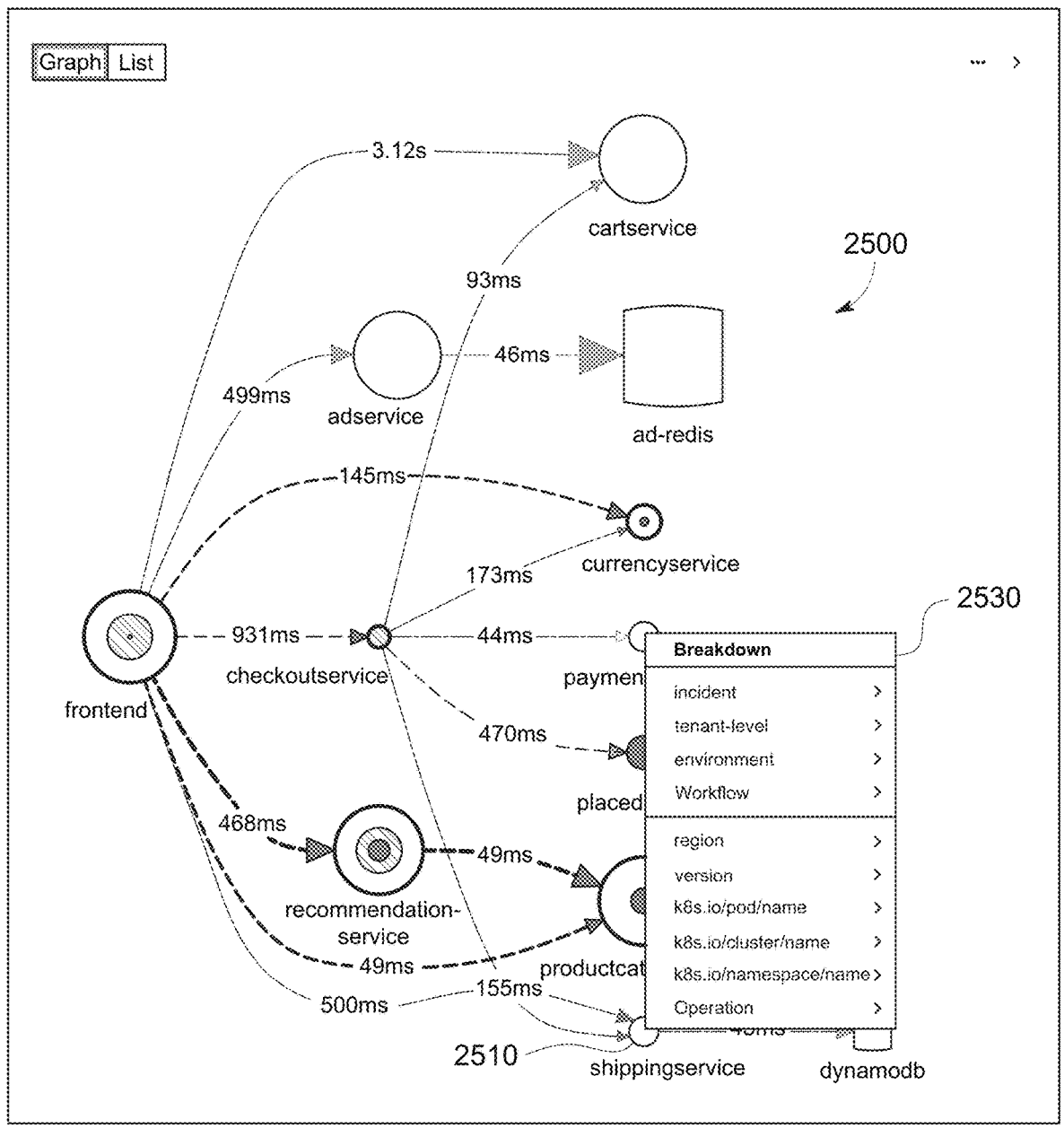
FIG. 25A illustrates an exemplary on-screen GUI showing the manner in which the service graph can interactively allow a user to break down an instrumented service by its constituent tags, in accordance with embodiments of the present invention.

FIG. 25A illustrates an exemplary on-screen GUI showing the manner in which the service graph can interactively allow a user to break down an instrumented service by its constituent tags, in accordance with embodiments of the present invention.

In one embodiment, a developer may interact with a service node for an instrumented service (e.g., a shipping service 2510) to enable a break down of the service by its constituent tags. It is appreciated that breaking down a service node (or an edge node) by its constituent tags is made possible because counts for the cross-service dependencies are maintained at the tag level (as discussed in connection with FIG. 24A). As noted previously in connection with FIG. 6, the service graph (e.g. service graph 2500) rendered, in accordance with embodiments of the present invention, support high dimensionality and high cardinality tags providing a developer the ability to advantageously analyze the graph across several dimensions of data (e.g., multiple categories of dimensions including, but not limited to, workflow, environment, incident, tenant-level, region, version, as shown in a pop-up menu 2530).

Figure 25B:
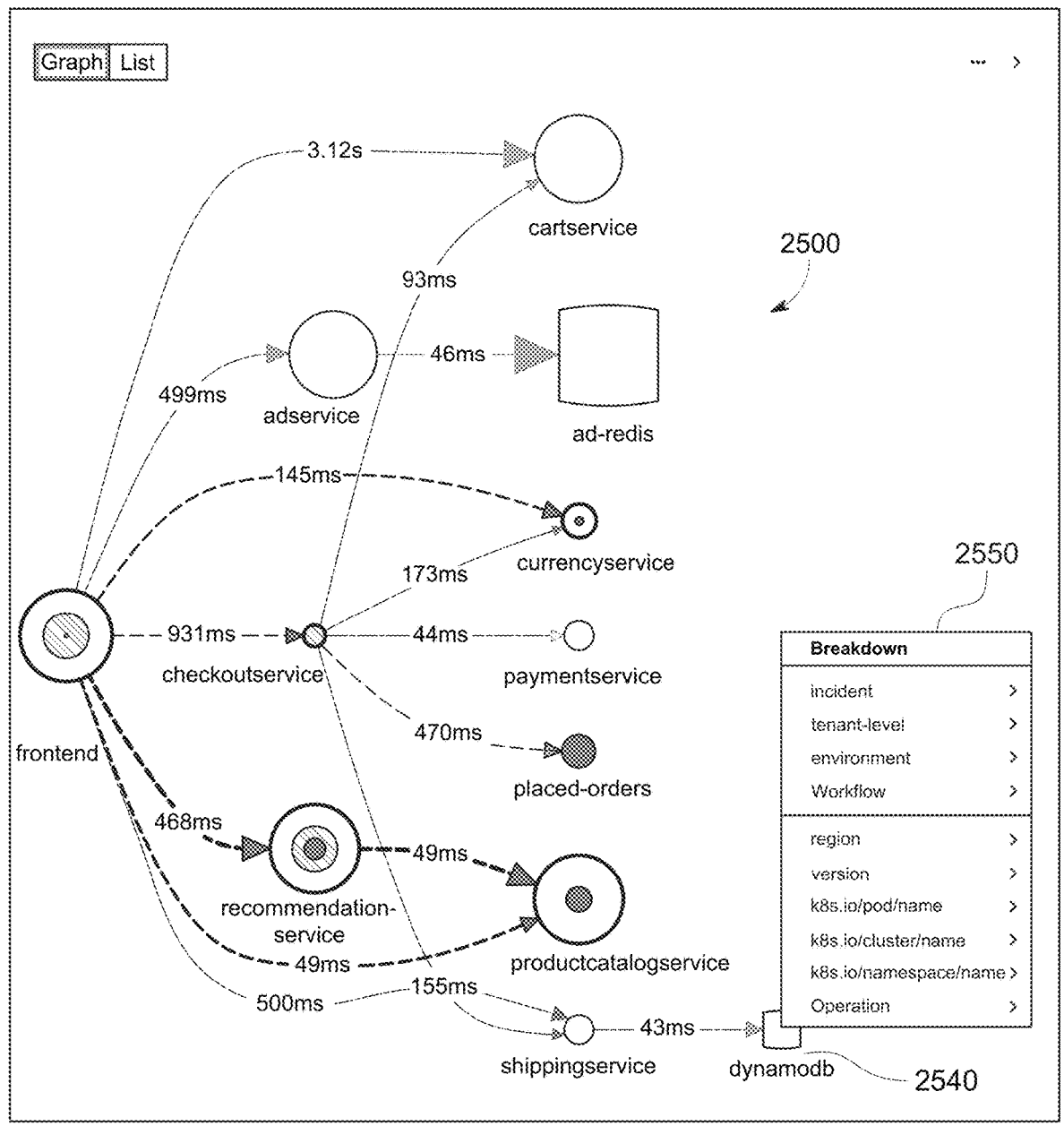
FIG. 25B illustrates an exemplary on-screen GUI showing the manner in which the service graph can interactively allow a user to break down an uninstrumented service by its constituent tags, in accordance with embodiments of the present invention.

FIG. 25B illustrates an exemplary on-screen GUI showing the manner in which the service graph can interactively allow a user to break down an uninstrumented service by its constituent tags, in accordance with embodiments of the present invention. In addition to allowing a developer to break down an instrumented service by its constituent tags, the service graph created in accordance with embodiments of the present invention also allows an uninstrumented service (e.g., a dynamodb database 2540) to be broken down by its constituent tags (e.g. using a pop-up menu 2550). As noted previously, an inferred span may be created for an inferred service that is uninstrumented. The inferred span inherits one or more tags from the span associated with the call to the inferred service. The inferred span may also be assigned certain unique tags based on rules applied by the instrumentation analysis system 322. Using information from both the inherited tags and tags specific to the inferred service, service graph 2500 supports breaking down inferred (external or uninstrumented) services by their constituent tags as well.

It is appreciated that breaking down a service node associated with an uninstrumented service by its constituent tags is made possible because embodiments of the present invention create dedicated inferred spans for inferred services that are not instrumented. Further, embodiments of the present invention maintain counts corresponding to the cross-service dependencies at the tag level. As noted above, the aggregation module 2422 aggregates data for the cross-service span pairs by maintaining a separate count for each set of "FROM" tag attributes to "TO" tag attributes for a respective cross-service span pair.

Figure 25C:
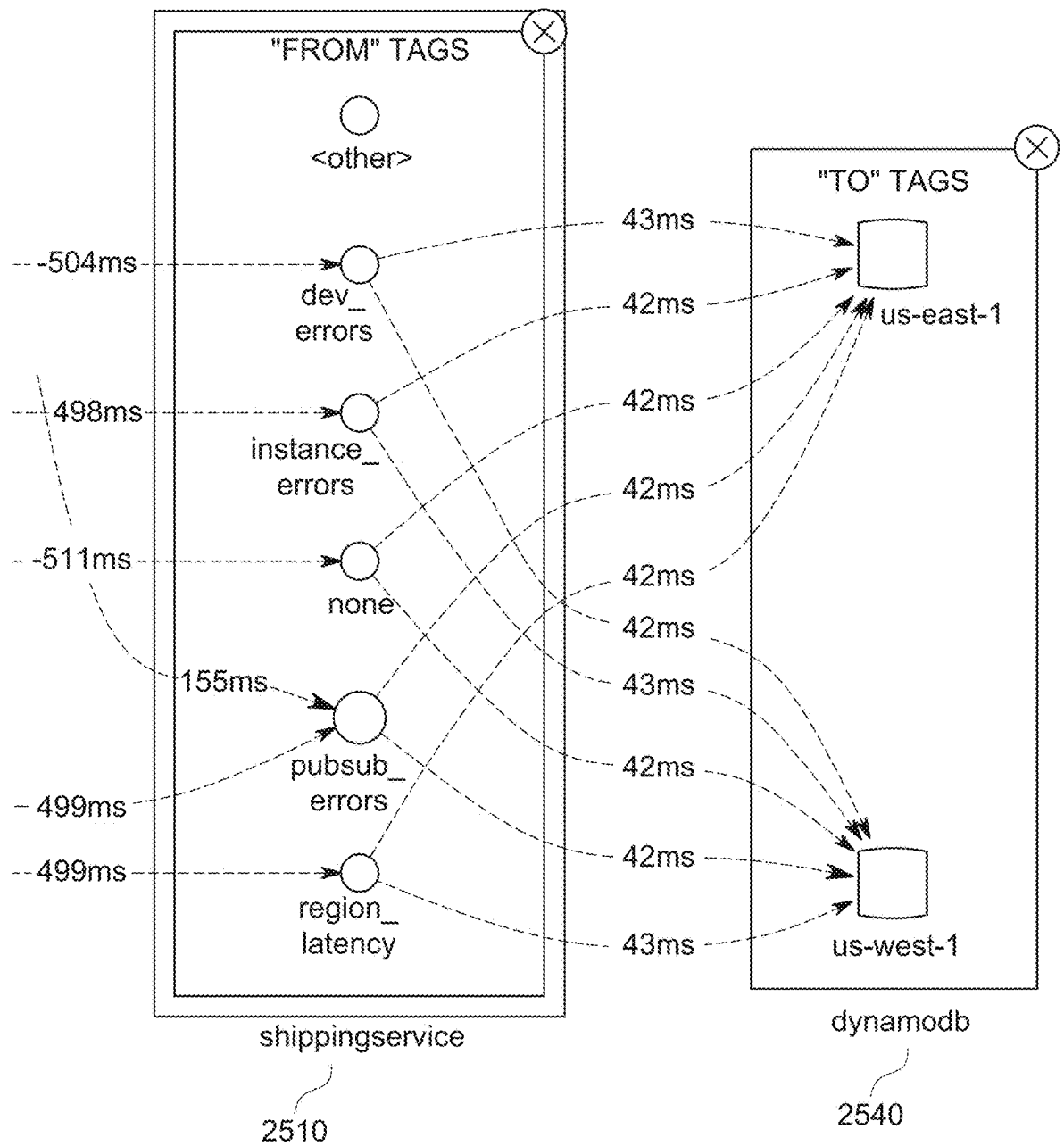
FIG. 25C illustrates an expanded view of a portion of an exemplary on-screen GUI showing the manner in which the service graph allows a user to visualize the relationship between an instrumented and an uninstrumented service at the tag level, in accordance with embodiments of the present invention.

FIG. 25C illustrates an expanded view of a portion of an exemplary on-screen GUI showing the manner in which the service graph allows a user to visualize the relationship between an instrumented and an uninstrumented service at the tag level, in accordance with embodiments of the present invention. As discussed in connection with FIGS. 25A and 25B, both instrumented and uninstrumented services may be broken down and filtered by their constituent tags. In the exemplary GUI of FIG. 25C, the instrumented service "shipping service" 2510 and the uninstrumented database dynamodb 2540 are both expanded to display their respective constituent tags.

Maintaining a separate count for each unique set of "FROM" tag attributes to "TO" tag attributes for a given cross-service span pair allows service graph to use the information from the aggregation module 2422 (stored in database associated with storage module 2424) to display the manner in which the tags from the calling service (in this case, the shipping service 2510) relate to the tags of the service being called (in this case dynamodb database 2540). In one embodiment, each node in the service graph (for both instrumented and uninstrumented services) may be broken down to show the manner in which the constituent tags are in relation with other services (or tags associated with the other services). For example, a developer may expand nodes for two instrumented services that are part of a cross-service call to examine the tag level relationships between the two services.

Figure 25D:
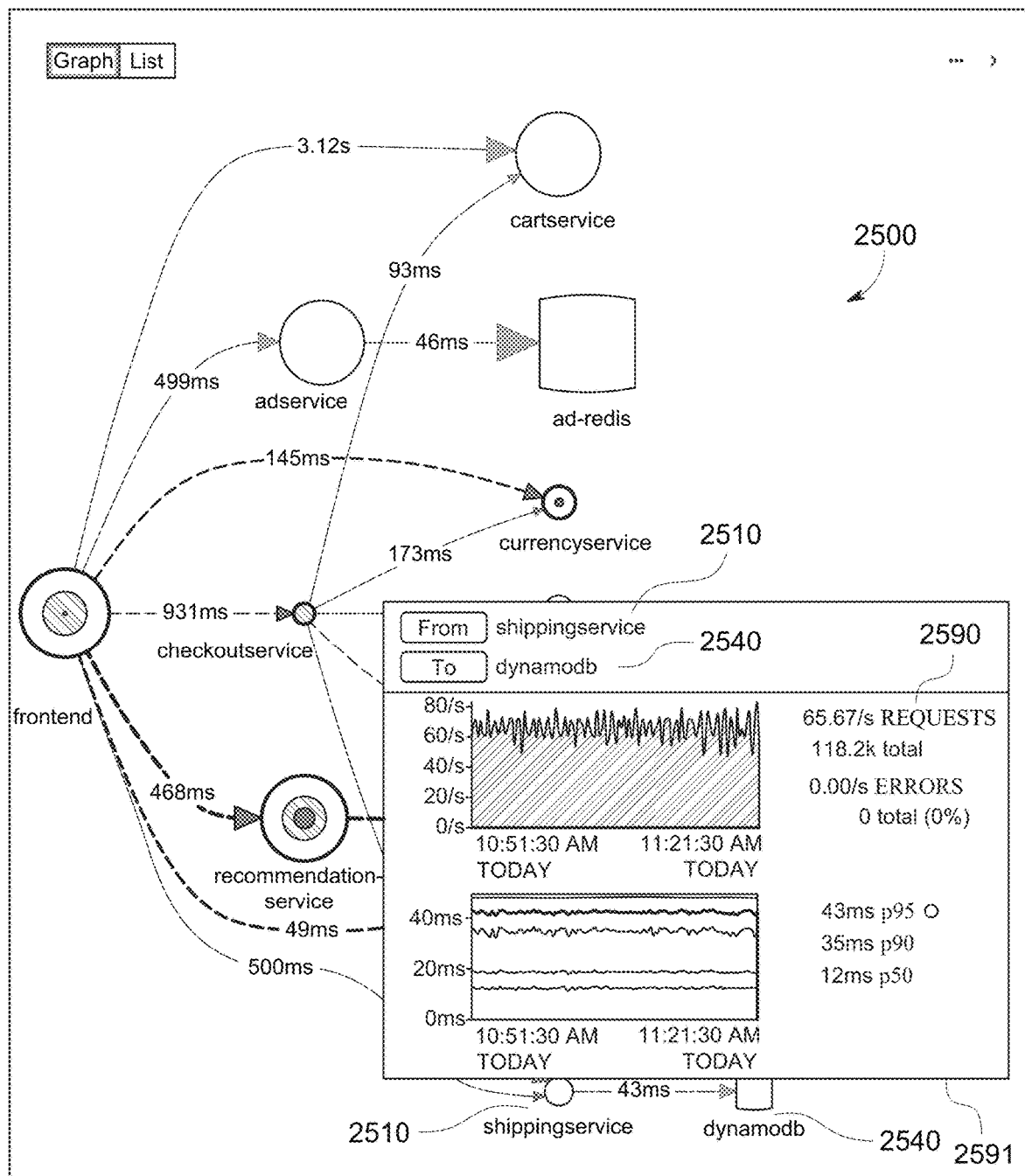
FIG. 25D illustrates an exemplary on-screen GUI showing the manner in which the service graph allows a user to obtain information regarding dependencies between instrumented and uninstrumented services, in accordance with embodiments of the present invention.

FIG. 25D illustrates an exemplary on-screen GUI showing the manner in which the service graph allows a user to obtain information regarding dependencies between instrumented and uninstrumented services, in accordance with embodiments of the present invention. As shown in FIG. 25D, a developer may interact with the service graph 2500, and specifically the edge between the shipping service 2510 and the dynamodb database 2540, to obtain further information regarding the cross-service call, e.g., in a pop-up window 2591.

As noted above, the edges on the service graph are rendered using the unique sets of "FROM" and "TO" tag attributes. The counts for the sets of "FROM" and "TO" tag attributes associated with a given cross-service span pair are summed up to yield the number of requests made between the two services associated with the span pair. As shown in FIG. 25D, summing up the counts for the sets of "FROM" and "TO" tag attributes associated with the cross-service call between the shipping service 2510 and the dynamodb database 2540 for a given time duration yields the request count value 2590 (e.g., 65.67 requests/second).

Figure 25E:
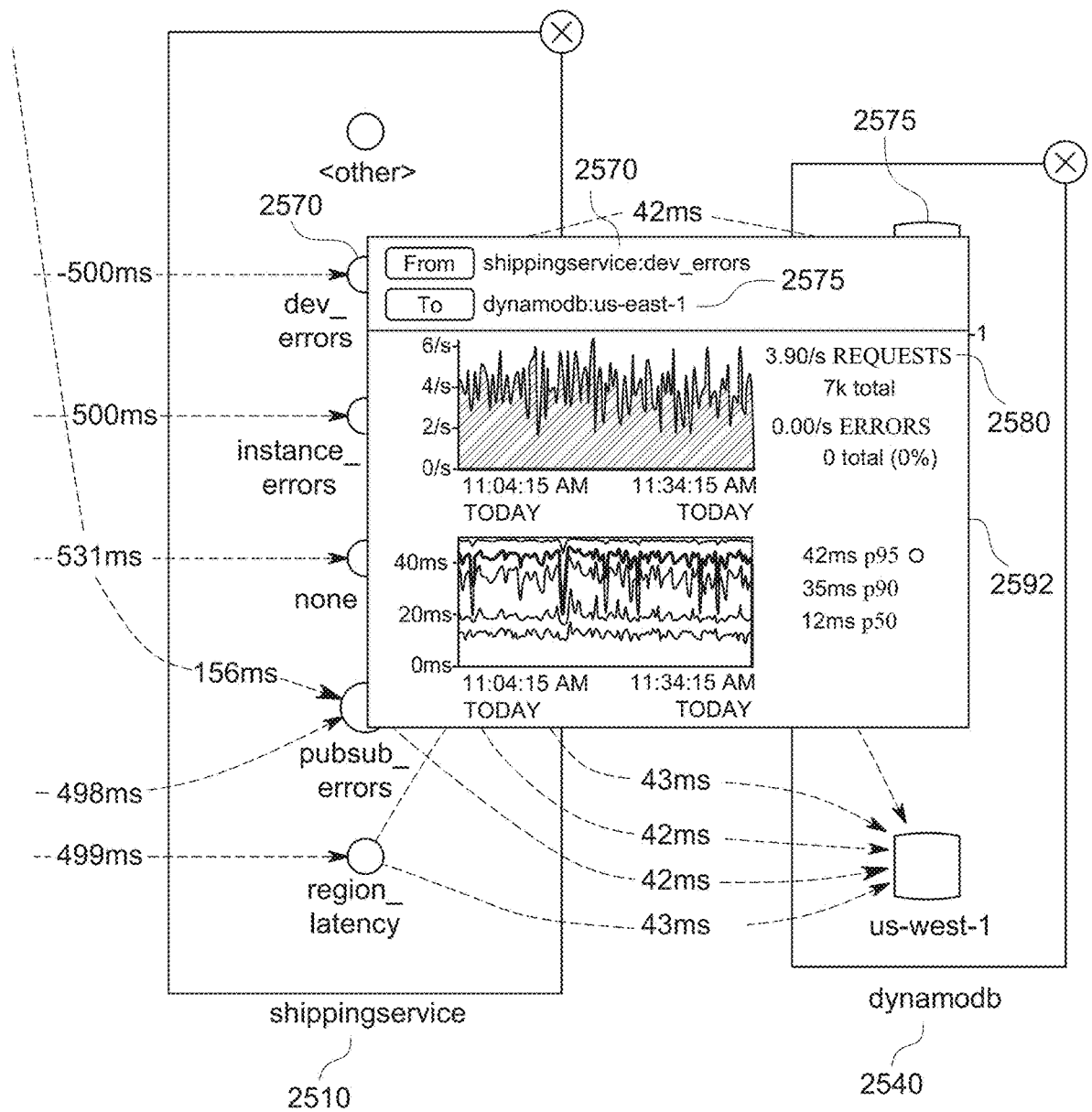
FIG. 25E illustrates an expanded view of a portion of an exemplary on-screen GUI showing the manner in which the service graph illustrated in FIG. 25C allows a user to obtain information regarding dependencies at the tag level between instrumented and uninstrumented services, in accordance with embodiments of the present invention.

FIG. 25E illustrates an expanded view of a portion of an exemplary on-screen GUI showing the manner in which the service graph illustrated in FIG. 25C allows a user to obtain information regarding dependencies at the tag level between instrumented and uninstrumented services, in accordance with embodiments of the present invention. As indicated previously, the aggregation module 2422 in FIG. 24A aggregates the cross-service span pairs by maintaining a separate count for each unique set of "FROM" tag attributes and "TO" tag attributes for a cross-service pair. This information is used to render the service graph where the relationship between the attributes of each cross-service pair can be further examined by a developer by interacting the service graph.

For example, a user may interact with the edges shown in FIG. 25C to obtain further information regarding the edge (e.g., by hovering the cursor over the edge, double-clicking the edge, etc.) As shown in FIG. 25E, if a user hovers the cursor over the edge between the "FROM" tag attribute "dev_errors" 2570 (within the shipping service 2510) and the "TO" tag attribute "us-east-1" 2575 (within the dynamodb database 2540), further information regarding the dependency is presented, e.g., in a pop-up window 2592. Further, a number of requests 2580 (e.g., 3.9 requests/second) associated with the specific dependency between the tags 2570 and 2575 may be displayed, which is made possible by maintaining a separate count for each set of "FROM" and "TO" tag attributes for a given cross-service pair.

Figure 26:
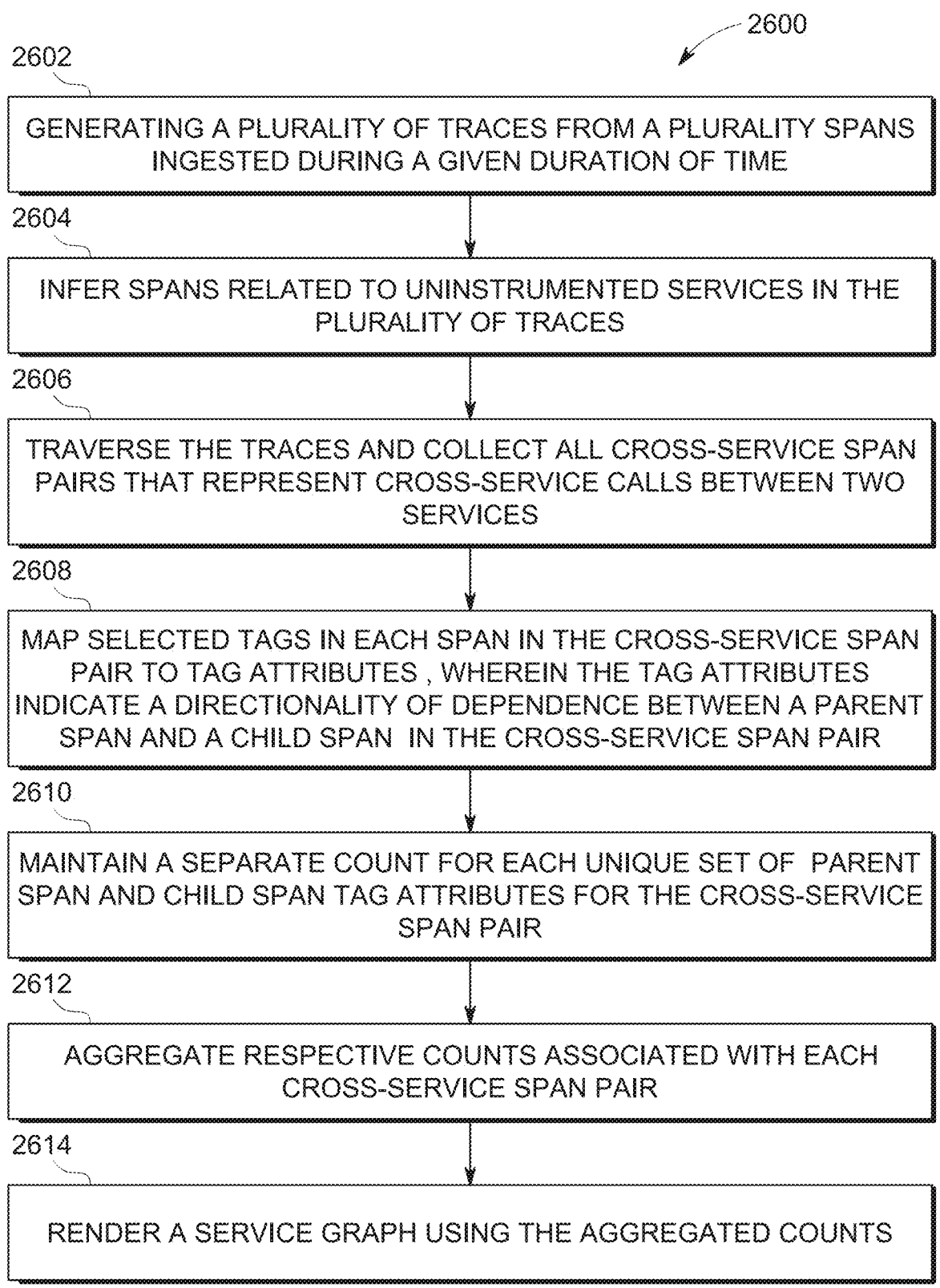
FIG. 26 presents a flowchart illustrating the manner in which a service graph may be rendered comprising information regarding both instrumented and uninstrumented services, in accordance with embodiments of the present invention.

FIG. 26 presents a flowchart illustrating the process 2600 in which a service graph may be rendered comprising information regarding both instrumented and uninstrumented services, in accordance with embodiments of the present invention. Blocks 2602-2612 describe exemplary steps comprising the computer implemented process 2600 depicted in FIG. 26, in accordance with the various embodiments herein described. In one embodiment, the process 2600 is implemented at least in part as computer-executable instructions stored in a computer-readable medium and executed in one or more processing devices.

At block 2602, a plurality of spans associated with instrumented services are ingested for a given time duration and consolidated into one or more traces, where each span comprises at least a Trace ID associated with a user-request. Further, the spans may also comprise a Parent Span ID that allows a parent-child relationship to be created between spans. In one embodiment, the spans are ingested and grouped into traces in real-time. In an embodiment, the plurality of spans may be grouped or consolidated into one or more traces in discrete windows of time. A sessionization process is used whereby, using the time-stamps and the Trace IDs associated with each trace, traces are created from the incoming spans such that each session of the sessionization process creates traces associated with a corresponding window of time.

At block 2604, uninstrumented services are inferred using the information in the tags of the plurality of spans that are generated and ingested from instrumented services. In one embodiment, for example, inferred spans may be created for inferred services and databases and incorporated into the traces created at block 2602.

At block 2606, the instrumentation analysis system 322 traverses the trace structures to determine and collect cross-service span pairs that represent cross-service calls between two services. As noted in connection with FIG. 24A, to collect the cross-service span pairs, the collection module 2420 identifies parent-child span pairs in a given trace where the service name for the parent and the child are different.

At block 2608, once the cross-service span pairs are collected, the collection module 2420 of the monitoring platform maps selected tags for each service in the cross-service span pair to tag attributes, e.g., selected tags in a parent span (associated with the originating service) are mapped to a "FROM" tag attribute and selected tags in a child span (associated with the target service) are mapped to a "TO" tag attribute. This enables directionality information for the cross-service calls to be preserved.

At block 2610, a separate count is maintained for each unique set of "FROM" tag attributes to "TO" tag attributes for a cross-service pair.

At block 2612, the monitoring platform aggregates across the cross-service span pairs by aggregating respective counts for each unique set of "FROM" tag attributes (and their corresponding values) to "TO" tag attributes (and their corresponding values) associated with a cross-service pair. This prevents unnecessary duplication because each set of "FROM" and "TO" tag attributes for a given cross-service pair needs to be saved once and associated with a count value (which keeps track of the number of times a particular set occurred).

At block 2614, a service graph is rendered using the aggregated counts determined for each cross-service span pair in block 2612. As noted above, the edges on the service graph (e.g., edges 522 and 526) are rendered using both the "FROM" and "TO" tag attribute sets because rendering the edges requires information regarding directionality. For example, the edges in the service graph may be rendered by grouping "FROM" and "TO" tag sets associated with a cross-service call and summing up the request counts associated with the cross-service call. In one embodiment, the nodes (e.g., nodes associated with services 502, 504, 506) on the service graph are also rendered using the aggregated cross-service tag attribute sets. For example, the nodes are rendered by grouping the "TO" tag attributes associated with a given service and summing up the request counts associated with the service.

While the principles of the invention have been described above in connection with specific apparatus, it is to be clearly understood that this description is made only by way of example and not as a limitation on the scope of the invention. Further, the foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of rendering a graphical user interface (GUI) comprising an application topology graph for a microservice architecture, the method comprising:
   generating a plurality of traces from a first plurality of spans generated by instrumented services in the microservice architecture for a given time duration;
   generating a second plurality of spans for uninstrumented services in the microservice architecture using information extracted from the first plurality of spans;
   grouping the second plurality of spans with the plurality of traces;
   traversing the plurality of traces and collecting a plurality of span pairs therefrom, wherein each span pair of the plurality of span pairs is associated with a call between two services in the microservice architecture;
   aggregating information across the plurality of span pairs to generate aggregated information for the given time duration; and
   rendering the application topology graph for the microservice architecture in the GUI using the aggregated information for the given time duration, wherein the application topology graph comprises both the instrumented services and the uninstrumented services in the microservice architecture.

2. The method of claim 1, wherein the generating the second plurality of spans comprises:
   identifying leaf spans from the first plurality of spans; and
   for each leaf span in the first plurality of spans:
     applying rules to tags of a respective leaf span;
     determining, based on the tags of the respective leaf span, whether the respective leaf span is associated with a call to a corresponding uninstrumented service; and
     responsive to determining that the respective leaf span is associated with a call to a corresponding uninstrumented service, composing a span for the corresponding uninstrumented service by inheriting at least one tag of the respective leaf span.

3. The method of claim 1, wherein the generating the second plurality of spans comprises:
   for each span in the first plurality of spans:
     applying rules to tags of a respective span;
     determining, based on the tags of the respective span, whether the respective span is associated with a call to a corresponding uninstrumented service; and
     responsive to determining that the respective leaf span is associated with a call to a corresponding uninstrumented service, composing a span for the corresponding uninstrumented service.

4. The method of claim 1, wherein the generating the second plurality of spans comprises:
   for each span in the first plurality of spans:
     applying rules to tags of a respective span;
     determining, based on the tags of the respective span, whether the respective span is associated with a call to a corresponding uninstrumented service; and
     responsive to determining that the respective leaf span is associated with a call to a corresponding uninstrumented service, composing a span for the corresponding uninstrumented service by inheriting at least one tag of the respective span.

5. The method of claim 1, wherein the generating the second plurality of spans comprises:

for each span in the first plurality of spans:
applying rules to tags of a respective span to determine if the respective span corresponds to a call associated with an uninstrumented service, wherein the uninstrumented service includes an originating uninstrumented service initiating a call to an instrumented service, an uninstrumented target service receiving a call from an instrumented service, or an uninstrumented intermediary service occurring between two instrumented services;
determining, based on the tags of the respective span, whether the respective span is associated with a call to a corresponding uninstrumented service; and
responsive to determining that the respective leaf span is associated with a call to a corresponding uninstrumented service, composing a span for the corresponding uninstrumented service by inheriting at least one tag of the respective span.

6. The method of claim 1, wherein the aggregating information across the plurality of span pairs reduces duplicative information associated with multiple occurrences of a same span pair from the plurality of span pairs.

7. The method of claim 1, wherein the rendering the application topology graph for the microservice architecture in the GUI using the aggregated information for the given time duration further comprises rendering the instrumented services in the microservice architecture within the application topology graph in the GUI with a different visual attribute from the uninstrumented services in the microservice architecture.

8. The method of claim 1, further comprising:
mapping a tag for each span in each collected span pair of the plurality of span pairs to tag attributes to indicate a directionality of dependency for a respective call between services within a respective span pair.

9. The method of claim 1, further comprising:
mapping a tag for each span in each collected span pair of the plurality of span pairs to tag attributes to indicate a directionality of dependency for a respective call between services within a respective span pair, and
wherein the mapping a tag for each span in each collected span pair of the plurality of span pairs to tag attributes further comprises:
mapping a tag associated with a first span in a respective span pair to a first attribute, wherein the first span is associated with a service executing the respective call; and
mapping a tag associated with a second span in a respective span pair to a second attribute, wherein the second span is associated with a service receiving the respective call.

10. The method of claim 1, further comprising:
mapping a tag for each span in each collected span pair of the plurality of span pairs to tag attributes to indicate a directionality of dependency for a respective call between services within a respective span pair, wherein each collected span pair of the plurality of span pairs comprises a parent span associated with a service executing the respective call and a child span associated with a service receiving the respective call; and
wherein the aggregating information across the plurality of span pairs further comprises:
maintaining a respective count for each unique set of parent span and child span tag attributes associated with the respective span pair; and
increasing a respective count each time a corresponding unique set of parent span and child span tag attributes associated with the respective span pair is encountered in the plurality of traces.

11. The method of claim 1, further comprising:
mapping a tag for each span in each collected span pair of the plurality of span pairs to tag attributes to indicate a directionality of dependency for a respective call between services within a respective span pair, wherein each collected span pair of the plurality of span pairs comprises a parent span associated with a service executing the respective call and a child span associated with a service receiving the respective call; and
wherein the aggregating information across the plurality of span pairs further comprises:
maintaining a respective count for each unique set of parent span and child span tag attributes associated with the respective span pair; and
increasing a respective count each time a corresponding unique set of parent span and child span tag attributes associated with the respective span pair is encountered in the plurality of traces; and
wherein the rendering the application topology graph for the microservice architecture in the GUI using the aggregated information for the given time duration further comprises:
rendering edges and nodes of the application topology graph for the microservice architecture in the GUI using counts and tag attributes associated with each collected span pair of the plurality of span pairs.

12. The method of claim 1, further comprising:
mapping a tag for each span in each collected span pair of the plurality of span pairs to tag attributes to indicate a directionality of dependency for a respective call between services within a respective span pair, and
wherein the mapping a tag for each span in each collected span pair of the plurality of span pairs to tag attributes further comprises:
mapping a tag associated with a first span in a respective span pair to a first attribute, wherein the first span is associated with a service executing the respective call; and
mapping a tag associated with a second span in a respective span pair to a second attribute, wherein the second span is associated with a service receiving the respective call, wherein the first attribute comprises a "From" tag attribute, and wherein the second attribute comprises a "To" tag attribute.

13. The method of claim 1, further comprising:
mapping a tag for each span in each collected span pair of the plurality of span pairs to tag attributes to indicate a directionality of dependency for a respective call between services within a respective span pair, wherein each collected span pair of the plurality of span pairs comprises a parent span associated with a service executing the respective call and a child span associated with a service receiving the respective call; and
wherein the aggregating information across the plurality of span pairs further comprises:
maintaining a respective count for each unique set of parent span and child span tag attributes associated with the respective span pair; and
increasing a respective count each time a corresponding unique set of parent span and child span tag attributes associated with the respective span pair is encountered in the plurality of traces; and wherein the rendering the application topology graph for the microservice architecture in the GUI using the aggregated information for the given time duration further comprises:
  rendering edges and nodes of the application topology graph for the microservice architecture in the GUI using counts and tag attributes associated with each collected span pair of the plurality of span pairs, wherein a display thickness of each edge is determined based on respective counts for a span pair associated with the edge.

14. The method of claim 1, further comprising:
mapping a tag for each span in each collected span pair of the plurality of span pairs to tag attributes to indicate a directionality of dependency for a respective call between services within a respective span pair, wherein each collected span pair of the plurality of span pairs comprises a parent span associated with a service executing the respective call and a child span associated with a service receiving the respective call; and
wherein the aggregating information across the plurality of span pairs further comprises:
  maintaining a respective count for each unique set of parent span and child span tag attributes associated with the respective span pair; and
  increasing a respective count each time a corresponding unique set of parent span and child span tag attributes associated with the respective span pair is encountered in the plurality of traces; and
wherein the rendering the application topology graph for the microservice architecture in the GUI using the aggregated information for the given time duration further comprises:
  rendering edges and nodes of the application topology graph for the microservice architecture in the GUI using counts and tag attributes associated with each collected span pair of the plurality of span pairs, wherein a display size of each node is determined based on respective counts associated with a child span of a span pair associated with the node.

15. The method of claim 1, further comprising:
mapping a tag for each span in each collected span pair of the plurality of span pairs to tag attributes to indicate a directionality of dependency for a respective call between services within a respective span pair, and
wherein the mapping a tag for each span in each collected span pair of the plurality of span pairs to tag attributes further comprises:
  mapping a tag associated with a service corresponding to a first span in a respective span pair to a first attribute, wherein the first span is associated with a service executing the respective call; and
  mapping a tag associated with a service corresponding to a second span in a respective span pair to a second attribute, wherein the second span is associated with a service receiving the respective call.

16. A non-transitory computer-readable medium having computer-readable program code embodied therein for causing a computer system to perform a method of rendering a graphical user interface (GUI) comprising an application topology graph for a microservice architecture, the method comprising:
  generating a plurality of traces from a first plurality of spans generated by instrumented services in the microservice architecture for a given time duration;
  generating a second plurality of spans for uninstrumented services in the microservice architecture using information extracted from the first plurality of spans;
  grouping the second plurality of spans with the plurality of traces;
  traversing the plurality of traces and collecting a plurality of span pairs therefrom, wherein each span pair of the plurality of span pairs is associated with a call between two services in the microservice architecture;
  aggregating information across the plurality of span pairs to generate aggregated information for the given time duration; and
  rendering the application topology graph for the microservice architecture in the GUI using the aggregated information for the given time duration, wherein the application topology graph comprises both the instrumented services and the uninstrumented services in the microservice architecture.

17. The non-transitory computer-readable medium of claim 16, wherein the generating the second plurality of spans comprises:
  identifying leaf spans from the first plurality of spans; and
  for each leaf span in the first plurality of spans:
    applying rules to tags of a respective leaf span;
    determining, based on the tags of the respective leaf span, whether the respective leaf span is associated with a call to a corresponding uninstrumented service; and
    responsive to determining that the respective leaf span is associated with a call to a corresponding uninstrumented service, composing a span for the corresponding uninstrumented service by inheriting at least one tag of the respective leaf span.

18. The non-transitory computer-readable medium of claim 16, wherein the generating the second plurality of spans comprises:
  for each span in the first plurality of spans:
    applying rules to tags of a respective span;
    determining, based on the tags of the respective span, whether the respective span is associated with a call to a corresponding uninstrumented service; and
    responsive to determining that the respective leaf span is associated with a call to a corresponding uninstrumented service, composing a span for the corresponding uninstrumented service.

19. The non-transitory computer-readable medium of claim 16, wherein the aggregating information across the plurality of span pairs reduces duplicative information associated with multiple occurrences of a same span pair from the plurality of span pairs.

20. A system for rendering a graphical user interface (GUI) comprising an application topology graph for a microservice architecture, the system comprising:
  a memory; and
  a processing device communicatively coupled with the memory and configured to:
    generate a plurality of traces from a first plurality of spans generated by instrumented services in the microservice architecture for a given time duration;
    generate a second plurality of spans for uninstrumented services in the microservice architecture using information extracted from the first plurality of spans;
    group the second plurality of spans with the plurality of traces;
    traverse the plurality of traces and collecting a plurality of span pairs therefrom, wherein each span pair of the plurality of span pairs is associated with a call between two services in the microservice architecture;

aggregate information across the plurality of span pairs to generate aggregated information for the given time duration; and render the application topology graph for the microservice architecture in the GUI using the aggregated information for the given time duration, wherein the application topology graph comprises both the instrumented services and the uninstrumented services in the microservice architecture.

\* \* \* \* \*